United States Patent [19]
Saeki et al.

[11] Patent Number: 5,748,503
[45] Date of Patent: May 5, 1998

[54] APPARATUS FOR ESTIMATING VEHICLE SPEED BASED ON DETECTED WHEEL SPEED, WITHOUT INFLUENCE OF NOISE INCLUDED IN THE DETECTED WHEEL SPEED

[75] Inventors: Minoru Saeki, Toyota; Masaki Kawanishi; Yoshiaki Tsuchiya, both of Aichi-ken; Tomokiyo Suzuki, Toyota, all of Japan

[73] Assignee: Toyota Jidosha Kabushiki Kaisha, Toyota, Japan

[21] Appl. No.: 674,482

[22] Filed: Jul. 2, 1996

[30] Foreign Application Priority Data

Jul. 4, 1995 [JP] Japan ................. 7-168455

[51] Int. Cl.$^6$ ............................. G01P 7/00
[52] U.S. Cl. ........................ 364/565; 701/74
[58] Field of Search ............... 364/565, 426.015, 364/426.024; 324/160, 161, 163, 164, 166, 167; 701/71, 74, 75, 79, 82, 90, 91, 93, 110

[56] References Cited

U.S. PATENT DOCUMENTS

| | | | |
|---|---|---|---|
| 3,874,741 | 4/1975 | Schnaibel et al. | 303/159 |
| 4,900,100 | 2/1990 | Higashimata et al. | 364/426.025 |
| 5,099,443 | 3/1992 | Higashimata et al. | 364/565 |
| 5,418,453 | 5/1995 | Wise | 324/160 |

FOREIGN PATENT DOCUMENTS 2141355A  5/1990  Japan.

*Primary Examiner*—James P. Trammell
*Attorney, Agent, or Firm*—Kenyon & Kenyon

[57] ABSTRACT

A vehicle speed detecting apparatus wherein the speeds of vehicle wheels are detected by wheel speed detecting devices, and the vehicle running speed is estimated by a vehicle speed estimating device, on the basis of the detected wheel speeds, and according to a predetermined estimation rule. The vehicle speed estimating device includes a noise detector for detecting a noise included in any one of the detected wheel speeds, and a rule changing device for changing the estimation rule depending upon whether the noise is included in the detected wheel speed or speeds.

36 Claims, 13 Drawing Sheets

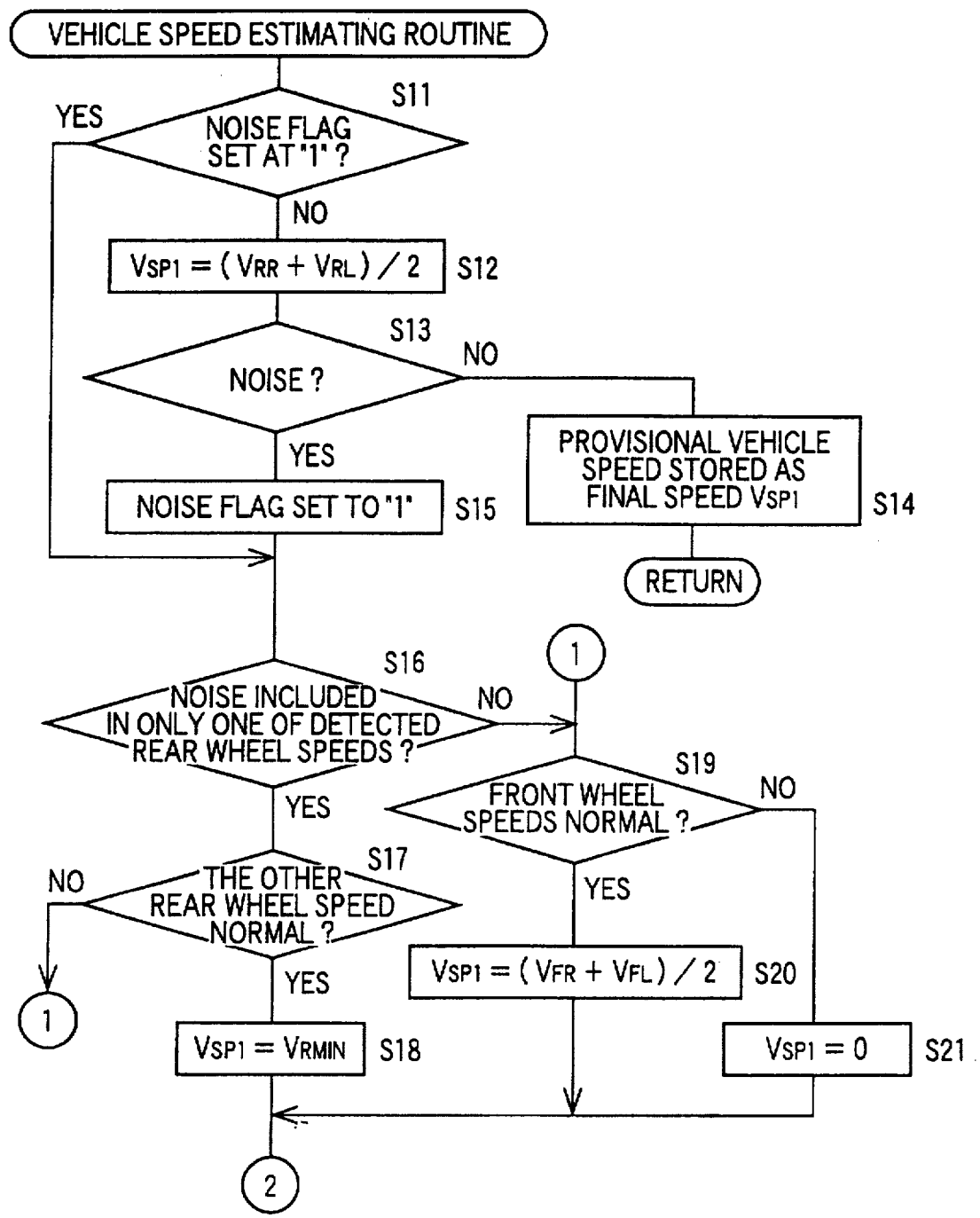

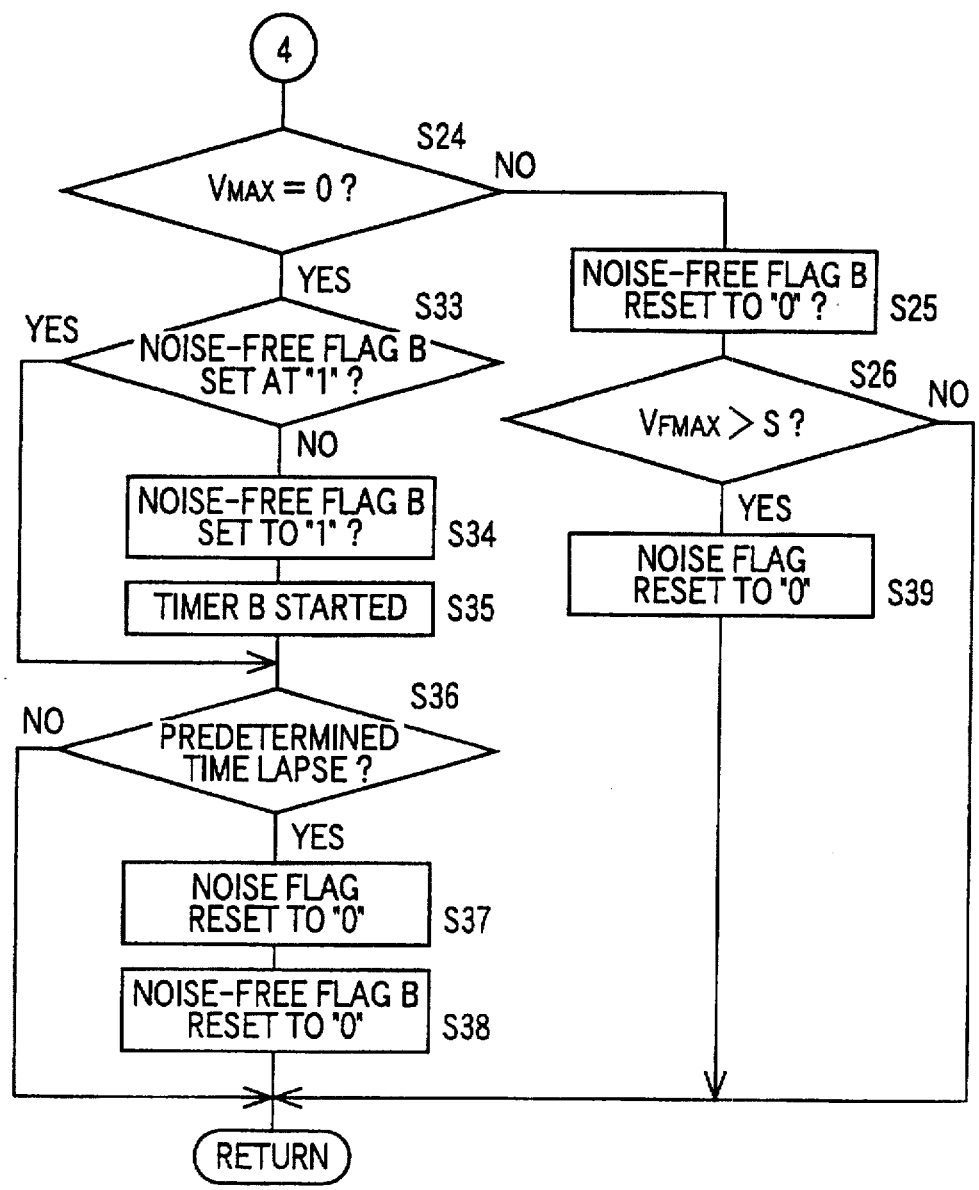

FIG. 8

| SENSOR EFFECTS | | FRONT | NONE | BOTH WHEELS | | | ONE WHEEL | | | NONE |
|---|---|---|---|---|---|---|---|---|---|---|
| | | REAR | NONE | NONE | BOTH · ONE | | NONE | BOTH | ONE | BOTH · ONE |
| NOISE-INFLUENCED FRONT WHEEL SPEEDS | NONE | | 5 | 2 | 3 | | 4 | 3 | 4 | 5 |
| | BOTH | | * | 2 | 3 | | 2 | 3 | 3 | 3 |
| | ONE | | 6 | 2 | 3 | | 2 | 3 | 3 | 6 |

2: VSP1 is estimated depending upon whether noise is included in detected rear wheel speeds
3: VSP1 = 0
4: VSP1 = VFMAX (higher normal front wheel speed)
5: VSP1 = Average of detected front wheel speeds
6: VSP1 = VFMIN (lower normal front wheel speed)
*: VSP1 is determined in the same manner as in the case where two front wheel speed sensors are defective

APPARATUS FOR ESTIMATING VEHICLE SPEED BASED ON DETECTED WHEEL SPEED, WITHOUT INFLUENCE OF NOISE INCLUDED IN THE DETECTED WHEEL SPEED

BACKGROUND OF THE INVENTION

1. Field of the Invention

The present invention relates to a vehicle speed detecting apparatus including vehicle speed estimating means for estimating the running speed of a motor vehicle on the basis of a detected rotating speed of at least one wheel of the vehicle.

2. Discussion of the Prior Art

An example of a vehicle speed detecting apparatus of the type indicated above is disclosed in JP-A-2-141355. The vehicle speed detecting apparatus disclosed in this publication includes (1) a plurality of wheel speed detecting devices which correspond to respective groups of wheels of a motor vehicle each group consisting of at least one wheel and each of which is adapted to detect the rotating speed of each wheel of the corresponding group, (2) vehicle speed estimating means for estimating the running speed of the vehicle, on the basis of the speed of at least one wheel detected by the wheel speed detecting devices, and according to a predetermined estimation rule, (3) excessive-slip detecting means for detecting an excessive amount of slip of at least one of the wheels upon braking or acceleration of the vehicle, on the basis of the wheel speeds detected by the wheel speed detecting devices and a rate of change of the detected wheel speed or an acceleration value of the wheel, and (4) rule changing means for changing the estimation rule used by the vehicle speed estimating means, on the basis of an output of the excessive-slip detecting means.

The vehicle speed detecting apparatus constructed as described above is effectively prevented from effecting erroneous estimation of the vehicle speed due to excessive slipping of the wheel or wheels, since the rule used for estimating the vehicle speed is changed according to the output of the excessive-slip detecting means.

The above-identified publication JP-A-2-141355 does not disclose any means for changing the estimation rule depending upon whether a noise has influenced the detected rotating speed of the wheel or wheels. It appears that even if a noise has influenced the detected wheel speed in the apparatus described in the publication, the apparatus actually operates to correctly estimate the vehicle speed, since the estimation rule is changed in this case in the same manner as in the case where excessive slipping of the wheel is detected. However, the apparatus is not adapted to distinguish an influence of the excessive wheel slipping on the detected wheel speed from an influence of a noise included in or superimposed on the detected wheel speed. In fact, the occurrence of an excessive slip of the wheel and the inclusion of a noise in the detected wheel speed have different significance. The noise may be generated due to abnormal oscillation in an electrical system of the wheel speed detecting device, or vibration in a drive system of the vehicle caused by racing of an engine, for example. The "racing" of the engine is a phenomenon in which the engine is operating at a speed higher than a given upper limit under a non-load condition.

Where the wheel has an excessive slip, the speed of that wheel as detected by the wheel speed detecting device represents the actual speed of the wheel. Where the wheel speed detected by the wheel speed detecting device includes a noise, the detected wheel speed does not represent the actual wheel speed, and in this sense may be considered to be an apparent or fictious wheel speed. Therefore, the detection of the excessive wheel slip and the detection of a noise included in the detected wheel speed have different meanings.

The detection or determination of presence of a noise which may influence the wheel speed as detected by the wheel speed detecting device has the following advantages:

If the noise arising from abnormal oscillation in the electrical system of the wheel speed detecting device is detected, it is possible to provide a warning indication that the electrical system has become defective or abnormal, and change manners of various controls based on the wheel speed detected by the detecting device, or inhibit such controls.

If the noise arising from vibration in the drive system of the vehicle is detected, too, it is possible to provide a warning indication that the vehicle drive system is abnormally vibrating, or change manners of various controls based on the detected wheel speed or inhibit such controls. Vibration of the vehicle drive system for a long time is not desirable to the vehicle. In this respect, the warning indication of the vibrating drive system enables the vehicle operator to release the accelerator pedal for thereby avoiding long lasting of the vibration of the drive system.

Further, the distinction between the noise included in the detected wheel speed and the excessive wheel slip influencing the detected wheel speed makes it possible to accurately detect the wheel speed as well as the vehicle speed. Accurate detection of both the wheel speed and the vehicle speed is highly desired for achieving the intended functions of an anti-lock braking system adapted to brake the vehicle without excessive slipping of the wheels, a traction control system adapted to prevent excessive slipping of the drive wheels during starting or acceleration of the vehicle, and a vehicle attitude control system adapted to improve running stability of the vehicle.

SUMMARY OF THE INVENTION

It is therefore a principal object of this invention to provide a vehicle speed detecting apparatus which is capable of detecting a noise to be included in a detected vehicle wheel speed, as distinguished from an excessive slip of the wheel, and which prevents erroneous detection or determination of the vehicle speed due to the noise included in the detected wheel speed.

It is a first optional object of the invention to provide such a vehicle speed detecting apparatus including means for improving the accuracy of detection of the vehicle speed.

It is a second optional object of this invention to provide such a vehicle speed detecting apparatus including noise removal means for detecting removal of a noise such that the noise removal means is activated only after the detection of the noise.

The principal object indicated above may be achieved according to a first aspect of the present invention, which provides a vehicle speed detecting apparatus comprising: a plurality of wheel speed detecting devices which correspond to respective groups of wheels of a motor vehicle each group consisting of at least one wheel and each of which detects a rotating speed of each wheel of the corresponding group; and vehicle speed estimating means for estimating a running speed of the vehicle on the basis of at least one of the rotating speeds of the wheels detected by the wheel speed detecting devices, and according to a predetermined estimation rule, wherein the vehicle speed estimating means includes noise detecting means for determining whether a noise is included in at least one of outputs of the plurality of wheel speed detecting devices, and rule changing means for changing the predetermined estimating rule according to an output of the noise detecting means.

In the vehicle speed detecting apparatus constructed according to the first aspect of the present invention, the vehicle running speed is estimated by the vehicle speed estimating means on the basis of the speed of at least one of the wheels and according to the predetermined estimation rule. The rule changing means of the vehicle speed estimating means changes the rule for estimating the vehicle speed, when the noise detecting means detects the inclusion of a noise in some of the rotating speeds as detected by the wheel speed detecting device or devices. That is, the vehicle speed estimation rule is changed by the rule changing means so that the estimated vehicle speed is free from an estimation error due to the noise included in the detected wheel speed or speeds.

Thus, the vehicle speed detecting apparatus of the present invention does not suffer from erroneous estimation of the vehicle running speed due to the inclusion of a noise in the outputs of the wheel speed detecting devices. Further, the present apparatus permits accurate detection of the wheel speeds without an influence by the noise included in the outputs of the wheel speed detecting devices. The output of the noise detecting means of the vehicle speed estimating means may be utilized to provide the vehicle operator with a warning that the outputs of some wheel speed detecting devices include an interfering noise, and to change or inhibit various control functions to be performed by the vehicle.

The noise detecting means is adapted to detect a noise which arises from resonance of a drive system of the vehicle caused by racing of an engine of the vehicle, and a noise which arises from oscillation in an electrical system of the wheel speed detecting devices.

The noise detecting means may include independent type detecting means for determining whether a noise is included in the outputs of respective ones of the wheel speed detecting devices. Alternatively, the noise detecting means may include relative type detecting means for determining whether a noise is included in at least one of the outputs of the wheel speed detecting devices, depending upon a relationship between two groups of detected rotating speeds of the wheels each group consisting of at least one rotating speed. The relationship used by the relative type detecting means may be a difference of the rotating speeds of the wheels of the two groups.

When a given wheel of the vehicle has an excessive amount of slip, the rotating speed as detected by the corresponding wheel speed detecting device represents the actual speed of that wheel. In this case, therefore, an acceleration value of the wheel as calculated on the detected rotating speed substantially represents the actual acceleration of the wheel where the wheel is accelerated in one direction. When a noise is included in the output of the wheel (i.e., included in the rotating speed of the wheel as represented by the output), on the other hand, the rotating speed as detected by the wheel speed detecting device deviates from the actual wheel of the wheel by an amount corresponding to the resonance or oscillation which has caused the noise. In this case, the acceleration value of the wheel as calculated on the detected rotating speed considerably deviates from the actual acceleration of the wheel during running of the vehicle. Based on this fact, the inclusion of a noise in the outputs of the wheel speed detecting devices may be distinguished from the generation of excessive slipping of the wheels.

Where the noise detecting means includes the relative type detecting means which operates depending upon the relationship between the two groups of wheel rotating speeds as described above, this relative type detecting means may be adapted to detect the inclusion of a noise in the output or outputs of the wheel speed detecting device or devices, by determining whether a selected value relating to a difference between right and left front and/or rear wheels is larger than a predetermined threshold. In this case, the wheel speed detecting device or devices whose outputs include a noise may or may not be identified depending upon the situation.

The independent type detecting means of the noise detecting means may be adapted to detect the inclusion of a noise in the output of each of the wheel speed detecting devices, or the inclusion of a noise in the output or outputs of selected at least one of the wheel speed detecting devices. In the case where a specific constructional arrangement of the motor vehicle indicates that some particular wheels of the vehicle are more likely to suffer from resonance than the other wheels, the relative type detecting means may be arranged to detect the inclusion of a noise in the outputs of the wheel speed detecting devices corresponding to those particular wheels.

The noise detecting means may comprise designating means for designating at least one of the wheel speed detecting devices so that the noise detecting means determines whether the noise is included in the output of each of the at least one wheel speed detecting device designated by the designating means.

Where the noise detecting means includes the independent type noise detecting means, this independent type detecting means may be adapted to detect the inclusion of a noise in the outputs of all of the wheel speed detecting devices, or the inclusion of a noise in the output of only the selected wheel speed detecting device or devices. In the former case, the designating means designates all of the wheel speed detecting devices. In the former case, the designating means designates only the selected wheel speed detecting device or devices. In the case where the specific constructional arrangement of the motor vehicle indicates that some particular wheels of the vehicle are more likely to suffer from resonance than the other wheels, the designating means may be adapted to designate only the wheel speed detecting devices corresponding to those particular wheels.

Where the present vehicle speed detecting apparatus is provided on a motor vehicle having drive wheels and non-drive wheels, the drive wheels are more likely to undergo resonance when resonance occurs in the vehicle drive system due to racing of the engine, than the non-drive wheels. In this case, therefore, a need of checking the wheel speed detecting devices for the non-drive wheels to detect the inclusion of a noise in their outputs is relatively low. If the vehicle estimating means is arranged to estimate the vehicle speed on the basis of the speeds of the drive wheels, only the wheel speed detecting devices for the drive wheels are required to be checked for the inclusion of a noise in their outputs. Namely, it is not so necessary to detect the inclusion of a noise in the detected wheel speeds not used for the vehicle speed estimation.

The noise detecting means may be adapted to determine whether a noise is included in the output of one of the wheel speed sensors for the right and left wheels. In this case, the noise detecting means may be arranged to detect the inclusion of the noise depending upon a difference of the detected speeds of the right and left wheels. In the present case, one of the wheel speed sensors for the right and left wheels is designated by the designating means indicated above.

The designating means of the noise detecting means may be adapted to designate two or more of the wheel speed designating devices in a predetermined order.

In some motor vehicles, different degrees of susceptibility of the wheel speed detecting devices to a noise are known. In this instance, the noise detection can be effected with high efficiency if the noise detecting means designate those wheel speed detecting devices in the order of the susceptibility to the noise. That is, the wheel speed detecting device most susceptible to the noise is designated first. In a motor vehicle having drive wheels and non-drive wheels, the wheel speed detecting devices for the drive wheels are designated before those for the non-drive wheels.

The noise detecting means may be adapted to determine that the noise is included in at least one of the outputs of the wheel speed detecting devices, if a value relating to the rotating speed as represented by the above-indicated at least one of the outputs of the wheel speed detecting devices satisfies a predetermined condition.

The value relating to the rotating speed may include not only the wheel rotating speed itself, but also a rate of change (an amount of change per unit time) of the rotating speed which is an acceleration or deceleration value of the corresponding wheel. Where the value is the rotating speed itself, the predetermined condition includes a condition that the wheel rotating speed is higher than a threshold which cannot take place when the vehicle is stationary (not running). Where the value is the wheel acceleration value, the predetermined condition includes a condition that the wheel acceleration value is higher than a threshold which cannot take place when the wheel is accelerated in one direction.

The rate of change of the wheel rotating speed may be a rate of change of an output signal of a sensor of the corresponding wheel speed detecting device, either prior to a filtering process of the output signal (or after a filtering process using a filter having a comparatively low filtering effect or a comparatively small number of filtering operations), or after the filtering process (by a filter having a comparatively high filtering effect or with a comparatively large number of filtering operations). In the former case, the detected amount of change of the rotating speed per unit time is relatively large, permitting easier detection of a noise included in the wheel speed sensor output than in the latter case. However, the output signal of the sensor after the filtering process may be desirable in some situation depending upon the type of the noise to be detected.

When the rate of change is a negative value, the predetermined condition is satisfied if the rate of change is lower than a negative threshold value. Namely, the predetermined condition is that the deceleration value of the wheel is larger than a predetermined value.

The first optional object indicated above may be achieved according to a preferred form of this invention, wherein the noise detecting means reference speed comprises selecting means for selecting as a reference wheel speed at least one of the rotating speeds of the wheels as represented by the outputs of the corresponding wheel speed detecting devices. In this instance, the noise detecting means further comprises noise determining means for determining whether the noise is included in the above-indicated at least one of the outputs of the wheel speed detecting devices, depending upon the reference wheel speed selected by the reference speed selecting means.

The reference wheel speed consists of one or more wheel speeds as detected by the corresponding wheel speed detecting device or devices. Where only one detected wheel speed is used as the reference wheel speed, this reference wheel speed may consist of the detected speed of a predetermined one of the wheels, or a highest, lowest or intermediate one of the detected wheel speeds of selected ones of the wheels. Where two or more detected wheel speeds are used as the reference wheel speed, the reference wheel speed may be an average of those two or more detected wheel speeds.

In the above preferred form of the apparatus, the noise determining means detects the inclusion of a noise in the output or outputs of the wheel speed detecting device or devices, on the basis of the reference wheel speed selected by the reference speed selecting means. This form of the apparatus is effective to improve the accuracy of detection of the noise, and avoid erroneous estimation or detection of the vehicle speed due to the noise included in the outputs of the wheel speed detecting devices.

For example, the noise determining means is adapted to effect a determination as to whether the motor vehicle on the present apparatus is provided is stationary or not. This determination is effected on basis of the selected reference speed. If the reference wheel speed is lower than the predetermined threshold, the noise determining means determines that the vehicle is stationary. In this condition, the noise determining means determines whether the detected wheel rotating speed or a rate of change of this speed is higher than a predetermined threshold. If an affirmative decision is obtained in this second determination, then the noise determining means determines that the noise is included in the detected wheel rotating speed. In this respect, it is noted that a noise due to racing of the vehicle engine is likely to be generated while the vehicle is stationary or almost stopped. Thus, the noise determining means which operates depending on the reference wheel speed may be adapted to detect the engine racing by determining whether the vehicle is stationary or not.

The noise determining means may be adapted to determine the inclusion of the noise in the output or outputs of the wheel speed detecting device or devices, if a difference between the detected wheel speed and the reference wheel speed is larger than a predetermined value. In this case, the reference wheel speed may be a lower one of speeds of right and left wheels of the vehicle, and the detected higher wheel speed is compared with the reference wheel speed.

The reference speed selecting means may comprise normal speed selecting means for selecting said reference wheel speed from among the detected rotating speeds of the wheels which are not abnormal. This normal speed selecting means permits further improvement of the noise detecting accuracy.

The rotating speeds as represented by the outputs of the wheel speed detecting devices may be abnormal if the wheel speed detecting devices suffer from some electrical defects such as electrical disconnection, for example. The detected rotating speed of a given wheel may be considered abnormal if a difference of the speed of this wheel from that of another wheel is larger or smaller than a predetermined threshold. The difference may be replaced by a ratio of the speed of the wheel in question to that of another wheel.

While the reference wheel speed is used to detect the inclusion of a noise in the outputs of the wheel speed detecting devices, it may be used to detect the removal of the noise. Further, the reference wheel speed may be used for other purposes, for instance, for estimating the vehicle speed. Where the vehicle speed is estimated on the basis of the reference wheel speed, the estimation accuracy is considerably increased, particularly where the reference wheel speed is selected from among the detected normal speeds of the wheels.

The reference speed selecting means may comprise abnormal speed detecting means for detecting at least one abnormal wheel speed each of which is the rotating speed of the wheel which is detected by the corresponding wheel speed detecting device and which is abnormal. In this instance, the normal speed selecting means selects as said reference wheel speed a lowest one of the detected rotating speeds except said at least one abnormal wheel speed.

The abnormal wheel speed may be a wheel rotating speed detected by the wheel speed detecting device which suffers from electrical disconnection or other defects. Usually, the abnormal wheel speed in this case is zero. Consequently, since the reference wheel speed is the lowest wheel speed which is not zero, a probability that a noise is included in this lowest normal wheel speed is very low. It is noted that noises are rarely included in all of the wheel speeds which are not zero.

The abnormal speed detecting means may include abnormality detecting means for determining, as the abnormal wheel speed, the rotating speed of each wheel which speed is detected to be zero by the corresponding wheel speed device, in a case where the rotating speeds detected by the plurality of wheel speed detecting devices include at least one rotating speed within a predetermined normal range and at least one rotating speed which is zero.

In the case where the wheel rotating speeds detected by the wheel speed detecting devices include the rotating speed or speeds which is/are not zero and within the normal range, and the rotating speed or speeds which are zero, each wheel speed detecting device whose output represents the zero speed may be considered to suffer from any defect such as electrical disconnection. In some cases, it is difficult to determine whether the wheel is actually stationary or the corresponding wheel speed detecting device is defective, when the detected speed of that wheel is zero. However, the present arrangement including the abnormality detecting means considerably facilitates the detection of such defects such as electrical disconnection of the wheel speed detecting devices, depending upon whether the detected wheel speed is zero or not. Although the present arrangement compares the detected wheel speed (zero speed) of one wheel with those of the other wheels (wheel speeds in the normal range), this comparison is not essential, as in an arrangement which will be described.

The abnormal speed detecting means indicated above may include means for detecting any defects such as electrical disconnection of the wheel speed detecting devices.

In the above-described preferred form of the apparatus wherein the noise detecting means comprises the reference speed selecting means and the noise determining means, the noise determining means may comprise, speed difference detecting means for determining whether a difference between each of at least one of the rotating speeds of the wheels detected by the plurality of wheel speed detecting devices and the reference wheel speed is larger than a predetermined threshold. In this instance, the noise determining means detects the inclusion of the noise in each of the above-indicated at least one rotating speed if the speed difference detecting means determines that the above-indicated difference is larger than the predetermined threshold.

Generally, the reference wheel speed is a detected wheel speed which is not abnormal and which does not include a noise. Accordingly, when the difference of the wheel speed in question from the reference wheel speed is larger than the predetermined threshold value, the wheel speed in question is considered to include a noise. The reference wheel speed may be compared with the speed of only one selected wheel or the speeds of two or more selected wheels. In the latter case, an average of these two or more wheel speeds may be compared with the reference wheel speed to determine whether the difference of this average from the reference wheel speed is larger than the threshold. Further, each of the wheel speeds detected by all the wheel speed detecting devices may be compared with the reference wheel speed. In this case, the noise determining means may be considered as the independent type noise detecting device discussed above.

The second optional object indicated above may also be achieved according to another preferred form of the invention, wherein the plurality of wheel speed detecting devices include a left wheel speed detecting device and a right wheel speed detecting device which detect the rotating speeds of a left wheel and a right wheel of the vehicle, respectively, the left and right wheels being located on at least one of front and rear sides of the vehicle, and wherein the noise detecting means comprises noise determining means for determining that the noise is included in at least one of outputs of the left and right wheel speed detecting devices, if a value relating to a difference between the rotating speeds of the left and right wheels detected by the left and right wheel speed detecting devices is larger than a predetermined threshold.

In the above preferred form of the apparatus, the left and right wheel speed detecting devices may be adapted to detect the rotating speeds of the front left and right wheels, or the rotating speeds of the rear left and right wheels. Alternatively, the left and right wheel speed detecting devices may be adapted to detect an average of the rotating speeds of the front and rear left wheels, and an average of the rotating speeds of the front and rear right wheels, respectively.

In the above form of the vehicle speed detecting apparatus, the noise determining means of the noise detecting means determines that the noise is included in at least one of the outputs of the left and right wheel speed detecting devices, if the value relating to the difference, of the speeds of the left and right wheels is larger than the predetermined threshold.

The value relating to the above-indicated speed difference may be a difference between the wheel speeds detected by the left and right wheel speed detecting devices, or a value calculated as a function of this speed difference, or alternatively a value obtained by processing the detected speeds of the left and right wheels according to respective predetermined functions.

The predetermined threshold with which the above-indicated value relating to the speed difference of the left and right wheels may be an upper limit which is theoretically determined such that the value relating to the speed difference, which value exceeds the upper limit, is not actually expected to occur unless a noise is included in at least one of the outputs of the left and right wheel speed detecting devices, in other words, such that the value relating to the speed difference exceeds the upper limit only when the noise is included in at least one of the outputs of the left and right wheel speed detecting devices.

Thus, the noise determining means is capable of detecting the noise inclusion in at least one of the outputs of the left and right wheel speed detecting devices, depending upon whether the value relating to the speed difference between the left and right wheels exceeds the predetermined threshold or upper limit.

The value relating to the difference between the detected speeds of the left and right wheels may be the above difference itself. In this case, the predetermined threshold with which the noise determining means compares the above speed difference is a sum of a difference between the rotating speeds of the left and right wheels, which difference occurs when the vehicle is turning with a minimum turning radius, and a maximum difference between the rotating speeds of the left and right wheels, which maximum difference occurs due to slipping of the left and right wheels.

In the above arrangement, the threshold with which the speed difference between the left and right wheels is compared is a maximum value of the difference which is theoretically determined with the turning of the vehicle and the slipping of the left and right wheels being taken into account. If the speed difference is larger than the maximum value, the higher one of the detected left and right wheel speeds is considered to include a noise. In this respect, it is noted that both of the detected left and right wheel speeds rarely include noise at the same time. Usually, a noise is included in the left and right wheel speeds at different times. Therefore, the higher one of the detected left and right wheel speeds is considered to include a noise, since the noise increases the detected wheel speed.

In a further preferred form of the invention, the vehicle speed detecting apparatus further comprises racing condition estimating means for determining whether there is a possibility of racing of an engine of the vehicle, and the noise detecting means comprises noise determining means for determining that the noise is included in at least one of the outputs of the plurality of wheel speed detecting devices, when the racing condition estimating means determines that there is a possibility of the racing of the engine.

In the above preferred form of the apparatus, the vehicle speed is estimated according to an output of the noise determining means which operates in response to an output of the racing condition estimating means. When the racing condition estimating means determines that there is a possibility of the engine racing, there is a high probability that a noise is included in some of the outputs of the wheel speed detecting devices.

The racing condition estimating means may be adapted to determine that there is a possibility of the racing of the engine, if at least one of a first condition that the engine is operating under a non-load condition and a second condition that a speed of the engine is higher than a predetermined threshold is satisfied.

Since the engine racing condition is defined as a condition in which the engine is operating under the non-load condition at a speed higher than a certain upper limit, the possibility of the engine racing is considerably high if at least one of the first and second conditions indicated above is satisfied.

The probability that the determination of the engine racing condition by the racing condition estimating means is actually correct is higher when both of the first and second conditions are satisfied than when only one of these conditions is satisfied. Thus, the racing condition estimating means may function as means for determining whether the probability of the determination of the engine racing condition is high or low, depending upon whether both or either one of the first and second conditions is/are satisfied.

It is possible to estimate that the engine is under a non-load condition, if the shift lever is placed in the neutral or parking position or if a clutch device in the transmission is placed in a released state. In a motor vehicle equipped with an automatic transmission, the engine racing may take place even if the shift lever is in the drive position, while the vehicle is stationary. It is possible to determine that the vehicle is stationary, if the brake pedal is in a depressed state.

The engine speed can be detected by directly detecting the rotating speed of its output shaft. However, a determination as to whether the engine speed is higher than the threshold may be effected depending whether the amount of depression of the accelerator pedal or the opening angle of the throttle valve is larger than a predetermined limit.

Thus, the determination as to whether there is a possibility of the engine racing may be made on the basis of the operation of a suitable operator-controlled member of the vehicle, irrespective of whether the vehicle is a four-wheel drive vehicle or a two-wheel drive vehicle.

The racing condition estimating means may be adapted to determine that there is a possibility of the racing of the engine, if a reference wheel speed selected from among the rotating speeds of the wheels as represented by the wheel speed detecting devices is lower than a predetermined threshold. The reference wheel speed may be selected as described above in detail.

Since it is possible to estimate that the vehicle is stationary if the reference wheel speed is lower than the predetermined threshold, the racing condition estimating means may function as means for determining that the vehicle is stationary, depending upon the reference wheel speed.

The plurality of wheels may include a plurality of front wheels, and/or a plurality of rear wheels. The noise detecting means may be adapted to determine whether values relating to the detected rotating speeds of the front or rear wheels are all held within or outside a predetermined normal range, when the racing condition estimating means has, determined that there is a possibility of racing of the engine. In this case, the noise detecting means determines that noises are included in all of the detected rotating speeds of the front or rear wheels, if the above-indicated values are outside the normal range.

The noise detecting means may be adapted to determine that the detected rotating speeds of the front wheels (rear wheels) are outside the normal range, if the detected rotating speeds are higher than an upper limit which cannot occur while the vehicle is stationary, namely, while there is a possibility of the engine racing. Alternatively, the noise detecting means may be adapted to determine that the detected rotating speeds are outside the normal range, if the acceleration values of the front wheels (rear wheels) are higher than an upper limit which cannot occur when the wheels are accelerated in one direction.

The plurality of wheel detecting devices may include drive wheel speed detecting devices for detecting the rotating speeds of drive wheels of the vehicle, and non-drive wheel speed detecting devices for detecting the rotating speeds of non-drive wheels. In this case, the noise detecting means may be adapted to determine whether a difference between the rotating speeds of the drive and non-drive wheels detected by the drive and non-drive wheel speed detecting devices is larger than a predetermined threshold, when the racing condition estimating means has determined that there is a possibility of racing of the engine. In this case, the noise detecting means determines that noise is included in either the rotating speeds detected by the drive speed detecting devices or the rotating speeds detected by the non-drive wheel speed detecting devices.

When the engine racing takes place, only the front wheels or rear wheels, or only the drive wheels or non-drive wheels are usually subject to resonance due to the engine racing. This fact can be utilized to detect the inclusion of a noise in the detected speed of the drive or non-drive wheel due to the engine racing, depending upon the detected speed difference of these drive and non-drive wheels while the racing condition estimating means has determined that there is a possibility of the engine racing.

Usually, a noise arising from the engine racing is more likely to be included in the detected speed of the drive wheel. Accordingly, the detected speeds of the drive wheel are generally higher than the detected speeds. Of the non-drive wheels in the above arrangement depending upon the speed difference of the drive and non-drive wheels. The arrangement which depends upon whether the detected speeds of the front or rear wheels are within the normal range or not as described above may be used for either a two-wheel drive vehicle or a four-wheel drive vehicle. In the two-wheel drive vehicle, either the front wheels or the rear wheels are drive wheels, and the drive wheels are more likely to suffer from resonance, and the detected speeds of the drive wheels are apt to include a noise, whereby the values relating to the detected speeds of the drive wheels are likely to be outside the normal range.

In some motor vehicles, the detected speed of only one of the two drive wheels is more likely to include a noise. In this case, a determination is made as to whether the value relating to the detected speed of that drive wheel is outside the normal range.

In the four-wheel drive vehicle, it is generally not known which wheels are likely to suffer from resonance. In some constructional arrangements of the four-wheel drive vehicles, however, either the front wheels or the rear wheels are more likely to suffer from resonance. In this case, the noise inclusion may be detected depending upon whether the detected speeds of the front or rear wheels are held within the normal range or not while there is a possibility of the engine racing.

The noise detecting means may be adapted to determine that the noise inclusion condition is satisfied, if a rate of change of one of the rotating speeds of the wheels detected by the wheel speed detecting devices is larger than a predetermined threshold when the condition estimating means has determined that there is a possibility of the racing of the engine, that is, when the reference wheel speed selected from among the rotating speeds of the wheels as represented by the wheel speed detecting devices is lower than the predetermined threshold.

In the above arrangement, the noise detecting means determines the inclusion of the noise in the detected wheel speed if the rate of change of the detected wheel speed is larger than the threshold when the stationary condition of the vehicle is detected on the basis of the reference wheel speed explained above.

As described above, the reference wheel speed may be selected from among the detected wheel speeds which are not abnormal, or selected to be equal to the lowest one of the detected wheel speeds which are not abnormal. In this case wherein the reference wheel speed is normal, the determination as to whether the vehicle is stationary can be achieved with high accuracy, so that the accuracy of determination of the noise inclusion is accordingly improved. Thus, the present noise detecting means which operates depending upon whether there is a possibility of the engine racing depends upon the reference wheel speed to determine whether the noise is included in the detected wheel speed.

The second optional object indicated above may be achieved according to a still further preferred form of this invention, wherein the vehicle speed detecting apparatus further further comprises noise removal detecting means for effecting a noise removal detecting operation to determine whether the noise has been removed from the above-indicated at least one of the outputs of the plurality of wheel speed detecting devices, and wherein the noise removal detecting means initiates the noise removal detecting operation when the noise detecting means has determined the inclusion of the noise in the above-indicated at least one of the outputs of the wheel speed detecting devices, and terminates the noise removal detecting operation when the noise removal detecting means has determined the removal of the noise.

In the above preferred form of the apparatus, the noise removal detecting operation of the noise removal detecting means is initiated when the noise detecting means has determined the inclusion of the noise in some of the outputs of the wheel speed detecting devices, and this noise removal detecting operation is terminated when the noise removal has been detected.

The condition that should be satisfied for the noise detecting means to determine the noise inclusion is different from the condition that should be satisfied for the noise removal detecting means to determine the noise removal. Although these conditions depend upon the purpose of detecting the noise included in the detected wheel speeds, the condition for the noise removal is less strict than the condition for the noise inclusion. Where the same parameter is used for the determinations of the noise inclusion and removal, the threshold value used for the noise removal is smaller than that for the noise inclusion. In some situations, different parameters may be used for the determinations of the noise inclusion and removal. Thus, the the noise detecting means and the noise removal detecting means should be operated independently of each other. However, these two means need not be always operated simultaneously. In other words, the noise removal detecting operation of the noise removal detecting means is desirably initiated only after the determination of the noise inclusion by the noise detecting means, so as to avoid an unnecessary processing time spent by the noise removal detecting means.

The noise removal detecting means may include independent type noise removal detecting means or overall type noise removal detecting means. The independent type noise removal detecting means is adapted to independently determine whether the noise has been removed from each of the above-indicated at least one of the outputs of the wheel speed detecting devices. The overall type noise removal detecting means is adapted to determine whether the noise has been simultaneously removed from all of the above-indicated at least one of the outputs. The overall type noise removal detecting means may be arranged to effect the noise removal determination depending upon whether the vehicle is running at a speed higher than a predetermined upper limit, or depending upon whether the highest one of the speeds or acceleration values of the wheels in question is held within a normal or permissible range or not.

Even where the independent type noise detecting means is provided for checking the noise inclusion in each of the outputs of the wheel speed detecting devices, the overall type noise removal detecting means as well as the independent type noise removal detecting means may be used. That is, if the overall type noise removal detecting means determines that the noise has been removed from all of the outputs of the wheel speed detecting devices in question, this determination indicates that the noise has been removed from each of the outputs in question. The independent type noise removal detecting means may be adapted to check only the outputs of the wheel speed detecting devices which include noises according to the determination of the independent type noise detecting means, or check the outputs of all of the wheel speed detecting devices irrespective of whether a noise has been found in those outputs.

Similarly, the independent type noise removal detecting means as well as the overall type noise removal detecting means may be used, even where the relative type noise detecting means is provided for checking the noise inclusion in some of the outputs of the wheel speed detecting devices.

The noise noise removal detecting means may be adapted to determine that the noise has been removed from each of the above-indicated at least one of the outputs of the wheel speed detecting devices, if a value relating to the rotating speed as represented by each of the above-indicated at least one of the outputs satisfies a predetermined noise removal condition.

In the above case, the noise detecting means may be adapted to determine that the noise is included in each of the above-indicated at least one of the outputs, if the above-indicated value relating to the rotating speed satisfied a predetermined noise inclusion condition. In this instance, the predetermined noise removal condition and the predetermined noise inclusion condition are formulated such that both of these noise removal and inclusion conditions are not satisfied simultaneously under some conditions of the vehicle.

If the noise removal condition was satisfied immediately after the noise inclusion condition which has been satisfied becomes unsatisfied, the noise inclusion condition and the noise removal condition would be frequently alternately satisfied while the value relating to the rotating speed of the wheel in question is relatively close to the value of the noise inclusion or removal condition. In this case, the output of the vehicle speed detecting apparatus suffers from an undesirable hunting phenomenon. In the above arrangement wherein the noise inclusion and removal conditions are not simultaneously satisfied under some conditions of the vehicle, the noise removal condition will not be satisfied immediately after the noise inclusion condition becomes unsatisfied, whereby the apparatus is protected from the hunting phenomenon of its output.

It is generally desirable to formulate the noise inclusion and removal conditions such that the noise removal condition is not easily satisfied once the noise. Inclusion condition is satisfied.

The noise removal detecting means may comprise racing condition estimating means for determining whether there is a possibility of racing of an engine of the vehicle or not, and determining means for determining that the predetermined noise is satisfied, when the racing condition estimating means determines that there is not a possibility of the racing of the engine.

The noise may frequently be included in the outputs of the wheel speed detecting devices, when the engine races. If, therefore, there is no possibility of the engine racing, it means a very low possibility of the noise inclusion in the outputs of the wheel speed detecting devices, and indicates that the noise has been removed.

Where the noise detecting means determines that the noise is included in each of the above-indicated at least one of the outputs of the wheel speed detecting devices, if the value relating to the rotating speed satisfies a predetermined noise inclusion condition, the noise removal detecting means may be adapted to determine that the predetermined noise removal condition is satisfied, if at least one of the following conditions is satisfied: (a) the above-indicated value relating to the rotating speed remains to fail to satisfy the predetermined noise inclusion condition for more than a predetermined length of time; (b) any of the outputs of the wheel speed detecting devices which does not include the noise becomes higher than a predetermined value; and (c) the rotating speeds of the wheels detected by all of the wheel speed detecting devices remain to be zero for more than a predetermined length of time.

For example, the condition (a) is satisfied if a rate of change of the detected rotating speed which includes a noise remains to be lower than a predetermined value for more than a predetermined length of time. The noise removal detecting means determines the removal of the noise when the condition (a) is satisfied. In this case, the noise removal detecting means is considered to be the independent type noise removal detecting means as discussed above.

The condition (b) is satisfied if any detected rotating speed which does not include a noise exceeds the predetermined value, for example. In this case, the vehicle is considered to be in a running state, and the noise is considered to have been removed from all of the detected wheel speeds. The predetermined value may be 10 km/h, for example. In the present case, the noise removal detecting means is considered to be the overall type noise removal detecting means as discussed above. While the vehicle is running, there is a low possibility of the engine racing. In this sense, the noise removal detecting means is considered to be of a type adapted to determine that the noise has been removed, if there is not a possibility of the engine racing.

The condition (c) is satisfied if all of the detected rotating speeds remain to be zero for more than a predetermined length of time. In this respect, the noise removal detecting means is considered to be the independent type noise removal detecting means. However, the condition (c) that all of the detected rotating speeds remain to be zero for more than the predetermined length of time is equivalent to a condition that the detected highest wheel speed remains to be zero for more than the predetermined length of time. In this sense, the noise removal detecting means is considered to be the overall type noise removal detecting means.

The vehicle speed estimating means may be adapted to estimate the running speed of the vehicle according to the predetermined rule on the basis of selected at least one of the rotating speeds of the wheels detected by the wheel speed detecting devices while the noise detecting means determines that the noise is not included in the above-indicated at least one of the outputs of the wheel speed detecting devices. In this instance, the rule changing means of the vehicle speed estimating means comprises at least one of (a) first estimating means for estimating the vehicle running speed on the basis of at least one of the rotating speeds of the wheels except the selected at least one rotating speed, (b) second estimating means for estimating the vehicle running speed to be zero, and (c) third estimating means for estimating the vehicle running speed to be equal to a value which has been estimated last before the noise detecting means determines that the noise is included in the selected at least one rotating speed. The first, second and third estimating means are activated when the noise detecting means has determined that the noise is included in the selected at least one rotating speed.

In the above arrangement, the first estimating means of the rule changing means may comprise at least one of (i) estimating means for estimating the vehicle running speed of the vehicle on the basis of a lowest one of the above-indicated at least one of the rotating speeds of the wheels except the selected at least one rotating speed, (ii) estimating means for estimating the vehicle running speed on the basis of an intermediate one of the above-indicated at least one of the rotating speeds of the wheels except the selected at least one rotating speed, and (iii) estimating means for estimating the vehicle running speed on the basis of the above-indicated at least one of the rotating speeds of the wheels except the selected at least one rotating speed.

Where the reference speed selecting means discussed above comprises the abnormal speed detecting means described above, the rule changing means may comprise zeroing means for estimating the vehicle running speed to be zero if a sum of the number of the above-indicated at least one abnormal wheel speed detected by the abnormal speed detecting means and the number of at least one of the detected rotating speeds which includes a noise is larger than a predetermined value.

If a relatively large number of the wheel speed detecting devices suffer from electrical disconnection or inclusion of a noise in their outputs, the vehicle speed cannot be estimated with high accuracy. In this case, the vehicle speed is desirably estimated to be zero under some situations. Where the vehicle is provided with four wheel speed detecting devices, the above-indicated relatively large number may be three or four, for example.

The zeroing means of the rule changing means may be adapted to estimate the vehicle speed to be zero only when the number of the at least one of the detected rotating speeds which includes a noise is one or more.

According to a yet further preferred form of the present apparatus, each of the plurality of wheel speed detecting devices includes a rotary member rotatable with the corresponding wheel, and a detecting portion which is fixed to a body of the motor vehicle and which provides an output signal indicative of a periodic change of a distance between the rotary member and the detecting portion.

In one arrangement of the above apparatus, the rotary member is made of a magnetic material, and the detecting portion includes a magnetic force generator and a coil which generates as the output signal an alternate current according to a periodic change of a magnitude of a magnetic flux with the periodic change of the distance between the rotary member and the detecting portion.

In the above preferred form of the apparatus, the rotating speed of each wheel is detected on the basis of a periodic change of the distance between the rotary member rotating with the wheel and the detecting portion fixed to the vehicle body. If relative vibration occurs between the vehicle body and the wheel, a noise may possibly be included in the detected wheel speed. The detecting portion is connected to suitable wheel speed calculating means, which may be adapted to calculate the wheel speed based on the frequency of the output signal received from the detecting portion. The wheel speed calculating means provides an output signal indicative of the wheel speed. This output signal is considered as the output of the wheel speed detecting device. The noise generated by the relative vibration indicated above influences the output signal of the calculating means, that is, the output of the wheel speed detecting device. Usually, the wheel speed is detected by the wheel speed detecting device of electromagnetic magnetic pick-up type using a magnetic force generator and a coil as described above. In this case, the wheel speed is calculated on the basis of the frequency of the alternate current generated by the coil.

In the case where the noise detecting means comprises the reference speed selecting means which comprises the abnormal speed detecting means for detecting at least one abnormal wheel speed as described above, the abnormal speed detecting means may be adapted to detect the abnormal wheel speed if the alternate current as the output signal of the wheel speed detecting device is absent.

If the alternate current is absent when the vehicle is running, it indicates that the wheel speed detecting device suffers from some defects such as electrical disconnection. When the coil of the wheel speed detecting device normally generates the alternate current, the output signal indicative of this alternate current necessarily crosses the threshold. If the output signal crossing the threshold is absent for more than a predetermined time, it means that the alternate. Current is absent.

According to still another preferred form of the present invention, the vehicle speed detecting apparatus further comprises vehicle speed supplying means for applying an output of the vehicle speed estimating means to at least one external device which is provided on the motor vehicle and outside the vehicle speed detecting apparatus.

The motor vehicle may include various devices external to the vehicle speed detecting apparatus. For example, such external devices: include drive system control devices such as an engine control device, a drive force distribution control device and a transmission control device; steering system control devices such as a rear steering angle control device; suspension system control devices; braking system control devices such as an anti-lock braking pressure control device and a traction control device; navigator control devices; and a speedometer for indicating the running speed of the vehicle.

Where the vehicle speed estimated by the vehicle detecting apparatus is supplied to an external device, the external device is not required to estimate the vehicle speed, whereby the control program used by the external device can be accordingly simplified. Where the vehicle speed estimated by the present apparatus is supplied to two or more external devices, these external devices are not required to be provided with their own devices for estimating the vehicle speed independently of each other, whereby the cost of manufacture of the vehicle is reduced owing to the use of the single vehicle speed detecting apparatus.

Further, the output of the noise detecting means and the outputs of the wheel speed detecting devices as well as the output of the vehicle speed estimating means may be supplied to the desired external device or devices. This arrangement permits simplification of the control programs used by these external devices, improvement in the accuracy of control operations performed by the external devices, and further reduction of the cost of manufacture of the vehicle.

The engine control device may be an integrated control type capable of performing various controls (e.g., fuel injection control, ignition timing control, knocking-prevention control, idling speed control) in a coordinated fashion, or an independent control type adapted to performing such controls independently of each other.

Where the vehicle speed supplying means is adapted to apply the output of the vehicle speed estimating means to a plurality of external devices, the present vehicle speed detecting apparatus may further comprise signal processing means for processing the output of the vehicle speed estimating means, and control means for controlling the signal processing means depending upon the external devices to which the output of the vehicle speed estimating means is applied.

The signal processing means may be a filter adapted to filter the output of the vehicle speed estimating means.

Where the output of the vehicle estimating means is applied to two or more external devices, the same vehicle speed value may be supplied to all of these external devices, or alternatively different vehicle speed values may be supplied to the respective external devices. In the case where the output of the vehicle speed estimating means is applied to an anti-lock braking pressure control device and a speedometer of the vehicle, for example, it is desirable that the detection delay of the vehicle speed used for the anti-lock braking pressure control device be desirably small even at the cost of a relatively large amount of deviation of the estimated vehicle speed from the actual value, for improving the response of the anti-lock braking pressure control. To this end, it is desirable to process the output of the vehicle speed estimating means with a relatively small number of signal filtering operations or by using a filter having a relatively small filtering effect. For the speedometer, on the other hand, it is desirable that the amount of deviation of the vehicle speed supplied to the speedometer be small. To this end, it is desirable to process the output of the vehicle speed estimating means with a relatively large number of filtering operations or by using a filter having a relatively large filtering effect. While the filtering process may be achieved within the individual external devices, it may be achieved within the vehicle speed detecting apparatus. The signal processing means and the control means may be incorporated in the vehicle estimating means or in the vehicle speed supplying means.

According to a second aspect of the present invention, there is provided an apparatus for performing at least one of an anti-lock braking pressure control and a traction control of a motor vehicle, comprising a vehicle speed detecting apparatus constructed according to the first aspect of the invention described above.

Since the vehicle speed detecting apparatus according to the first aspect of this invention is adapted to estimate the vehicle running speed on the basis of the detected speeds of the vehicle wheels, the vehicle speed detecting apparatus may be suitably used as part of an anti-lock braking pressure control apparatus and/or a traction control apparatus for the vehicle, which requires the use of both the wheel speeds and the vehicle running speed for performing the anti-lock braking pressure control and/or the traction control. Further, the output of the vehicle speed detecting apparatus may be used for an external device or devices other than the anti-lock braking pressure and traction control apparatuses. In this case, it is not necessary to provide an exclusive vehicle speed detecting apparatus or apparatuses for the external device or devices, whereby the cost of the vehicle may be accordingly reduced.

Where the traction control is performed on the basis of the vehicle running speed estimated by the vehicle speed estimating means and the output of the noise detecting means, the traction control may be initiated if the driving slip amount of the drive wheels is excessively large while no noise is included in the speeds of the drive wheels. This arrangement is effective to prevent erroneous initiation of the traction control due to the inclusion of the noise in the detected drive wheel speeds.

According to a third aspect of the present invention, there is also provided a motor vehicle having four drive wheels, comprising a vehicle speed detecting apparatus constructed according to the first aspect of the invention described above.

During racing of the vehicle engine, the drive system of the vehicle are likely to suffer from resonance, and the detected speeds of the drive wheels are likely to include a noise. In a two-wheel drive vehicle, a determination as to whether a noise is included in the detected wheel speeds may be made with high reliability by comparing the detected speeds of the drive wheels and those of the non-drive wheels. In a four-wheel drive vehicle, on the other hand, the determination of the noise inclusion in the detected wheel speeds cannot be made as in the two-wheel drive vehicle, and some special measures are necessary for accurate determination of the noise inclusion.

According to a fourth aspect of the present invention, there is also provided a vehicle speed detecting apparatus, comprising: (a) a plurality of wheel speed detecting devices which correspond to respective groups of wheels of a motor vehicle each group consisting of at least one wheel and each of which detects a rotating speed of each wheel of the corresponding group; (b) designating means for designating at least one of the wheel speed detecting devices as at least one designated wheel speed detecting devices; (c) vehicle speed estimating means for estimating a running speed of the vehicle on the basis of at least one rotating speed detected by the above-indicated at least one designated wheel speed detecting device designated by the designating means; and (d) noise detecting means for determining whether a noise is included in each of outputs of the plurality of wheel speed detecting devices, and wherein the designating means selects as the above-indicated at least one designated wheel speed detecting device from the wheel speed detecting devices whose outputs do not include a noise according to the determination by the noise detecting means.

A noise if included in the detected wheel speeds will cause erroneous estimation of the vehicle speed on the basis of the detected wheel speeds. To avoid the erroneous estimation, it is desirable that the vehicle speed be desirably estimated on the basis of the detected wheel speeds which do not include a noise.

The noise detecting means used in the present apparatus according to the fourth aspect of the invention is considered to be the independent type noise detecting means described above with respect to the apparatus according to the first aspect of the invention. The designating means is adapted to select at least one designated wheel speed detecting device on the basis of a result of the determination by the noise detecting means, and can therefore considered to be the rule changing means of the vehicle speed estimating means as described above with respect to the first aspect of this invention, which is adapted to change the vehicle speed estimation rule depending upon whether the noise is included in the outputs of the wheel speed detecting devices.

In one preferred form of the present apparatus described above, the plurality of wheel speed detecting devices include at least one predetermined wheel speed detecting device, and the designating means selects the above-indicated at least one predetermined wheel speed detecting device as the above-indicated at least one designated wheel speed detecting device when the noise detecting means determines that the noise is included in none of the outputs of the plurality of wheel speed detecting devices.

Each of the at least one predetermined wheel speed detecting device each used as the designated wheel speed detecting device may be the wheel speed detecting device for the wheel disposed at a predetermined position, e.g., front wheel or rear wheel, or the wheel speed detecting device whose output represents the highest, lowest or intermediate one of the detected wheel speeds. In the latter case, the predetermined wheel speed detecting device is determined, according to a suitable rule for improved accuracy of estimation of the vehicle speed. Where two or more wheel speed detecting devices are selected as the predetermined (designated) wheel speed detecting devices, the vehicle speed estimating means may estimate the vehicle speed on the basis of an average or a lowest one of the wheel speeds detected by these two or more predetermined or designated wheel speed detecting devices.

In one advantageous arrangement of the above preferred form of the apparatus according to the fourth aspect of this invention, the wheels of the motor vehicle consist of at least one drive wheel and at least one non-drive wheel, and the plurality of wheel speed detecting devices consist of at least one drive wheel speed detecting device for detecting the rotating speed of each drive wheel and at least one non-drive wheel speed detecting device for detecting the rotating speed of each non-drive wheel. In this case, the at least one predetermined wheel speed detecting device consists of the at least one drive wheel speed detecting device.

Each predetermined wheel speed detecting device indicated above may be the wheel speed detecting device for the drive wheel or non-drive wheel. In the present arrangement, however, the wheel speed detecting devices for the drive wheel or wheels is/are selected as the predetermined or designated wheel speed detecting device or devices, so that the vehicle speed is estimated by the detected speed or speeds of the drive wheel or wheels. Where the present apparatus comprises vehicle speed supplying means for applying the output of the vehicle speed estimating means to a speedometer of the vehicle, the wheel speed detecting devices for the drive wheels are selected as the predetermined wheel speed detecting devices. For accurate indication of the vehicle running speed on the speedometer, the vehicle speed is desirably estimated on the basis of the speeds of the non-drive wheels. In the present arrangement, however, the vehicle speed estimated based on the speeds of the drive wheels is supplied to the speedometer, so that the output of the vehicle speed estimating means is compatible with a conventional speedometer which is adapted to receive the vehicle speed as detected at the drive axle of the vehicle, and is also compatible with the conventional accuracy evaluation standard of the speedometer used during inspection of the vehicle.

The above-indicated at least one drive wheel speed detecting device may be adapted to detect the speed of each of the drive wheels or an average of the speeds of the drive wheels.

The above-indicated predetermined wheel speed detecting device may be the wheel speed detecting device or devices for the non-drive wheel or wheels. From the technical standpoint, the accuracy of estimation of the vehicle speed is higher when the estimation is based on the speeds of the non-drive wheels than on the speeds of the drive wheels.

According to a fifth aspect of this invention, where is provided a vehicle speed detecting apparatus, which comprises: a plurality of wheel speed detecting devices for detecting rotating speeds of a plurality of wheels of a motor vehicle, respectively; vehicle speed estimating means for estimating a running speed of the vehicle on the basis of at least one of the rotating speeds of the wheels detected by the plurality of wheel speed detecting devices; and vehicle speed supplying means for applying an output of the vehicle speed estimating means to a plurality of external devices.

The present apparatus eliminates an exclusive vehicle speed apparatus for each of the external devices, respectively, and is advantageous for reducing the cost of manufacture and weight of the vehicle, particularly where the output of the vehicle speed estimating means is used for two or more external devices, particularly, for three or more external devices.

According to a sixth aspect of the present invention, there is also provided a wheel speed detecting apparatus, comprising: (a) a plurality of wheel speed detecting devices for detecting rotating speeds of a plurality of wheels of a motor vehicle, respectively; (b) noise detecting means for determining whether a noise is included in each of outputs of the plurality of wheel speed detecting devices; and (c) wheel speed estimating means for estimating at least one of actual rotating speeds of the wheels on the basis of an output of the noise detecting means and the rotating speeds detected by the plurality of wheel speed detecting devices.

The wheel speeds as detected by the wheel speed detecting devices do not represent the actual rotating speeds of the wheels, if the detected wheel speeds include a noise. If the actual wheel speeds are estimated based on the detected wheel speeds including the noise, the estimated actual wheel speeds are erroneous. In the present wheel speed detecting apparatus, the actual wheel speeds are estimated on the basis of the result of the noise detecting means as well as the wheel speeds as represented by the outputs of the wheel speed detecting devices, whereby the erroneous estimation of the actual wheel speeds due to the noise inclusion in the outputs of the wheel speed detecting devices is effectively avoided.

On the other hand, the wheel speeds as detected by the wheel speed detecting devices during excessive slipping of the wheels represent the actual rotating speeds of the wheels. For accurate estimation of the actual wheel speeds, the estimation should be made depending upon whether a noise is included in the outputs of the wheel speed detecting devices. However, the accurate estimation of the actual wheel speeds does not require determination as to whether the wheels have excessive amounts of slip.

According to a seventh aspect of this invention, there is provided a vehicle speed detecting apparatus comprising vehicle speed estimating means for estimating a running speed of the motor vehicle, on the basis of the above-indicated at least one of the actual rotating speeds of the wheels estimated by the wheel speed estimating means of a wheel speed detecting apparatus according to the sixth aspect of the invention described above.

According to a further aspect of this invention, there is provided an apparatus for supplying speed data to at least one external device, comprising a vehicle speed detecting apparatus according to the seventh aspect of the invention described above, and speed data supplying means for applying an output of the wheel speed estimating means and an output of the vehicle speed estimating means to each of the above-indicated at least one external device.

Where a certain external device is adapted to obtain an amount of slip of a vehicle wheel, the output of the vehicle speed estimating means and the output of the wheel speed estimating means may be used. In this case, however, the external device may suffer from erroneous detection of an excessive amount of traction slip of the wheel (drive wheel). Namely, the excessive traction slip of the drive wheel may be erroneously detected if the detected wheel speed is increased due to a noise included therein and excessively deviates from the detected vehicle speed.

In the present apparatus, the output of the wheel speed estimating means which is applied to the external device does not include a noise, so that the external device does not suffer from erroneous detection of excessive slip of the wheel when the wheel slip is obtained on the basis of the actual wheel speed and vehicle speed estimated by the wheel speed estimating means and vehicle speed estimating means.

The present apparatus is particularly effective when the outputs of the wheel speed estimating means and the vehicle speed estimating means are applied to a traction control device as the external device. The traction control, which is initiated upon detection of an excessive amount of traction slip of the drive wheels, is performed such that the amount of the traction slip of the drive wheels is held within a permissible range. Where the wheel speed detecting apparatus does not include noise detecting means, the noise included in the output of the wheel speed detecting apparatus results in an increase in the detected wheel speed, which causes erroneous detection of an excessive amount of the traction slip of the drive wheels in the traction control device, while in fact no traction slip takes place on the drive wheels. In this case, the traction control is not effected correctly. In the present apparatus, however, the output of the wheel speed detecting apparatus which is applied to the traction control device is obtained by the wheel speed estimating means which estimates the actual wheel speed on the basis of the output of the noise detecting means as well as the wheel speeds as detected by the wheel speed detecting devices. According to this arrangement, the noise which may be included in the detected wheel speeds will not cause erroneous detection of excessive traction slip of the drive wheels in the traction control device. Accordingly, the present arrangement is effective to prevent erroneous traction control of the vehicle by the traction control device.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIGS. 4A and 4B are flow charts illustrating a vehicle speed estimating routine according to a control program stored in a ROM of the hydraulic control device including the vehicle speed detecting apparatus;

FIGS. 6A and 6B are flow charts illustrating a vehicle speed estimating routine used in another embodiment of the present invention;

FIG. 8 is a view indicating different methods of determining the final vehicle speed in the embodiment of FIGS. 7A and 7B;

DETAILED DESCRIPTION OF THE PREFERRED EMBODIMENT

Figure 1:
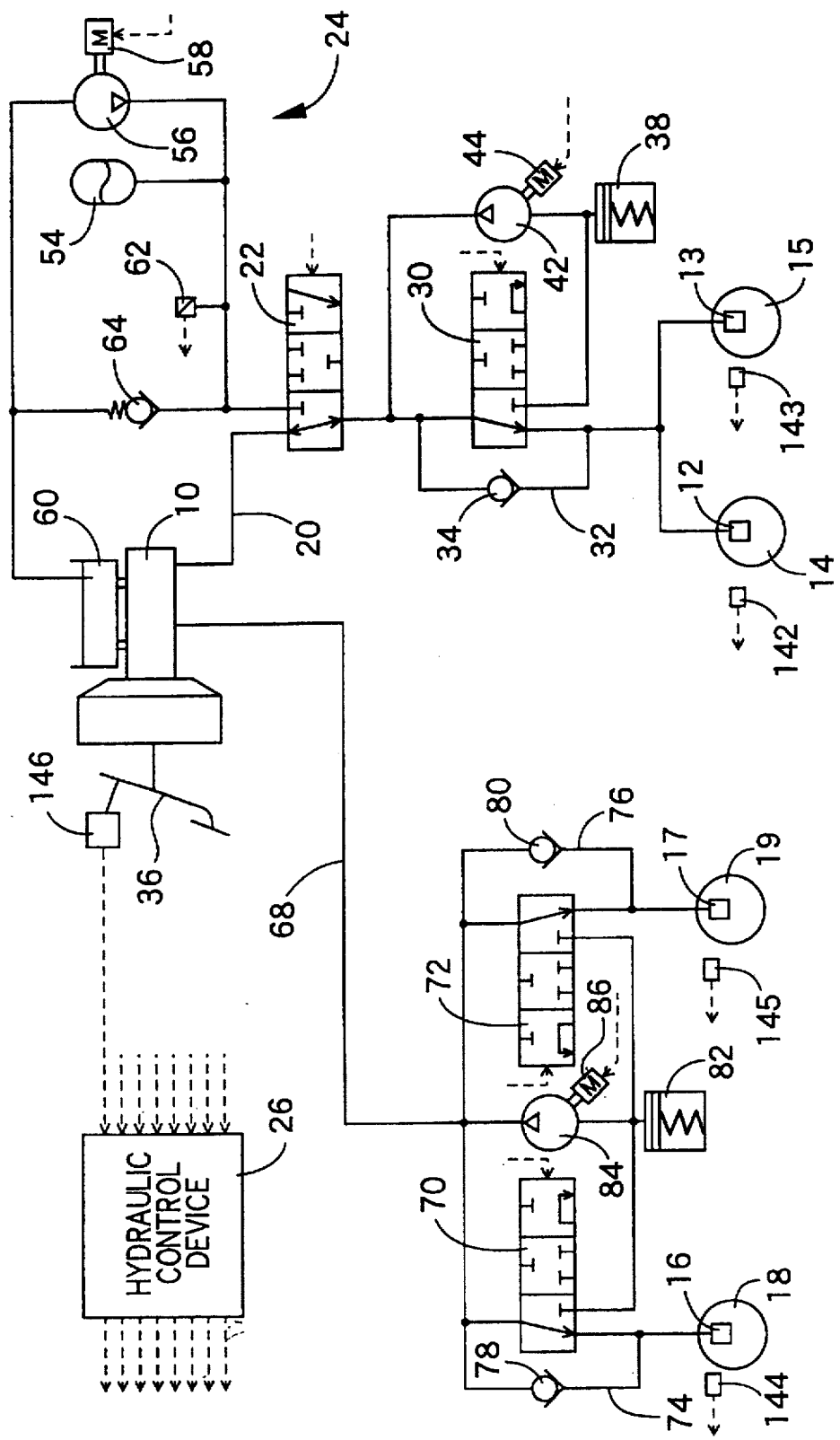
FIG. 1 is a schematic view of a hydraulic braking system provided with a hydraulic control device including a vehicle speed detecting apparatus constructed according to one embodiment of the present invention.
Figure 2:
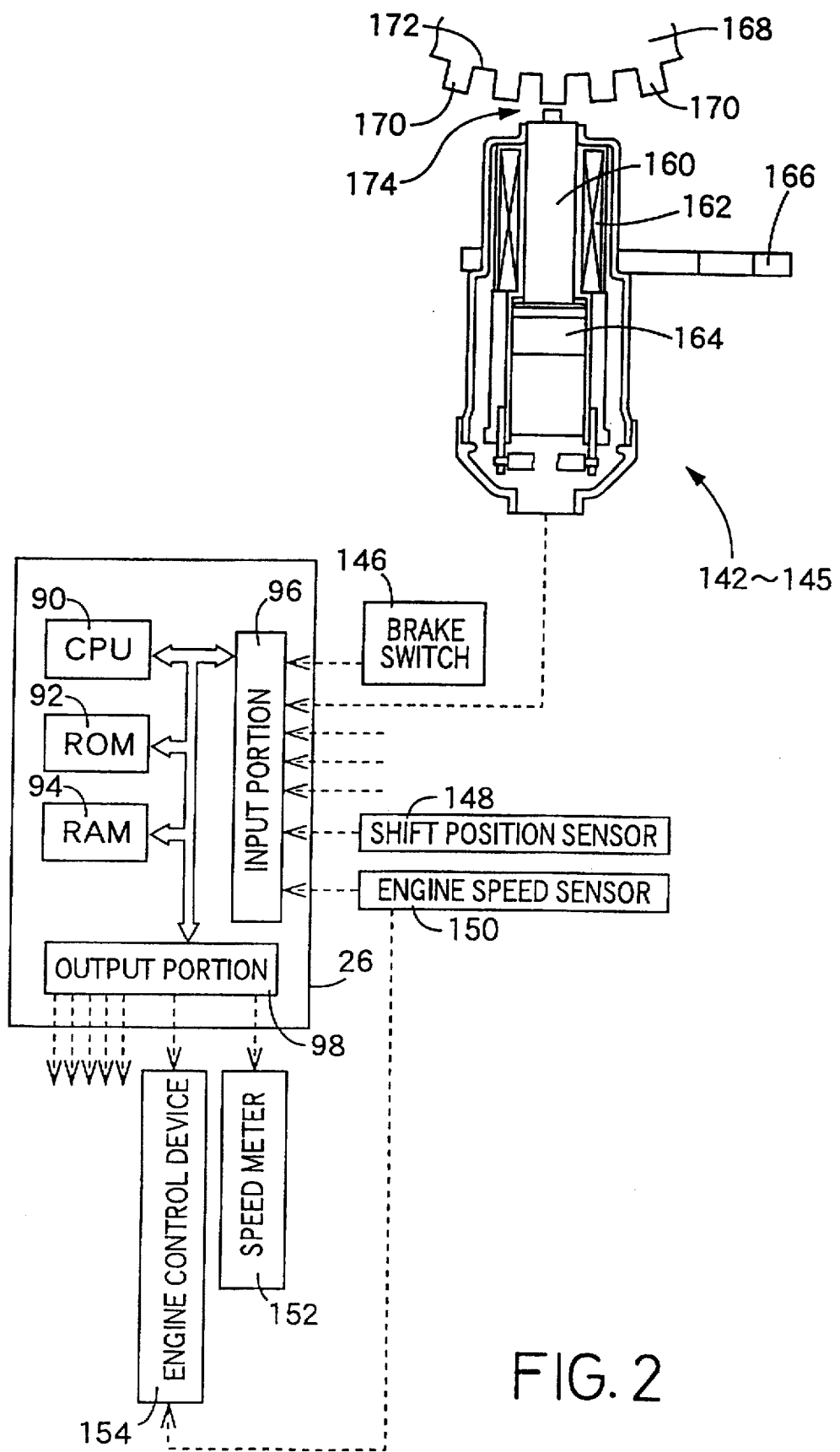
FIG. 2 is a view partly in cross section showing the hydraulic control device of the hydraulic braking system of FIG. 1, a wheel speed sensor and other components connected to the hydraulic control device.

Referring first to FIG. 1, there is shown a hydraulic braking system equipped with a hydraulic control which incorporates a vehicle speed detecting apparatus constructed according to one embodiment of this invention. The hydraulic braking system is adapted to be installed on a motor vehicle which includes an automatic transmission and which is driven by two rear wheels 14, 15.

In FIG. 1, reference numeral 10 denotes a master cylinder functioning as a primary hydraulic pressure source, and reference numerals 12 and 13 denote brake cylinders for the rear left and right drive wheels 14, 15, respectively. Reference numerals 16 and 17 denote brake cylinders for front left and right wheels 18, 19 which are driven or idler wheels.

The master cylinder 10 has two pressurizing chambers. A pressure of a working fluid generated in one of the pressurizing chambers is applied to the rear wheel brake cylinders 12, 13 through a fluid passage 20. A solenoid-operated three-position valve 22 is provided in the fluid passage 20. This three-position valve 22 has a first position, a second position and a third position. In the first position, the rear wheel brake cylinders 12, 13 are connected to the master cylinder 10. In the second position, the rear wheel brake cylinders 12, 13 are disconnected from both the master cylinder 10 and a secondary hydraulic pressure source 24. In the third position, the rear wheel brake cylinders 12, 13 are disconnected from the master cylinder 10, and are connected to the secondary hydraulic pressure source 24. The solenoid-operated three-position valve 22 is normally placed in the first position with a solenoid coil in a de-energized state, and is selectively placed in the second or third position by changing the amount of an electric current to be applied to the solenoid coil in two steps. The solenoid coil is controlled by a suitable driver circuit as well known in the art, in response to a control command received from the hydraulic control device 26 which will be described in detail.

Another solenoid-operated three-position valve 30 is provided a portion of the fluid passage 20 between the rear wheel brake cylinders 12, 13 and the three-position valve 22. A by-pass passage 32 is connected to the fluid passage 20, so as to by-pass the three-position valve 30. This by-pass passage 32 is provided with a check valve 34. The three-position valve 30 has a pressure increase position for connecting the rear wheel brake cylinders 12, 13 to the master cylinder 10, a pressure hold position for disconnecting the rear wheel brake cylinders 12, 13 from both the master cylinder 10 and a reservoir 38, and a pressure decrease position for disconnecting the rear wheel brake cylinders 12, 13 from the master cylinder the three-position valve 30 is selectively placed in these three positions so as to control the pressures in the brake cylinders 12, 13 for the rear drive wheels 14, 15 in a so-called "Select-Low Control" manner such that the pressures in the rear wheel brake cylinders 12, 13 are controlled so as to optimize the slip amount of one of the rear wheels 14, 15 which is running on a road surface area having a lower friction coefficient than a road surface area on which the other rear wheel is running.

The check valve 34 permits a flow of the fluid in a direction from the rear wheel brake cylinders 12, 13 to the master cylinder 10, and inhibits a flow of the fluid in the reverse direction. The by-pass passage 32 and the check valve 34 are provided for rapidly returning the fluid from the rear wheel brake cylinders 12, 13 to the master cylinder 10 when a brake pedal 36 is released. These by-pass passage 32 and check valve 34 also function to permit the fluid to be returned from the rear wheel brake cylinders 12, 13 to the master cylinder 10 to reduce the pressures in the brake cylinders 12, 13 when the brake pedal 36 is moved toward the non-operated position while the three-position valve 30 is placed in the hold position (in which the brake cylinders 12, 13 are disconnected from the master cylinder 10 and the reservoir 38) during operation of the hydraulic braking system in an anti-lock fashion.

The reservoir 38 is connected to the fluid passage 20 through a pump 42, so that a fluid stored in the reservoir 38 is pumped up by the pump 42 and returned to the master cylinder 10. The pump 42 is driven by a motor 44, which is controlled by a driver circuit in response to a control command received from the hydraulic control device 26. The motor 44 is kept operated throughout an anti-lock or traction control operation of the braking system.

The secondary hydraulic pressure source 24 includes an accumulator 54, a pump 56 and a pump motor 58. With the pump 56 driven by the motor 58, a working fluid stored in a reservoir 60 attached to the master cylinder 10 is pressurized, and the pressurized fluid is stored in the accumulator 54. The pressure in the accumulator 54 is detected by a pressure sensor 64, and the motor 58 is controlled so that the detected pressure in the accumulator 54 is held within a predetermined range. A pressure relief valve 64 is provided between the secondary hydraulic pressure source 24 and the reservoir 60, so as to prevent the pressure in the accumulator 54 to exceed a predetermined upper limit even if the pressure sensor 64 is defective.

The other chamber of the master cylinder 10 is connected through a fluid passage 68 to the brake cylinders 18, 19 for the front idler wheels 16, 17. Two solenoid-operated three-position valves 70, 72 are provided in the fluid passage 68. These three-position valves 70, 72 have the pressure increase, hold and decrease positions as described above with respect to the three-position valve 30. By-pass passages 74, 76 are connected to the fluid passage 68, so as to by-pass the three-position valves 70, 72, respectively. These by-pass passages 74, 76 are provided with respective check valves 78, 80. A reservoir 82 is connected to the fluid passage 68 through a pump 84, which is driven by a motor 86.

The pressures in the front wheel brake cylinders 18, 19 are controlled independently of each other when the braking system is operated in the anti-lock fashion. To this end, the two solenoid-operated three-position valves 70, 72 are controlled independently of each other, with their solenoid coils energized by respective driver circuits in response to control commands received from the hydraulic control device 26.

The hydraulic control device 26 consists principally of a microcomputer incorporating a central processing unit (CPU) 90, a read-only memory (ROM) 92, a random-access memory (RAM) 94, an input portion 96 and an output portion 98. To the input portion 96, there are connected wheel speed sensors 142-145 for detecting the rotating speeds of the wheels 14, 15, 18, 19, a brake switch 146 for detecting an operation of the brake pedal 36, a shift position sensor 148 for detecting a currently selected position of a shift lever for the automatic transmission, and an engine speed sensor 150 for detecting the rotating speed of the output shaft of an engine of the vehicle. To the output portion 98, there are connected the solenoid coils of the solenoid-operated three-position valves 20, 30, 70, 72 through respective driver circuits. Also connected to the output portion 98 are a speedometer 152 for indicating the running speed of the vehicle, and an engine control device 154 for controlling the engine. The engine speed sensor 150 is also directly connected to the input portion of the engine control device 154.

Figure 4B:
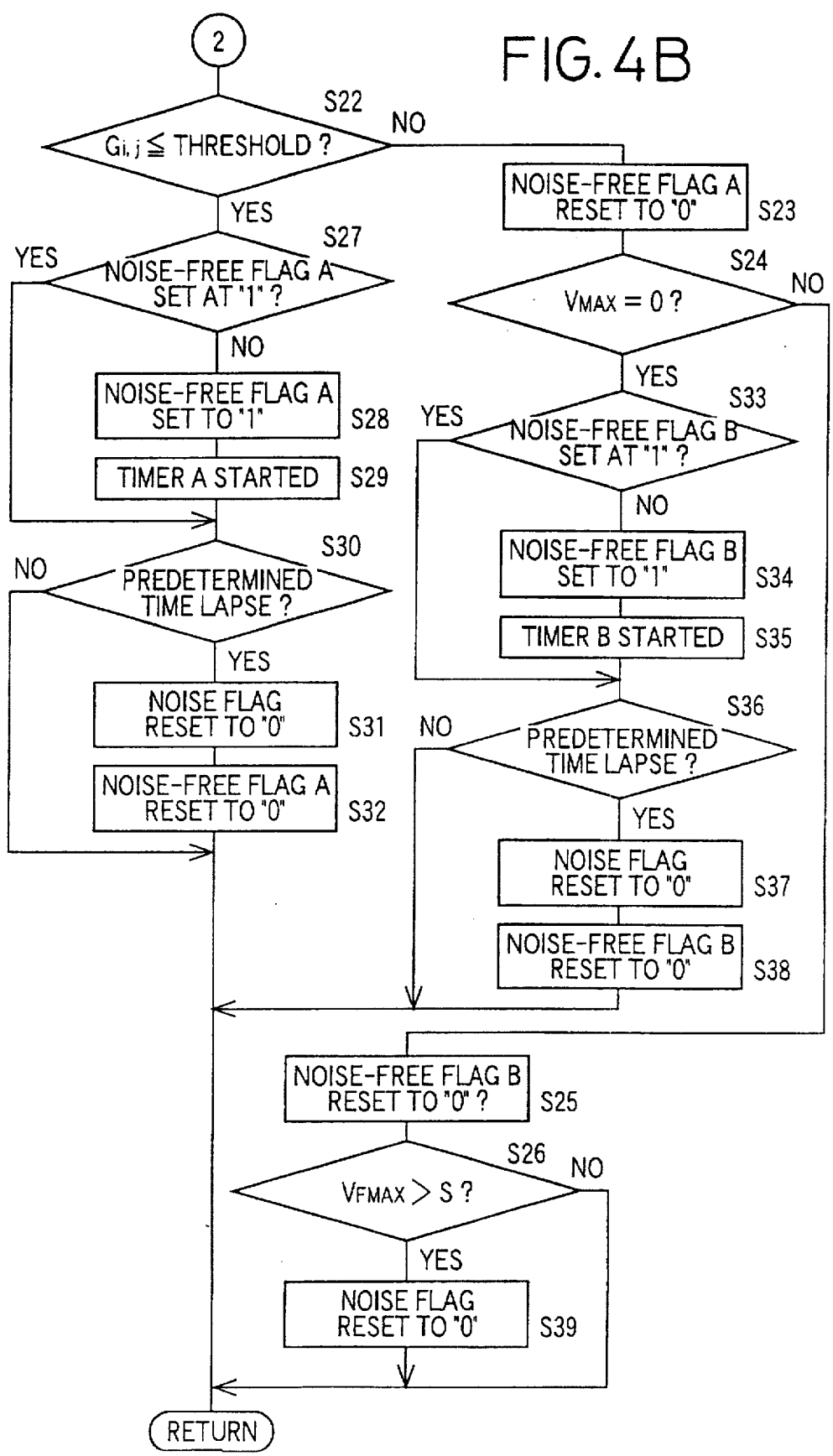

The ROM 92 of the hydraulic control device 26 stores various control programs such as those for executing a vehicle speed estimating routine illustrated in the flow chart of FIGS. 4A and 4B, an anti-lock braking pressure control routine and a traction control routine. The RAM 94 includes a provisional speed memory for storing a provisional vehicle speed and a final speed memory for storing a final vehicle speed, which speeds will be described.

The vehicle speed detecting apparatus incorporated in the hydraulic control device 26 is adapted to estimate the running speed of the vehicle or determine the final vehicle speed, according to the vehicle speed estimating routine of FIGS. 4A and 4B, on the basis of the speeds of the wheels 14, 15, 18, 19 detected by the wheel speed sensors 142-145, and the determined final vehicle speed is stored in the final speed memory of the RAM 94. The final speed stored in the final speed memory is fed to the speedometer 152 and engine control device 154, and is also used by the hydraulic control device 26 to execute the anti-lock braking pressure control routine and traction control routine. As described below in detail, the vehicle speed detecting apparatus is adapted to detect a noise to be included in or superimposed on the wheel speeds as detected by the wheel speed sensors 142-145, and a result of this noise detection is utilized or taken into account in the traction control routine.

To regulate the pressures in the brake cylinders 12, 13, 16, 17 in the anti-lock fashion, the solenoid-operated three-position valves 30, 70, 72 are selectively placed in the pressure increase, hold and decrease positions according to the anti-lock braking pressure control routine, so that the amounts of slip of the wheels 14, 15, 18, 19 during braking of the vehicle (which will be referred to as "braking slip amounts") are held within a predetermined optimum range. The anti-lock braking pressure control routine is initiated when a slip amount S of the wheel in question exceeds a sum of a slip amount $\Delta V_{SN}$ and a predetermined amount $\Delta V_R$, where the slip amount $\Delta V_{SN}$ +lis a slip amount of the wheel at the time when the deceleration value (negative acceleration value) of the wheel exceeds a predetermined threshold.

The traction control of the rear drive wheels is effected according to the traction control routine, in which the three-position valve 30 is suitably placed in the pressure increase, hold and decrease positions with the three-position valve 22 held in the third position, so that the fluid pressures in the rear wheel brake cylinders 12, 13 are regulated so as to optimize the amounts of slip of the rear wheels 14, 15 (which will be referred to as "traction slip amounts"). In the present embodiment, the traction control routine is initiated when the traction slip amount of one of the rear wheels 14, 15 becomes excessive, that is, when the rotating speed of the rear wheel 14, 15 in question becomes higher than a threshold value which is determined on the basis of the vehicle speed. However, the traction control routine is not executed even when the above condition is satisfied, if the inclusion of a noise in the detected speed of any wheel is detected.

The wheel speed sensors 142-145 are of an electromagnetic pick-up type. Each wheel speed sensor 142-145 includes a yoke 160, a coil 162, and a permanent magnet 164, and is secured to a bracket 166 fixed to a suitable member of the vehicle body. The wheel speed sensor is positioned such that the end face of the yoke 160 remote from the permanent magnet 164 is located adjacent to the periphery of a rotor 168, which is made of a magnetic material and fixed to the appropriate wheel 14, 15, 18, 19 such that the rotor 168 rotates with the wheel. The rotor 168 has a multiplicity of detector teeth consisting of crests 170 and roots 172 formed along its periphery.

A magnetic flux is formed by the permanent magnet 164, so as to pass through the yoke 160, a gap 174 and the rotor 168. The amount of the gap 174 between the teeth 170, 172 of the rotor 168 and the end face of the yoke 160 periodically changes during rotation of the rotor 168, whereby an alternate voltage is generated by the coil 162 due to the changing amount of the gap 174. The frequency of the alternate voltage generated by the coil 162 increases as the rotating speed of the rotor 168 (i.e., rotating speed of the wheel 14, 15, 18, 19) increases.

The alternate voltage may be generated by the coil 162 in the electromagnetic pick-up type wheel speed sensors 142-145, without actual rotation of the rotor 168, in the event of a resonance occurring in the vehicle drive system, for example. The resonance in the drive system may cause relative vibration of the vehicle body members and the wheels. In this case, the distance between the yoke 160 and the rotor 168 and therefore the amount of the above-indicated gap 174 periodically change, causing the coil 162 to generate an alternate voltage, which results in an output of the wheel speed sensor 142-145 indicative of the rotating speed of the wheel which is not zero. The resonance in the drive system may arise from racing of the vehicle engine, for instance. Where the amount of the gap 174 of the wheel speed sensor 142-145 changes due to the engine racing, the amount of change in the frequency of the alternate voltage generated by the coil 162 increases to a level which cannot be normally reached during running of the vehicle. In other words, the output of the wheel speed sensor 142-145 during the engine racing does not represent the actual rotating speed of the wheel, but merely indicates a noise caused by the engine racing. Namely, a noise is included in or superimposed on the wheel speed as detected by the wheel speed sensor 142-145.

Figure 3:
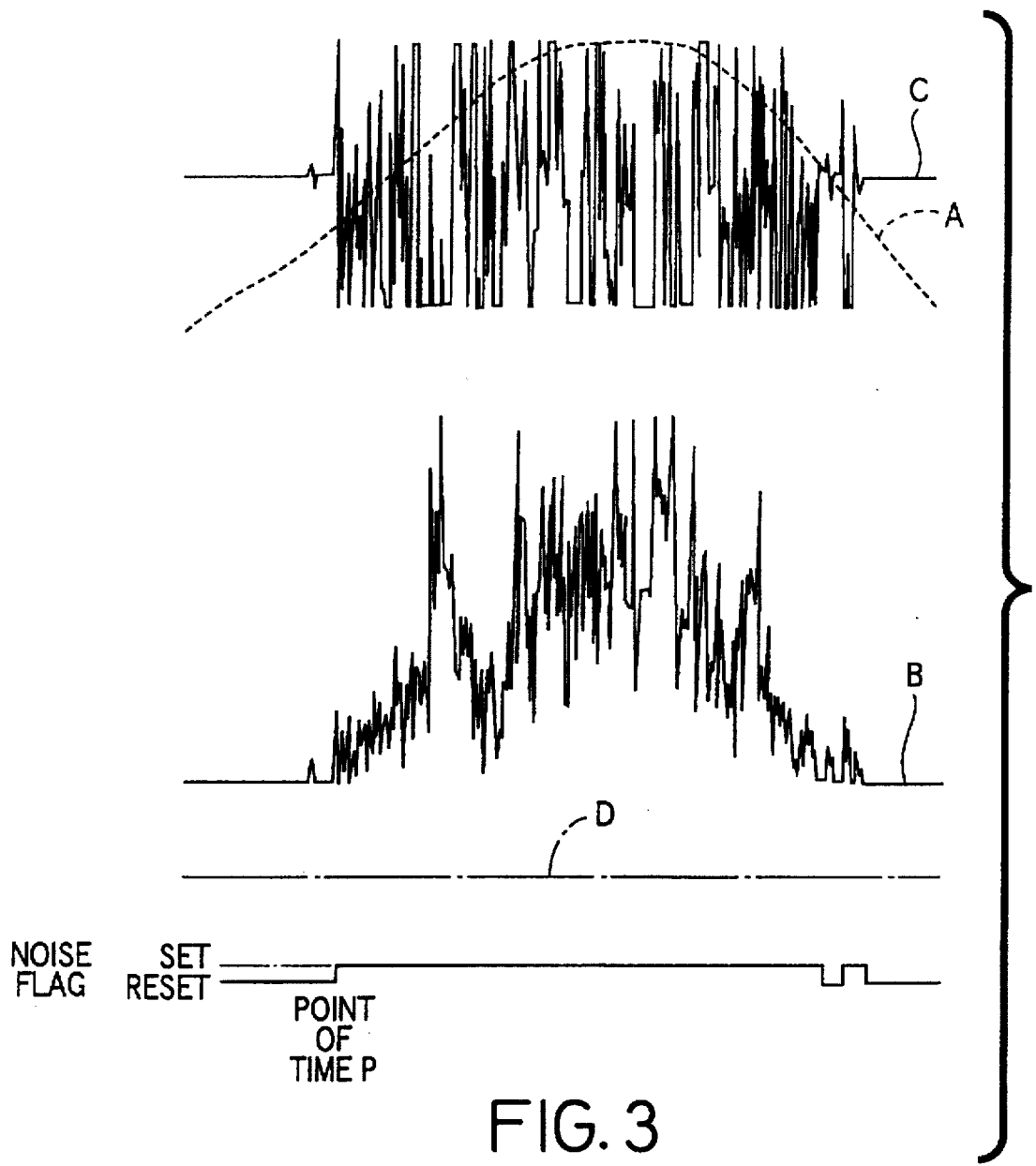
FIG. 3 is a view indicating a detected rear right wheel speed of a motor vehicle equipped with the hydraulic braking system of FIG. 1, which wheel speed is influenced by a noise.

Referring to FIG. 3, there is shown a condition of vibration generated in the vehicle drive system while the vehicle is stationary with an accelerator pedal being depressed. Dashed line A in FIG. 3 indicates the speed of the engine, while solid line B indicates the speed of the rear right wheel 15 as represented by the output of the wheel speed sensor 143. Solid line C in the figure indicates an acceleration of the wheel 15, that is, an amount of change or increase in the speed as represented by the output of the wheel speed sensor 143. This acceleration value is, obtained on the basis of the output of the wheel speed sensor 143 prior to a filtering process, and will be referred to as "pre-filtered acceleration value" of the wheel 15.

As the engine speed rises as indicated by the dashed line A, the speed of the wheel 15 as represented by the output of the wheel speed sensor 143 is larger than zero after a point of time P, as indicated by the solid line B, even when the wheel 15 is not actually rotating. This phenomenon is caused by a resonance occurring in the vehicle drive system due to racing of the engine, which in turn causes relative vibration of the vehicle body members and the wheel 15, resulting in a consequent noise superimposed on the output of the wheel speed sensor 143. If the vehicle speed was estimated on the basis of the wheel speed as represented by this output of the sensor 143, the estimated vehicle speed would be larger than zero, while the vehicle is in fact stationary.

To avoid the above drawback, the present embodiment is arranged to determine whether a noise is included in or superimposed on the rotating speed as represented by the output of any wheel speed sensor 142-145. If a decision that a noise is included in the output of the wheel speed sensor 142-145 is obtained, an estimation rule for estimating the vehicle speed on the basis of the outputs of the wheel speed sensors 142-145 is suitably changed. If a decision that a noise is not included in the wheel speed sensor output, the vehicle speed is estimated on the basis of an average of the rotating speeds of the two rear wheels 14, 15 as represented by the corresponding wheel speed sensors 142, 143. In the case where the noise is included in the wheel speed sensor output, the rotating speed as represented by the output of the wheel speed sensor 142-145 is changed according to a suitable rule, and the thus changed wheel speed is used to determine vehicle speed. Thus, the estimation rule for estimating or determining the vehicle speed on the basis of the outputs of the wheel speed sensors 142-145 is changed if the output of any wheel speed sensor is found to include a noise.

The speedometer 152 indicates the vehicle speed as determined by the vehicle speed detecting apparatus incorporated in the hydraulic control device 26. The vehicle speed indicated by the speedometer 152 is based on the rotating speeds of the rear drive wheels 14, 15, so that the output of the present vehicle speed detecting apparatus is compatible with a conventional speedometer which is adapted to receive the vehicle speed as detected at the drive axle of the vehicle, and is also compatible with the accuracy evaluation standard of the speedometer used during inspection of the vehicle.

The engine control device 154 is constructed to control the amount of injection of a fuel into the engine depending upon the vehicle speed, engine speed and other parameters. The amount of fuel injection is normally controlled according to the engine speed, but is controlled according to the vehicle speed if a racing state of the vehicle is detected, whereby excessive racing of the engine is prevented. During racing of the engine under a non-load condition, the amount of fuel injection would be excessive if the amount of fuel injection was controlled depending upon the engine speed. To avoid this drawback, the engine is controlled in an anti-racing mode so as to restrict the amount of fuel injection for preventing such excessive racing of the engine if the engine is found to be in a racing state. The engine is estimated to be in a racing state if the vehicle is stationary (if the vehicle speed is not higher than a predetermined threshold close to zero) and if the engine speed is not lower than predetermined threshold.

While the manner of changing the rule for estimating the vehicle speed will be described in detail by reference to the flow chart of FIGS. 14A and 14B illustrating the vehicle speed estimating routine, the estimation rules which are selectively used will be briefly explained.

Rule a

The vehicle speed is estimated to be an average of the rotating speeds of the two rear wheels 14, 15 as represented by the outputs of the wheel speed sensors 142, 143 for the rear wheels 14, 15, in the case where the two rear wheels 14, 14 are not subject to resonance due to racing of the engine, that is, where it is found that a noise is not included in the speeds of the rear wheels 14, 15 as represented by the rear wheel speed sensors 142, 143.

Rule b

In the case where it is found that a noise is included in only one of the rear wheel speeds as represented by the outputs of the rear wheel speed sensors 142, 143, and where the other rear wheel speed is found to be normal, the vehicle speed is estimated to be equal to that other rear wheel speed. In the case where the above-indicated other rear wheel speed is found abnormal, the vehicle speed is estimated according to the following Rule c:

Rule c

In the case where it is found that a noise is included in both of the rear wheel speeds as represented by the outputs of the rear wheel speed sensors 142, 143, and where the speeds of the front idler wheels 18, 19 as represented by the wheel speed sensors 144, 145 are found to be normal, the vehicle speed is estimated to be an average of the speeds of the two front wheels 18, 19 as represented by the wheel speed sensors 144, 145. In the case where the front wheel speeds are found abnormal, the vehicle speed is determined to be zero.

In the present embodiment, no determination is made as to whether the front wheels 18, 19 are subject to resonance, because the front wheels 18, 19 are not drive wheels but are driven or idler wheels. Further, a need to check if the idler wheels 18, 19 are subject to resonance is relatively low, since the vehicle speed is estimated in principle on the basis of the speeds of the rear drive wheels 14, 15.

Thus, the present embodiment is adapted to effect only the determination as to whether a noise is included in or superimposed on the outputs of the wheel speed sensors 142, 143 for the rear drive wheels 14, 15. In other words, the speeds of the rear wheels 14, 15 as detected by the wheel speed sensors 142, 143 are subjected to the determination as to whether a noise is included in the detected speeds. In this case, therefore, the speeds of the rear drive wheels (14, 15) are given higher priority than the speeds of the front non-drive or idler wheels (18, 19) in detecting the presence of a noise included in the detected wheel speeds.

The wheel speeds which are found normal means the wheel speeds as represented by the outputs of the corresponding wheel speed sensors 142–145 which are normally functioning. Conversely, the wheel speeds which are found abnormal means the wheel speeds as represented by the outputs of the corresponding wheel speed sensors 142, 145 which have some defects such as electrical disconnection. In the present embodiment, the wheel speeds detected by the wheel speed sensors are determined to be abnormal if no alternate voltage is generated at all by the coil 164 as the outputs of of the sensors.

The outputs of the wheel speed sensors 142–145 take the form of alternate voltage signals, and the normal waveform of the alternate voltage should necessarily cross the zero voltage level. Therefore, if no such waveform cross the zero voltage level is detected, or if the detection of the zero voltage level remains for a time longer than a predetermined value; it means that no alternate voltage is generated by the coil 164, and therefore indicates that the wheel speed sensor is suffering from some defect such as electrical disconnection. In this case, the outputs of the wheel speed sensors are not used in determining whether a noise is included in the outputs of the other wheel speed sensors, or in estimating the vehicle speed.

In the present embodiment, the determination as to whether a noise is included in the output of any wheel speed sensor 142–145 due to racing of the engine is effected when there is a possibility of the engine racing. This determination depends upon whether the above-indicated pre-filtered acceleration value of the wheel in question is higher than a predetermined upper limit.

The determination as to whether there is a possibility of the engine racing is effected depending upon whether the vehicle is stationary or running. Namely, a decision that there is a possibility of the engine racing is obtained if the vehicle is found to be stationary. In this respect, it is noted that the present hydraulic braking system including the hydraulic control device 26 is provided on a motor vehicle equipped with an automatic transmission, in which the engine may possibly race with the shift lever placed in a drive position as well as in a neutral or parking position, as long as a load acting on the engine is considerably small. In any event, there is a possibility of the engine racing when the vehicle is stationary or almost stopped.

The determination as to whether the vehicle is stationary is effected depending upon whether the higher one of the speeds of the front idler wheels 18, 19 as detected by the front wheel speed sensors 144, 145 is equal to or lower than a predetermined threshold level. The higher front wheel speed is used to improve the accuracy of determination as to whether the vehicle is stationary. Further, the speeds of the front wheels 18, 19 are used for the determination, since the front idler wheels 18, 19 are less likely to be subject to resonance, and the detected front wheel speeds are less likely to include a noise. In this respect, too, it is desirable to use the speeds of the front wheels 18, 19 to determine whether the vehicle is stationary or not. The predetermined threshold level is a front wheel speed below which the vehicle is considered to be stationary or almost stopped. The higher front wheel speed indicated above is considered to be a reference wheel speed used for determining whether a noise is included in the wheel speeds as detected by the wheel speed sensors 142, 143.

The above-indicated pre-filtered acceleration value of the wheel used to determine whether the vehicle is stationary increases to a considerable extent as indicated, by the solid line C in FIG. 3, if a noise due to the engine racing is included in or superimposed on the detected wheel speed. In the present specific example of FIG. 3, the maximal and minimal points of the acceleration value lie in straight lines. This indicates that the amplitude between the actual maximal and minimal points is larger than that shown in FIG. 3. The upper limit of the acceleration value indicated above is in the neighborhood of 12G, and is a value which may not take place during normal running of the vehicle.

The present embodiment is further adapted to determine whether a noise which was found to be included in the detected wheel speeds due to the engine racing has been removed. This determination of the noise removal is initiated upon determination that the noise is included in the detected wheel speed, and is continued until a decision that the noise has been removed is obtained. That is, the operation to effect the determination of the noise removal is terminated when the removal of the noise has been detected. The decision that the noise has been removed is obtained when any one of the following three conditions is satisfied:

Condition 1

The pre-filtered acceleration values of the rear wheels 14, 15 as detected by the wheel speed sensors 142, 143 both remain to be lower than the above-indicated predetermined upper limit for more than a predetermined length of time.

Condition 2

The highest one of the speeds of the four wheels as detected by the wheel speed sensors 142–145 remains to be zero for more than a predetermined length of time. In other words, the wheel speeds as represented by all of the wheel speed sensors remain to be zero for more than the predetermined length of time.

Condition 3

The higher one of the front idler wheels 18, 19 as detected by the wheel speed sensors 144, 145 is higher than a predetermined threshold.

If the Condition 1 or 2 is satisfied, it means that resonance in the vehicle drive system is considered to have been removed. If the Condition 3 is satisfied, it means that the possibility of the engine racing during running of the vehicle is considered to be low. Thus, the decision that the noise has been removed is obtained not only when the noise is considered to have been actually removed, but also when the possibility of the engine racing is considered to be low.

The hydraulic control device 26 uses a NOISE flag which is set to "1" when a noise included in the detected wheel speeds is detected and is reset to "0" when the removal of the noise is detected.

Referring next to the flow chart of FIGS. 4A and 4B, there will be described in detail the vehicle speed estimating routine which is executed by the vehicle speed detecting apparatus incorporated in the hydraulic control device 26 and which includes steps for detecting a noise included in the detected wheel speeds and steps for changing the estimation rule used by the vehicle speed detecting apparatus.

The vehicle speed estimating routine is initiated with step S11 to determine whether the NOISE FLAG is set at "1". If a negative decision (NO) is obtained in step S11, the control flow goes to step S12 to determine the provisional vehicle speed $V_{SP1}$ to be equal to an average of speeds $V_{RL}$ and $V_{RR}$ of the rear drive wheels 14, 15 as detected by the wheel speed sensors 142, 143. This provisional vehicle speed $V_{SP1}$ is stored in the provisional speed memory of the RAM 94. Step S12 is followed by step S13 to execute a noise detecting sub-routine for determining whether at least one of the rear left and right wheels 14, 15 is subject to resonance due to racing of the vehicle engine, namely, whether a noise arising from the engine racing is included in or superimposed on at least one of the outputs of the rear wheel speed sensors 142, 143. Described in detail by reference to the flow chart of FIG. 5, the noise detecting sub-routine is initiated with step S41 to determine whether the vehicle is stationary, more specifically, whether the reference wheel speed $V_M$, that is, the higher one of the detected front wheel speeds is equal to or lower than a predetermined threshold. If an affirmative decision (YES) is obtained in step S41, step S42 is implemented to determine whether the pre-filtered acceleration value $G_W$ of at least one of the rear wheels 14, 15 whose speeds are detected by the rear wheel speed sensors 142, 143 is larger than a predetermined threshold. If the affirmative decision (YES) is obtained in steps S41 and S42, the control flow goes to step S43 to determine that a noise is included in or superimposed on the output of at least one of the two rear wheel speed sensors 142, 143.

If a noise is not included in the output of either of the rear wheel speed sensors 142, 143, a negative decision (NO) is obtained in step S13, and the control flow goes to step S14 to store the provisional vehicle speed $V_{SP1}$ (stored in the provisional speed memory in step S12) as the final vehicle speed in the final vehicle speed memory of the RAM 94. A signal indicative of this final vehicle speed $V_{SP1}$ is fed to the speedometer 152 and the engine control device 154. Further, the hydraulic control device 26 executes the anti-lock braking pressure control routine and the traction control routine on the basis of the thus determined final vehicle speed $V_{SP1}$. In this case, the data indicative of the provisional vehicle speed stored in the provisional speed memory are erased.

If a noise is included in the output of at least one of the two rear wheel speed sensors 142, 143, step S13 is followed by step S15 to set the NOISE flag to "1". In this case, the control flow goes to step S16 and the following steps to change the estimation rule for estimating the vehicle speed so that the vehicle speed is estimated according to the changed estimation rule.

Step S16 is provided to determine whether the noise is included in the output of only one of the rear wheel speed sensors 142, 143. If an affirmative decision (YES) is obtained, the control flow goes to step S17 to determine whether the speed as represented by the other rear wheel speed sensor 142, 143 is normal or not. If the noise is included in only the output of the wheel speed sensor 142 for the rear left wheel 14, for example, a determination is made in step S17 as to whether the speed of the rear right wheel 15 is normal. This determination is effected by checking if the wheel speed sensor 143 is normal without any defect such as electrical disconnection.

If the speed of the other rear wheel speed sensor 142, 143 is found normal in step S17, that is, if an affirmative decision (YES) is obtained in step S17, the control flow goes to step S18 to estimate the vehicle speed $V_{SP1}$ to be equal to the lower one $V_{RMIN}$ of the speeds as represented by the wheel speed sensors 142, 143. In this case, the provisional speed $V_{SP1}$ stored in the provisional speed memory in step S12 is erased, and the lower rear wheel speed $V_{RMIN}$ is stored as the final vehicle speed in the final speed memory in step S18, since this speed $V_{RMIN}$ is normal and does not include a noise.

If the speed of the other rear wheel speed sensor 142, 143, that is, if a negative decision (NO) is obtained in step S17, the control flow goes to step S19 to determine whether the speeds as represented by the outputs of the wheel speed sensors 144, 145 for the front wheels 18, 19 are both normal. If an affirmative decision (YES) is obtained in step S19, the control flow goes to step S20 to estimate the vehicle speed $V_{SP1}$ to be equal to an average of the speeds $S_{FL}$ and $V_{FR}$ of the front wheels 18, 19, and store this average as the final vehicle speed in the final speed memory. If at least one of the front wheel speed sensors 144, 145 suffers from electrical disconnection, a negative decision (NO) is obtained in step S19, and step S21 is implemented to estimate the vehicle speed $V_{SP1}$ to be zero, since the vehicle speed cannot be accurately estimated in this condition.

As explained above, step S19 and the following steps are implemented if a noise is included in the output of only one of the speeds as represented by the rear wheel speed sensors 142, 143 and if the speed as represented by the other rear wheel speed sensor 142, 143 is not normal. However, the step S19 and the following steps are also implemented in the case where a noise is included in the outputs of both of the rear wheel speed sensors 142, 143, that is, if a negative decision (NO) is obtained in step S16. In these cases (where the negative decision is obtained in step S16 or S17), it is not possible to estimate the vehicle speed on the basis of the speeds as represented by the rear wheel speed sensors 142, 143.

After step S18, S20 or S21 is implemented to estimate the vehicle speed as a result of the affirmative decision (YES) in step S13, the control flow goes to step S22 and the following steps to determine whether any one of the conditions indicative of the removal of the noise is satisfied.

Step S22 is provided to determine whether the pre-filtered acceleration values $G_{i,j}$ of the rear wheels 14, 15 whose speeds as detected by the rear wheel speed sensors 142, 143 are both equal to or smaller than a predetermined threshold. If a negative decision (NO) is obtained in step S22, the control flow goes to step S23 to reset a NOISE-FREE flag A to "0", and step S24 to determine whether the highest one $V_{MAX}$ of the speeds as represented by the four wheel speed sensors 142–145 is zero or not. If the highest wheel speed $V_{MAX}$ is larger than zero, a negative decision (NO) is obtained in step S25, the control flow goes to step S25 to reset a NOISE-FREE flag B to "0", and step S26 to determine whether the higher one $V_{FMAX}$ of the speeds of the front idler wheels 18, 19 is higher than a predetermined threshold S.

The NOISE-FREE flag A is set to "1" where there is a possibility that the Condition 1 described above is satisfied, and is reset to "0" where there is not this possibility, or where the NOISE flag is reset to "0" when the Condition 1 is satisfied. As explained above, the Condition 1 is satisfied where the pre-filtered acceleration values of the rear wheels 14, 15 as detected by the wheel speed sensors 142, 143 both remain to be lower than the predetermined upper limit for more than a predetermined length of time. Therefore, the NOISE-FREE flag A is set to "1" where the pre-filtered acceleration values of the rear wheels 142, 143 remain to be lower than the upper limit for more than the predetermined length of time. A timer A is provided to measure this predetermined length of time.

The NOISE-FREE flag B is set to "1" where there is a possibility that the Condition 2 described above is satisfied, that is, where the highest one of the speeds of the four wheels 14, 15, 18, 19 remains to be zero for more than a predetermined length of time. A time B is provided to measure this predetermined length of time.

If a negative decision (NO) is obtained in all of steps S22, S24 and S26, the control flow returns to step S11. If the NOISE flag has set to "1" in step S15, the affirmative decision (YES) is obtained in step S11, and steps S16–S21 are implemented again to estimate the vehicle speed and implement steps S22, S24 and S26 again. Thus, the determination in step S13 as to whether a noise is included in the outputs of the rear wheel speed sensors 142, 143 is not implemented while the NOISE flag is set at "1" (while the affirmative decision is obtained in step S11).

It will be understood that steps S11, S16–S21 and steps S22–S26 are repeatedly implemented to estimate the vehicle speed as long as the NOISE flag is set at "1" and the negative decision (NO) is obtained in all of the steps S22, S24 and S26.

When the pre-filtered acceleration values of the rear wheels 14, 15 are both equal to or smaller than the predetermined threshold, an affirmative decision (YES) is obtained in step S22, and the control flow goes to step S27 to determine whether the NOISE-FREE flag A is set at "1". If a negative decision (NO) is obtained in step S27, step S28 is implemented to set the NOISE-FREE flag to "1". Step S28 is followed by step S29 to start the timer A.

Then, the control flow goes to step S30 to determine whether the predetermined length of time for the Condition 1 has elapsed. When step S30 is implemented for the first time, a negative decision (NO) is obtained in step S30, and the control flow returns to step S11, and the vehicle speed is estimated in one of steps S18, S20 and S21. Then, step S22 is implemented again.

If the pre-filtered acceleration values of the rear wheels 14, 15 both remain to be equal to or smaller than the predetermined threshold, the affirmative decision (YES) is obtained again in step S22, step S27 is implemented to determine whether the NOISE-FREE flag A is set at "1". Since the NOISE-FREE flag 1 has been set to "1" in step S28 in the last cycle of execution of the routine, an affirmative decision (YES) is obtained in step S27, and the control flow goes to step S30 to determine whether the predetermined length of time for the Condition 1 has passed. If an affirmative decision (YES) is obtained in step S30, steps S31 and S32 are implemented to reset the NOISE flat and the NOISE-FREE flag A to "0". Thus, the NOISE flag is reset to "0" since the Condition 1 has been satisfied.

When step S11 is implemented after the NOISE flag is reset to "0" in step S32, the negative decision (NO) is obtained in step S11, and the control flow goes to step S12 to estimate the vehicle speed to be equal to the average of the speeds of the rear wheels 14, 15, and store this average as the provisional vehicle speed in the provisional speed memory of the RAM 94. Subsequently, step S13 is implemented to determine whether a noise is included in the output of either of the rear wheel speed sensors 142, 143, and the vehicle speed estimation rule is changed depending upon a result of the determination in step S13. Namely, the implementation in step S13 to detect a noise is initiated since the noise removal has been detected (affirmative decision has been obtained in step S30).

If the pre-filtered acceleration values of the rear wheels 14, 15 do not remain for more than the predetermined length of time, the negative decision (NO) is obtained in step S22, and step S23 is implemented to reset the NOISE-FREE flag A to "0".

If the highest one $V_{MAX}$ of the speeds of the four wheels 14, 15, 18, 19 is zeroed during implementation of steps S11, S16–S21 and S22–S26, an affirmative decision (YES) is obtained in step S24, and the control flow goes to step S33 and the following steps. If the highest wheel speed $V_{MAX}$ remains to be zero for more than the predetermined length of time, an affirmative decision (YES) is obtained in step S36, that is, if the Condition 2 indicated above is satisfied. In this case, steps S37 and S38 are implemented to reset the NOISE flag and the NOISE-FREE flag B to "0".

If the higher one $V_{FMAX}$ of the speeds of the front wheels 18, 19 becomes higher than the predetermined threshold S, namely, if the Condition 3 indicated above is satisfied, an affirmative decision (YES) is obtained in step S26, and the NOISE flag is reset to "0" in step S39.

In the present embodiment, any wheel speed sensor 142–145 which does not generate an alternate voltage is found defective suffering from electrical disconnection, for example. However, no alternate voltage is detected when the vehicle is stationary as well as when the wheel speed sensor is defective. When the vehicle is stationary, the negative decision (NO) is obtained in step S17 or S19. In this case, the vehicle speed is determined in step S21 to be zero.

Referring to FIG. 3, the manner of detecting the vehicle speed in the present vehicle speed detecting apparatus will be described. Where the NOISE flag is not set at "1" prior to the point of time P indicated in FIG. 3, the vehicle speed is estimated to be equal to the average of the speeds of the rear wheels 14, 15 as represented by the outputs of the wheel speed sensors 142, 143. Namely, the vehicle speed is estimated to be zero since the vehicle is stationary.

At the point of time P, the pre-filtered acceleration value of the rear right wheel 15 whose speed is detected by the wheel speed sensor 143 exceeds the predetermined threshold, whereby a decision that a noise due to the engine racing is included in the output of the wheel speed sensor 143 is made. In this case, the NOISE flag is set to "1".

If the speed of the rear left wheel 14 whose speed is detected by the wheel speed sensor 142 is found normal and if a noise is not included in the output of this sensor 142, the vehicle speed is estimated to be equal to the speed of the rear left wheel 14. If the noise is included also in the output of the rear left wheel speed sensor 142, the vehicle speed is estimated to be equal to the average of the speeds of the front wheels 18, 19 if these front wheel speeds are found normal. If at least one of these front wheel speeds is found abnormal where the noise is included in the output of the rear left wheel speed sensor 142, the vehicle speed is estimated to be zero.

Since the vehicle is stationary in the above cases, the speed of the wheel as represented by the output of the wheel speed sensor which does not include a noise is zero, and therefore the vehicle speed is estimated to be zero even after the point of time P, as indicated by one-dot chain line D in FIG. 3.

Thus, the present vehicle speed detecting apparatus is capable of determining whether a noise is included in or superimposed on the output of the rear wheel speed sensor 142, 143. The apparatus is adapted to change the vehicle speed estimating rule depending upon a result of this determination as to whether a noise is present in the wheel speed sensor outputs, so as to prevent erroneous detection or determination of the vehicle speed in the presence of the noise, that is, to effectively avoid erroneous determination that the vehicle speed is not zero even where the vehicle is actually stationary.

The signal indicative of the vehicle speed thus detected is fed to the speedometer 152. The present apparatus is effective to avoid erroneous indication of the vehicle speed on the speedometer 152.

The signal indicative of the vehicle speed is also fed to the engine control device 154. When no racing of the engine is detected, the engine control device 154 controls the amount of fuel injection in to the engine, on the basis of the engine speed. When racing of the engine is detected, the engine control device 154 controls the fuel injection amount on the basis of the vehicle speed as represented by the signal received from the hydraulic control device 26. Since this vehicle speed does not include a noise, the engine control device 154 does not suffer from erroneous operation based on an erroneous vehicle speed indicative of a running state of the vehicle while the vehicle is in fact stationary, whereby the engine control device 154 is capable of initiating the control of the engine in the anti-racing mode so as to prevent excessive racing of the engine. In this anti-racing mode, the fuel injection amount is suitably controlled since the vehicle speed received from the hydraulic control device 26 is free from the noise included in the rear wheel speed sensors 142, 143.

Further, the vehicle speed accurately detected by the present vehicle speed detecting apparatus permits the anti-lock braking pressure control routine to be executed with high accuracy, without erroneous estimation of excessive braking slip amounts of the wheels, which would erroneously and unnecessarily initiate the anti-lock braking pressure control. This arrangement is effective to avoid unnecessary energy consumption and reduce the frequency of noise generation due to unnecessary anti-lock braking pressure control operations.

Once the NOISE flag has been set to "1" (in step S15), step S13 is not implemented, and the step S13 and the following steps are implemented to determine whether the noise has been removed. When any one of the Conditions 1, 2 and 3 is satisfied and the NOISE flag is reset to "0" in step S31, S37 or S39, step S13 is implemented but steps S22 and the following steps will not be implemented. Thus, the determination as to whether the noise has been removed is initiated when the affirmative decision (YES) is obtained in step S13, and is terminated when the NOISE flag is reset to "0" in step S31, S37 or S39. Similarly, the determination in step S13 to detect the inclusion of a noise in the outputs of the wheel speed sensors 142, 143 is initiated when the NOISE flag is reset to "0" and and is terminated when the NOISE flag is set to "1". Thus, the determinations as to whether the noise is included in the outputs of the wheel speed sensors 142, 143 and as to whether the noise has been removed are not unnecessarily implemented, whereby the vehicle speed estimating routine of FIGS. 4A and 4B is efficiently executed.

Further, the routine of FIGS. 4A and 4B is formulated such that the Condition 1, 2 or 3 is not satisfied immediately after the negative decision (NO) is obtained in step S13. In other words, the routine is formulated to as to provide an area in which the Condition 1, 2 or 3 is not satisfied and in which the negative decision (NO) is obtained in step S13. This arrangement is effective to prevent frequent setting and resetting of the NOISE flag, which would cause frequent changes of the vehicle speed estimation rule and undesirable variation in the vehicle speed as estimated by the apparatus.

In the present embodiment, the higher one of the speeds of the front wheels 18, 19 is used as the reference wheel speed in step S41 to determine whether the vehicle is stationary or not. If the higher front wheel speed or reference wheel speed is equal to or lower than the predetermined threshold, the vehicle is considered to be stationary, and it is considered that there is a possibility of the engine racing.

Since the front wheel speeds as detected by the front wheel speed sensors 144, 145 are less likely to include a noise, and the higher front wheel speed is used as the reference speed in step S41, the determination as to whether the vehicle is stationary or not can be achieved with high accuracy. Generally, the speeds of the non-drive or idler wheels more accurately represent the vehicle speed. In this respect, too, the determination in step S41 (as to whether the vehicle is stationary or not) can be achieved with high accuracy.

The vehicle speed detecting apparatus of the present embodiment of the invention is incorporated in the hydraulic control device 26 capable of performing the anti-lock braking pressure control and the traction control, and the vehicle speed obtained by the apparatus is also used by the speedometer 152 and the engine control device 154. Therefore, the present embodiment advantageously eliminates vehicle speed detecting devices for the speedometer 152 and the engine control device 154, respectively.

It will be understood from the foregoing detailed description of the present embodiment that a portion of the hydraulic control device 26 assigned to execute the vehicle speed estimating routine of FIGS. 4A and 4B and the wheel speed sensors 142–145 constitute a major part of the vehicle speed detecting apparatus, and that a portion of the hydraulic control device 26 assigned to implement the steps of the vehicle speed estimating routine except step S13 constitutes a major part of vehicle speed estimating means, while a portion of the device assigned to implement the step S13 (steps S41–S43 of FIG. 5) constitutes a major part of noise detecting means for determining whether a noise is included in the output of the wheel speed sensors 142, 143. Further, a portion of the device 26 assigned to implement steps S14 and S15–S21 constitutes a major part of estimation rule changing means for changing the vehicle speed estimation rule depending upon whether the noise is included in the wheel speed sensor outputs. Further, a portion of the device 26 assigned to implement steps S22–S38 constitutes a major part of noise removal detecting means for determining whether the noise has been removed. It is also noted that a portion of the device 26 assigned to use the higher one of the speeds of the front wheels 18, 19 in step S41 of the noise detecting sub-routine constitutes a major part of reference speed selecting means for selecting the higher front wheel speed as the reference speed for determining whether the vehicle is stationary or not.

If the vehicle speed estimating means is considered to be constituted by the portion of the hydraulic control device 26 assigned to execute the entirety of the vehicle speed estimating routine of FIGS. 4A and 4B, the noise detecting means is constituted principally by a portion of the device 26 assigned to implement step S13. In this case, the noise detecting means is considered to be included in the vehicle speed estimating means. Thus, the noise detecting means may be a part of the vehicle speed estimating means according to the present invention.

Although the vehicle speed detecting apparatus of the present embodiment is included in the hydraulic control device 26 capable of performing the anti-lock braking pressure control and the traction control, the vehicle speed detecting apparatus may not be included in the hydraulic control device 26. For instance, the vehicle speed detecting apparatus may be included in the speedometer 152 or engine control device 154, or may be provided as an apparatus separate from or independent of the devices 26, 154 or speedometer 152. In any case, the vehicle speed detecting apparatus is constructed as described above, and the signal indicative of the vehicle speed can be utilized throughout the control system of the vehicle or by a part of the control system, so that the cost of manufacture of the vehicle control system may be reduced.

While the above embodiment is arranged to detect a noise included in the speeds of the rear wheels 14, 15 as detected by the rear wheel speed sensors 142, 143 only, the vehicle speed detecting apparatus may be arranged to detect also a noise included in the speeds of the front wheels 18, 19 as detected the front wheel speed sensors 144, 145, so that the vehicle speed estimation rule is changed depending upon whether the noise is included in any of the outputs of the four wheel speed sensors 142–145.

In the above embodiment, a decision that there is a possibility of the engine racing is made where the vehicle is stationary, that is, where the reference wheel speed (higher one of the front wheel speeds) is equal to or lower than the predetermined threshold. However, such a decision may be made where the shift lever position as represented by the shift position sensor 148 is the neutral or parking position, or where the engine speed as detected by the engine speed sensor 150 is higher than a predetermined threshold. Further, the decision may be made where two or more of the above three conditions are satisfied. Alternatively, the decision may depends upon whether the brake switch 146 is ON. In the above cases, it is not necessary to detect the higher front wheel speed.

Further, the decision that there is a possibility of the engine racing may be made where at least two of the above-indicated conditions are satisfied.

In the above embodiment, the determination as to whether the noise has been removed is effected only while the NOISE flat is set at "1". However, this determination may be effected also while the NOISE flag is set at "0". Although the vehicle speed estimating routine of FIGS. 4A and 4B includes operations to detect the noise and the removal of the noise, these operations may be performed in a routine separate from the vehicle speed estimating routine. In this case, the vehicle speed estimation according to the vehicle speed estimating routine is effected depending upon the content of the NOISE flag which is set and reset in the separate routine.

Figure 5:
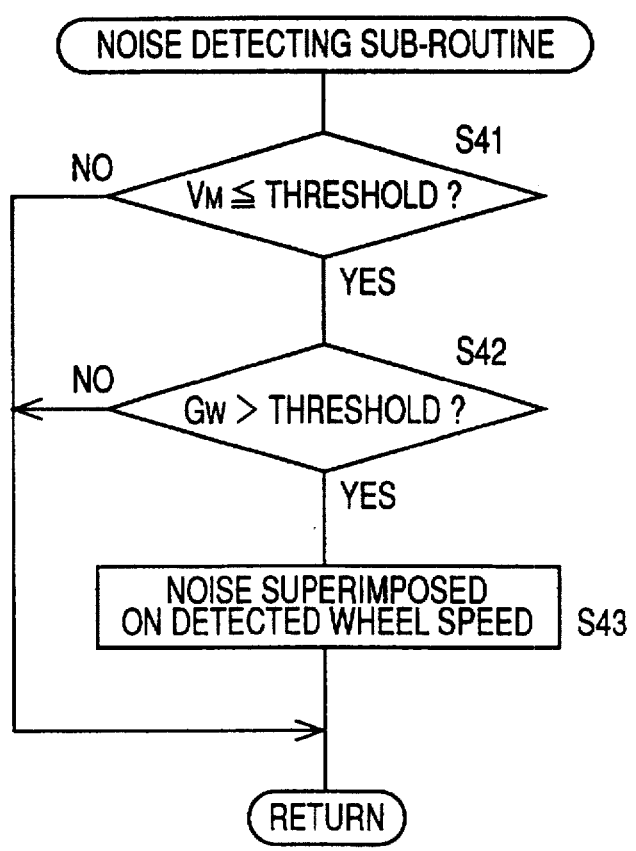
FIG. 5 is a flow chart illustrating a noise detecting sub-routine executed in step S13 of the vehicle speed estimating routine of FIGS. 4A and 4B.

While the higher one of the speeds of the front idler wheels 18, 19 is used as the reference wheel speed in step S41 in the noise detecting sub-routine of FIG. 5, the lower front wheel speed or an average of the front wheel speeds may be used as the reference wheel speed in step S41.

The vehicle estimation rules selectively used are not limited to the Rules a, b and c explained above, but may be suitably modified. For example, if a noise is included in or superimposed in the output of at least one of the detected rear wheel speeds 14, 15, the vehicle speed may always be estimated on the basis of the speeds of the front wheels 18, 19.

In the above embodiment, the vehicle speed as detected by the vehicle speed detecting apparatus is used by the speedometer 152 and the engine control device 26, and the hydraulic control device 26 is adapted to execute the anti-lock braking pressure control routine and the traction control routine on the basis of the detected vehicle speed. That is, the vehicle speed used by the speedometer 152 and the engine control device 154 is the same as that used for the anti-lock braking pressure control and the traction control by the hydraulic control device 26. However, different vehicle speed values may be used by the speedometer 152 and engine control device 154 and the hydraulic control device 26. For instance, the vehicle speed used for the anti-lock braking pressure control and the traction control may be a value obtained with a relatively small number of signal filtering operations, while the vehicle speed used by the speedometer 152 and engine control device 154 may be a value obtained with a relatively large number of signals filtering operations. The detection delay of the vehicle speed is comparatively large when the number of the signal filtering operations is relatively large, while on the other hand the deviation of the detected vehicle speed from the actual speed is comparatively large when the number of the signal filtering operations is relatively small. For improved response of the anti-lock braking pressure control and traction control, the detection delay is desirably reduced at the cost of the relatively large error. For the speedometer 152 and the engine control device 154, on the other hand, the reduced deviation is desirable at the cost of the relatively large detection delay.

The hydraulic control device 26 may use a plurality of signal filters having different filtering effects. In this case, the filter having a relatively small filtering effect is used for obtaining the vehicle speed used for the anti-lock braking pressure control and traction control, while the filter having a relatively large filtering effect is used for obtaining the vehicle speed to be used by the speedometer 152 and engine control device 154. Alternatively, the hydraulic control device 26 may use only one signal filter, and the speedometer 152 and engine control device 154 may use one or more additional filters for improving the accuracy of the vehicle speed used.

The above embodiment is adapted such that the vehicle speed obtained by the hydraulic control device 26 is used by the speedometer 152 and engine control device 154, the vehicle speed may be used by other control devices such as a controller for controlling the automatic transmission. Further, the signal indicating that a noise is included in the outputs of the wheel speed sensors 142-145 may be supplied to a suitable warning device to inform the vehicle operator of this fact, so that the vehicle operator may recognize an occurrence of resonance in the drive system and may reduce the amount of depression of the accelerator pedal, for thereby preventing the drive system from suffering from the undesirable resonance for a long time.

Although the hydraulic control device 26 is used for the hydraulic braking system for the rear-drive motor vehicle driven by the rear wheels, the device 26 may be used for a front-drive motor vehicle driven by the front wheels.

The routine of FIGS. 4A and 4B may be modified by providing a suitable step between steps S12 and S13, for checking if the speeds as represented by the wheel speed sensors 142-145 are abnormal. In this case, the reference wheel speed used in step S41 may be selected from the wheel speeds which are not abnormal.

In the embodiment of FIGS. 4A and 4B, the NOISE flag is reset to "0" when any one of the Conditions 1, 2 and 3 explained above is satisfied. However, the NOISE flag may be reset when two or all of the three Conditions 1, 2 and 3 are satisfied.

While the pre-filtered acceleration values of the front wheels 18, 19 as detected by the wheel speed sensors 142, 143 are used in step S42 of the noise detecting sub-routine of FIG. 5, the acceleration values which have been subjected to a relatively small number of signal filtering operations or which have been filtered by a filter having a relatively small filtering effect may be used in step S42. These acceleration values may still be considered to be pre-filtered acceleration values with respect to acceleration values obtained with a relatively large number of signal filtering operations or by a filter having a relatively large filtering effect.

The above embodiment of FIGS. 4A and 4B is adapted such that the Condition 1 is satisfied when both of the pre-filtered acceleration values of the rear wheels 14, 15 remain to be equal to or smaller than the predetermined threshold. However, the determination as to whether the noise has been removed may be made for each of the two rear wheels 14, 15 or for each of the two rear wheel speed sensors 142, 143. In this case, the determination as to whether the pre-filtered acceleration value of the rear left wheel 14 remains to be equal to or smaller than the threshold is effected independently of the determination as to whether the pre-filtered acceleration value of the rear right wheel 15 remains to be equal to or smaller than the threshold. This modification is incorporated in a second embodiment of the present invention which uses a vehicle speed estimating routine partly illustrated in the flow charts of FIGS. 6A and 6B.

Figure 6A:
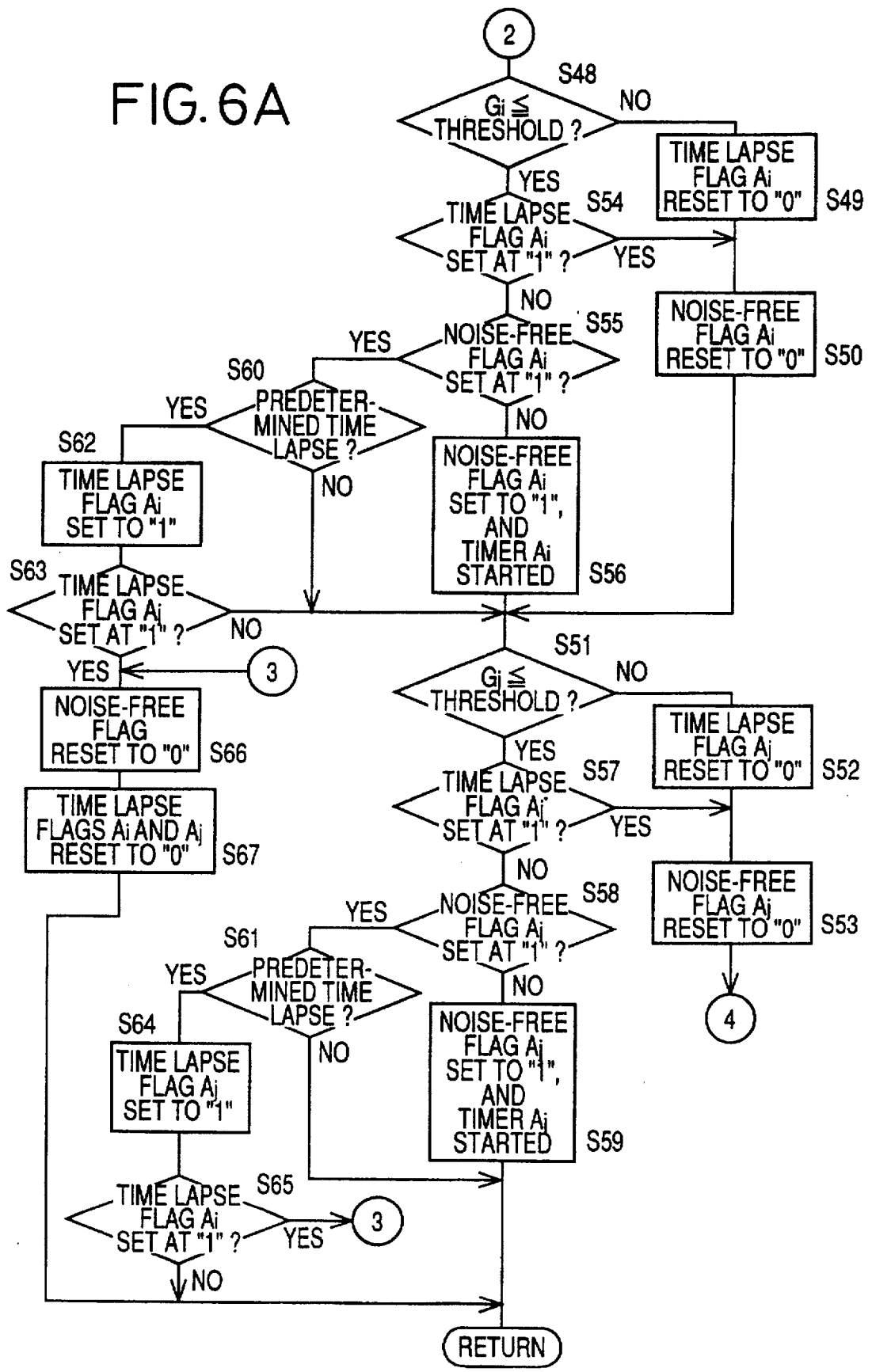

In the second embodiment, the vehicle speed is estimated in steps S11 and S16–S21 as in the first embodiment of FIGS. 4A and 4B. Then, the control flow goes to step S48 of FIG. 6A to determine whether the pre-filtered acceleration value $G_i$ of the rear left wheel 14 is equal to or smaller than a predetermined threshold. If a negative decision (NO) is obtained in step S48, the control flow goes to steps S49 and S50 to reset a TIME LAPSE flag $A_i$ and a NOISE-FREE flag $A_i$ to "0". Step S50 is followed by step S51 to determine whether the pre-filtered acceleration value $G_j$ of the rear right wheel 15 is equal to or smaller than a predetermined threshold. If a negative decision (NO) is obtained in step S51, the control flow goes to steps S52 and S53 to reset a TIME LAPSE flag $A_j$ and a NOISE-FREE flag $A_j$ to "0". Step S53 is followed by step S24 (FIG. 6B).

The TIME LAPSE flag $A_i$ is set to "1" when the pre-filtered acceleration value $G_i$ of the rear left wheel 14 remains to be equal to or smaller than the predetermined threshold for more than a predetermined length of time, that is, when the noise has been removed from the detected speed of the rear left wheel 14. The TIME LAPSE flag $A_i$ is reset to "0" when the NOISE flag is reset to "0" or when the acceleration value $G_i$ of the rear left wheel 14 becomes equal to smaller than the predetermined threshold. Similarly, the TIME LAPSE flag $A_{ji}$ is set to "1" when the pre-filtered acceleration value $G_j$ of the rear right wheel 15 remains to be equal to or smaller than the predetermined threshold. The NOISE-FREE flags $A_i$, $A_j$ are reset to "0" when the TIME LAPSE flags $A_i$, $A_j$ are set to "1", respectively.

There will first be described a case where the Condition 1 is satisfied and the NOISE flag is reset to "0" when the acceleration value $G_j$ of the rear right wheel 15 remains to be equal to or smaller than the threshold for more than the predetermined length of time after the acceleration value $G_i$ of the rear left wheel 14 remains to be equal to or smaller than the threshold for more than the predetermined length of time.

In the above case, an affirmative decision (YES) is obtained in step S48 since the acceleration value $G_i$ is equal to or smaller than the threshold. As a result, step S54 is implemented to determine whether the TIME LAPSE flag $A_i$ is set at "1" or not. If a negative decision (NO) is obtained in step S54, step S55 is implemented to determine whether the NOISE-FREE flag $A_i$ is set at "1" or not. When these steps S54 and S55 are implemented for the first time, the negative decision (NO) is obtained in these steps S54, S55, and the control flow goes to step S56 in which the NOISE-FREE flag $A_i$ is set to "1" and a timer $A_i$ is started.

If the acceleration value $G_j$ of the rear right wheel 15 is larger than the threshold, the negative decision (NO) is obtained in step S51, and the control flow goes to steps S52 and S53, and then to step S24. If the acceleration value $G_j$ becomes equal to or smaller than the threshold, an affirmative decision (YES) is obtained in step S51, and the control flow goes to steps S57–S59 to set the NOISE-FREE flag A. to "1" and start a timer A. Then, the control flow returns to step S11, and the vehicle speed is estimated in one of steps S18–S21. The control flow then goes to step S48 again.

If the acceleration value $G_i$ of the rear left wheel 14 remains to be equal to or smaller than the threshold, the affirmative decision (YES) is obtained in step S48. At this time, the TIME LAPSE flag $A_i$ is not set at "1", but the NOISE-FREE flag $A_i$ is set at "1". Accordingly, a negative decision (NO) is obtained in step S54 while an affirmative decision (YES) is obtained in step S55, and the control flow goes to step S60 to determine whether the predetermined length of time has elapsed after the acceleration value $G_i$ became equal to or smaller than the threshold for the first time. When step S60 is implemented for the first time, a negative decision (NO) is obtained in step S60, and the control flow goes to step S51 and the following steps as described above.

If the acceleration value $G_j$ of the rear right wheel 15 remains to be equal to or smaller than the threshold, the affirmative decision (YES) is obtained in step S51. Since a negative decision (NO) is obtained in step S57 while an affirmative decision (YES) is obtained in step S58, the control flow goes to step S61 to determine whether the predetermined length of time has passed. If a negative decision (NO) is obtained in step S61, the control flow returns to step S11.

When the time measured by the timer $A_j$ has reached the predetermined value during repeated implementation of steps S11, S16–S21, S48, S54, S55, S60, S51, S57, S58 and S61, an affirmative decision (YES) is obtained in step S60, and the control flow goes to step S62 to set the TIME LAPSE flag $A_i$ to "1" and step S63 to determine whether the TIME LAPSE flag $A_j$ is set at "1". If the TIME LAPSE flag $A_j$ is not set at "1", a negative decision (NO) is obtained in step S63, and the control flow goes to step S51 and the following steps including step S61 to determine whether the time measured by the timer $A_j$ has reached the predetermined value. If a negative decision (NO) is obtained in step S61, the control flow returns to step S11.

The affirmative decision (YES) is obtained in step S54 in the next cycle of execution of the routine since the TIME LAPSE flag $A_i$ is now set at "1". Consequently, step S54 is followed by step S50 to reset the NOISE-FREE flag $A_i$ to "0", and step S51 and the following steps are implemented.

When the time measured by the timer $A_j$ has reached the predetermined value, an affirmative decision (YES) is obtained in step S61, and step S64 is implemented to set the TIME LAPSE flag $A_j$ to "1". Then, the control flow goes to step S65 to determine whether the TIME LAPSE flag $A_i$ is set at "1". Since this TIME LAPSE flag $A_i$ has already been set to "1", an affirmative decision (YES) is obtained in step S65, and the control flow goes to step S66 to reset the NOISE flag to "0". That is, when the TIME flags $A_i$ and $A_j$ are both set at "1", it means that the noises including the outputs of the two rear wheel speed sensors 142, 143 have both been removed, namely, it means that the Condition 1 indicated above is satisfied, whereby the NOISE flag is reset to "0". Then, the control flow goes to step s67 to reset the TIME flags $A_i$, $A_j$ to "0".

Next, there will be briefly described a case where the NOISE flag is reset to "0" when the pre-filtered acceleration value $G_i$ of the rear left wheel 14 remains to be equal to or smaller than the threshold for more than the predetermined length of time after the pre-filtered acceleration value $G_j$ of the rear right wheel 15 remains to be equal to or smaller than the threshold for more than the predetermined length of time.

Initially, the pre-filtered acceleration value $G_j$ of the rear right wheel 15 is equal to or smaller than the predetermined threshold while that of the rear left wheel 14 is larger than the predetermined threshold. Therefore, the negative decision (NO) is obtained in step S48, while the affirmative decision (YES) is obtained in step SS1. With the negative decision (NO) being obtained in the following steps S57 and S58, the control flow goes to step S59 in which the NOISE-FREE flag $A_j$ is set to "1" and the timer $A_j$ is started.

Then, steps S11, S16–S21, S48–S51, S57, S58 and S61 are repeatedly implemented in the same manner as described above. If the affirmative decision (YES) during the repeated implementation of the above steps, the control flow goes to step S64 to set the TIME LAPSE flag $A_j$ to "1" and step S65 to determine whether the TIME LAPSE flag $A_i$ is set at "1". If the negative decision (NO) is obtained in step S65, the control flow returns to step S11.

When the pre-filtered acceleration value $G_i$ of the rear left wheel 14 has become equal to or smaller than the predetermined threshold, the affirmative decision (YES) is obtained in step S48, and the NOISE-FREE flag $A_i$ is set to "1" and the timer $A_i$ is started in step S56. Then, the control flow returns to step S11 via steps S51, S57, S53 and S24–S26.

When the time measured by the timer $A_i$ has reached the predetermined value, the affirmative decision (YES) is obtained in step S60 after implementation of steps S48, S54 and S55, whereby the control flow goes to step S62 to set the TIME LAPSE flag $A_i$ to "1", to step S63. Since the TIME LAPSE flag $A_j$ has already been set to "1", the affirmative decision (YES) is obtained in step S63, and step S66 is implemented to reset the NOISE flag to "0".

As described above, the present second embodiment of FIGS. 6A and 6B is adapted to determine whether the noise has been removed from each of the outputs of the rear left and right wheel speed sensors 142, 143.

It is noted, however, that the NOISE flag is not reset to "0" until the TIME LAPSE flags $A_i$, $A_j$ are both set to "1", and unless the affirmative decision (YES) is continuously obtained for the predetermined length of time in both of steps S48 and S51. For example, the NOISE flag is not reset to "0", if the negative decision (NO) is obtained in step S48 after the TIME LAPSE flag $A_i$ is set to "1" in step S62 and before the TIME LAPSE flag $A_j$ is set to "1" in step S64. The manner of detecting the noise removal for each of the rear left and right wheels 14, 15 in the flow chart of FIGS. 6A and 6B is the same as in the flow chart of FIGS. 4A and 4B.

Figure 7A:
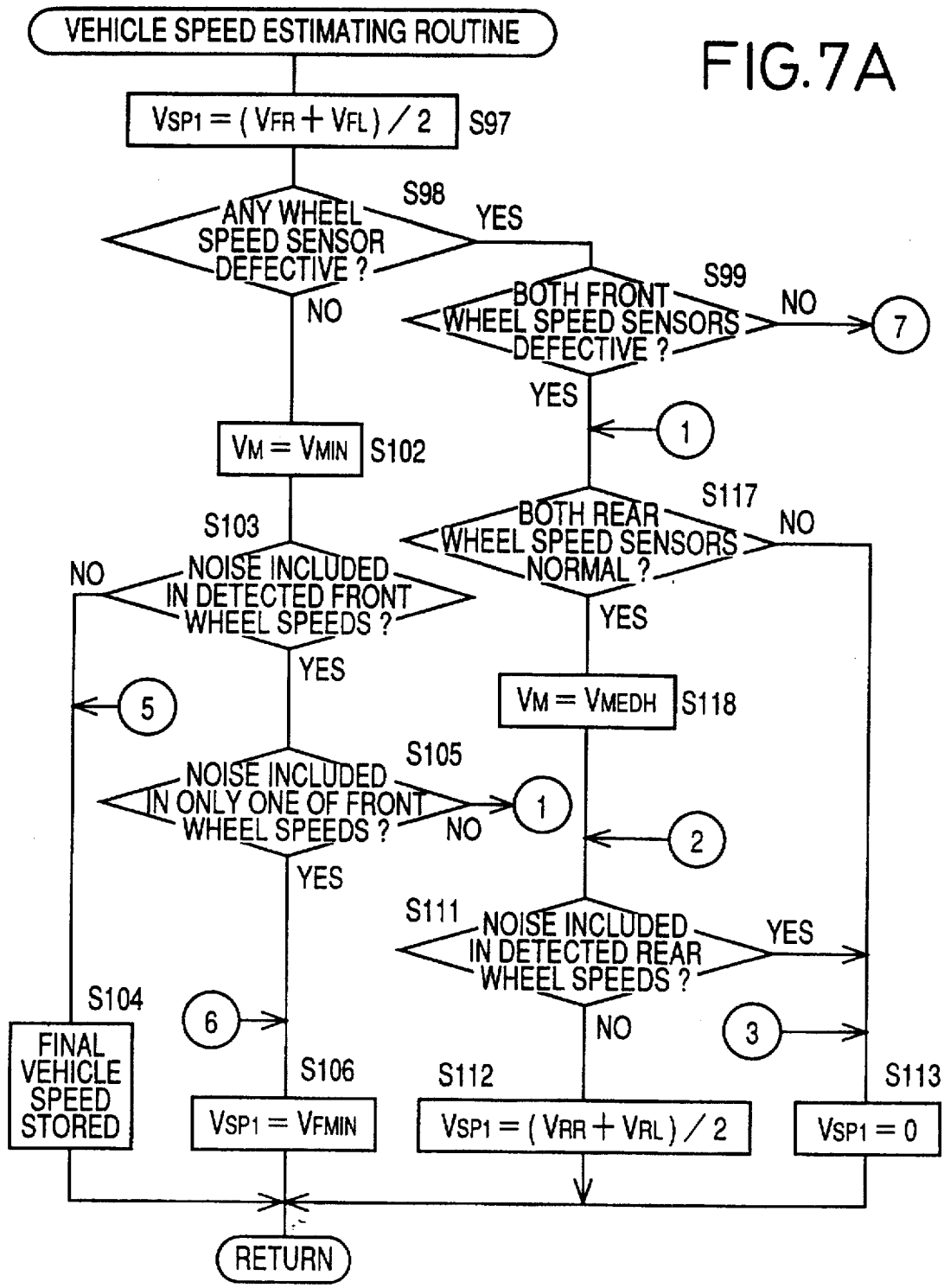
FIG. 7A and 7B are flow charts illustrating a vehicle speed estimating routine- used in a further embodiment of the invention.
Figure 7B:
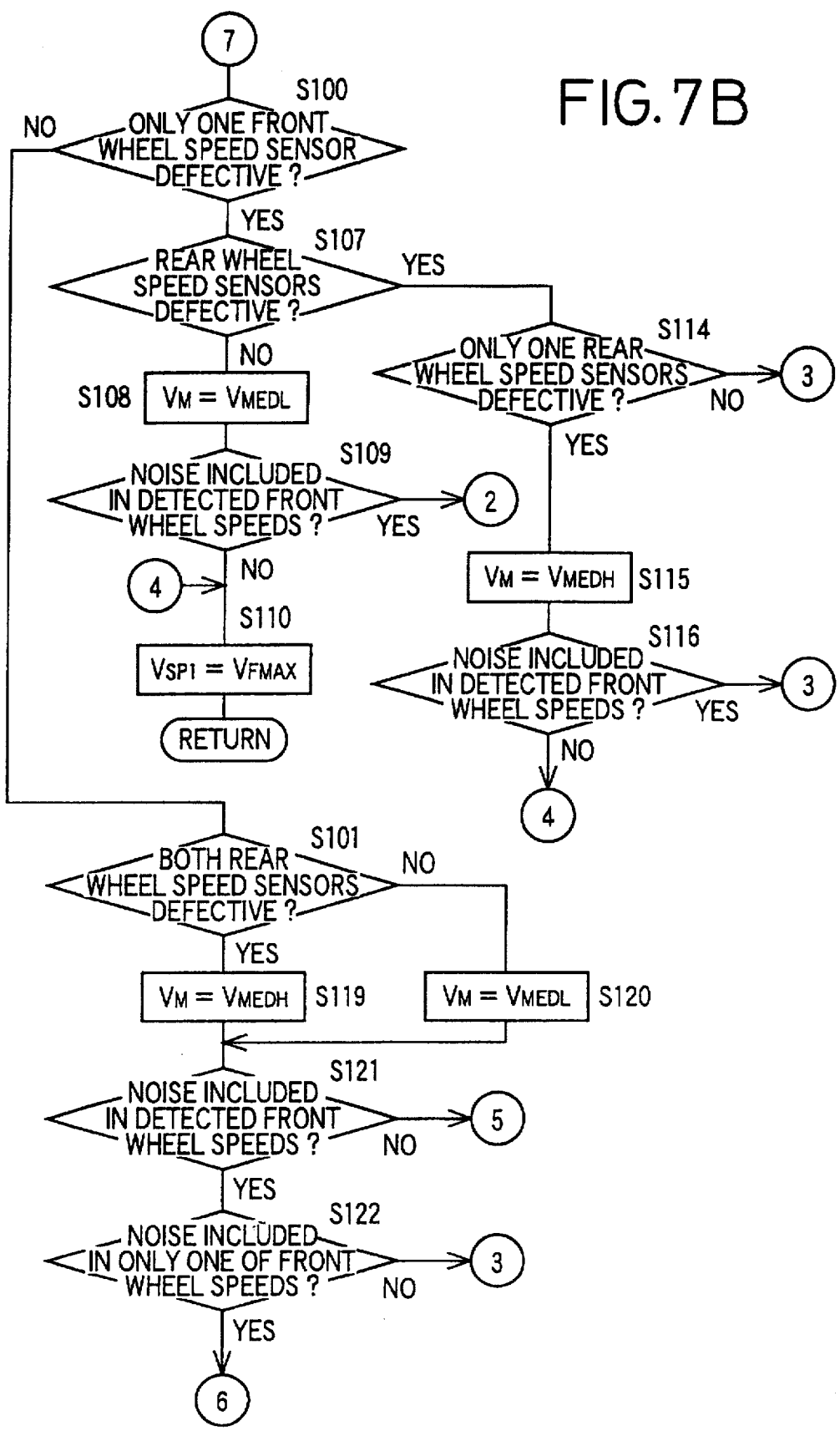

Referring next to the flow chart of FIGS. 7A and 7B, there will be described a vehicle speed estimating routine executed by a vehicle speed detecting apparatus according to a third embodiment of this invention, which is also incorporated in a hydraulic control device for a hydraulic braking system as shown in FIG. 1. However, the braking system is adapted for use on a four-wheel drive motor vehicle equipped with an automatic transmission. In this motor vehicle, the front wheels 18, 19 and the rear wheels 14, 15 are all drive wheels driven by the vehicle engine. A control program for executing the vehicle speed estimating routine of FIGS. 7A and 7B is stored in the ROM 92 of the hydraulic control device 26.

In a four-wheel drive vehicle, it is generally difficult to predict which wheels are relatively easily subject to resonance due to racing of the vehicle engine. Some four-wheel drive vehicles are constructed such that a given wheel or wheels is/are relatively easily subject to resonance, but some four-wheel drive vehicles are not so constructed. If the detection of the resonance is effected for all of the four wheels in the latter case, it takes a considerable time to complete an operation to determine whether a noise is included in the output of each of the four wheel speed sensors. In the light of this fact, the present third embodiment is adapted to change the vehicle speed estimation rule, that is, change the wheel speeds used for the vehicle speed estimation, as described below, and designate the wheel speed sensors to be checked for inclusion of a noise in their outputs, as described below.

In the present third embodiment, the determination as to whether a noise is included in the wheel speed sensor output is effected in a manner similar to that illustrated in the flow chart of FIG. 5. However, the reference wheel speed used in step S41 is not the higher one of the front wheel speeds, but is the lowest one of the detected front and rear wheel speeds which are not found abnormal. That is, the determination as to whether the vehicle is stationary is effected depending upon the lowest normal wheel speed, which is considered to have the lowest possibility of noise inclusion, of all the wheel speeds as detected by the wheel speed sensors normally functioning without any defects such as electrical disconnection.

The reference wheel speed (i.e., lowest normal wheel speed) is determined as described below in the following three cases:

Case 1

In the case where all of the four wheel speed sensors 142–145 are normal without any defects such as electrical disconnection, that is, where the wheel speeds as detected by the four wheel speed sensors 142–145 are all normal, the reference wheel speed is the lowest one $V_{MIN}$ of the four normal wheel speeds.

Case 2

In the case where only one of the four wheel speed sensors 142-145 is abnormal or defective, the reference wheel speed is the lower one $V_{MEDL}$ of the two intermediate wheel speeds, which is the lowest normal wheel speed (second wheel speed as counted from the lowest value of all the four detected speed values).

Case 3

In the case where two of the four wheel speed sensors 142–145 are abnormal or defective, the reference wheel speed is the higher one $V_{MEDH}$ of the two intermediate wheel speeds, which is the lowest normal wheel speed (third wheel speed as counted from the lowest value of all the four detected speed values).

Thus, the lowest one of the normal wheel speeds is selected as the reference wheel speed, so that the determination as to whether the vehicle is stationary can be achieved with high reliability to estimate a possibility of the engine racing with high reliability.

Referring to FIG. 8, the vehicle speed estimation rules which are selectively used in the present third embodiment will be described. In principle, the vehicle speed is estimated on the basis of the speeds of the front wheels 18, 19 in the present embodiment.

Rule A

In the case where none of the four wheel speed sensors 142–145 suffers from any defects such as electrical disconnection and inclusion of a noise in their outputs, the vehicle speed $V_{SP1}$ is estimated to be equal to an average of the speeds $V_{FL}$ and $V_{FR}$ of the front wheels 18, 19.

Rule B

In the case where only one of the front wheel speed sensors 144, 145 suffers from any defect or inclusion of a noise in its output, that is, where one of the front wheel speed sensors is normal and its output does not include a noise, the vehicle speed $V_{SP1}$ is estimated to be the normal front wheel speed $V_{FMIN}$ or $V_{FMAX}$.

Rule C

In the case where both of the front wheel speed sensors 144, 145 suffer from any defect or inclusion of a noise in their outputs, the vehicle speed $V_{SP1}$ is estimated on the basis of the speeds of the rear wheels 14, 15.

In the case where none of the rear wheel speed sensors 142, 143 suffers from any defect or inclusion of a noise in their outputs, the vehicle speed V sp is estimated to be equal to an average of the speeds of the rear wheel speeds.

In the case where at least one of the rear wheel speed sensors 142, 143 suffers from any defect or inclusion of a noise in its output, the vehicle speed $V_{SP1}$ is estimated to be zero.

Rule D

In the case where the sum of the number of the defective wheel speed sensors and the number of the sensors whose outputs include a noise is three or more, the vehicle speed $V_{SP1}$ is estimated to be zero, in principle. However, the Rule D has an exception that where both rear wheel speed sensors 142, 143 suffer from any defects while only one of the front wheel speed sensors 144, 145 suffers from inclusion of a noise in its output, the vehicle speed $V_{SP1}$ is estimated to be the rear wheel speed which does not include a noise, as described below.

Thus, the vehicle speed estimation rule is changed depending upon the conditions of the wheel speed sensors 142–145 and the presence or absence of a noise included in the sensor outputs. The wheel speed sensors to be checked for inclusion of a noise in their outputs are determined according to the following rules:

Rule i

The front wheel speed sensors 144, 145 are checked for the noise inclusion in their outputs, in the following cases: where none of the four wheel speed sensors 142–145 suffers from any defects; where either one of the front wheel speed sensors 144, 145 suffers from any defects; and where at least one of the rear wheel speed sensors 142, 143 suffers from any defects.

Rule ii

The rear wheel speed sensors 142, 143 are checked for the noise inclusion in their outputs., where both of the front wheel speed sensors 144, 145 suffer from any defects.

As is apparent from the above explanation, the front wheel speed sensors 144, 145 are checked for the noise inclusion, in principle, in the present third embodiment, since the vehicle speed $V_{SP1}$ is estimated on the basis of the speeds of the front wheels 18, 19 in principle, and the need to check the rear wheel speed sensors 142, 143 for the noise inclusion is comparatively small. Thus, the present third embodiment is adapted such that the front wheel speed sensors 144, 145 are given higher priority than the rear wheel speed sensors 142, 143 in detecting the presence of a noise included in the wheel speed sensor outputs.

The vehicle speed estimating routine will be described in detail by reference to the flow chart of FIGS. 7A and 7B.

The routine is initiated with step S97 to determine an average of the speeds $V_{FL}$ and $V_{FR}$ of the front wheels 18, 19 as the provisional vehicle speed $V_{Sp1}$, and store this speed $V_{SP1}$ in the provisional speed memory of the RAM 94. Step S97 is followed by step S98 to determine whether any of the wheel speed sensors 142–145 has any defects such as electrical disconnection.

If none of the wheel speed sensors 142–145 is defective, namely, if a negative decision (NO) is obtained in step S98, the control flow goes to step S102 and the following steps. If any wheel speed sensor is defective and an affirmative decision (YES) is obtained in step S98, the control flow goes to step S99 to determine whether both of the front wheel speed sensors 144, 145 are defective. If a negative decision (NO) is obtained in step S99, step S100 is implemented to determine whether either one of the front wheel speed sensors 144, 145 is defective. If an affirmative decision (YES) is obtained in step S100, the control flow goes to step S107 and the following steps. If both of the front wheel speed sensors 144, 145 are defective and an affirmative decision (YES) is obtained in step S99, the control flow goes to step S117 and the following steps. If the negative decision (NO) is obtained in step S100, that is, if none of the front wheel speed sensors 144, 145 are defective, the control flow goes to step S101 to determine whether both of the rear wheel speed sensors 142, 143 are defective. Step S101 is followed by step S119 or S120 depending upon the decision in step S101, and steps S119 and S120 are followed by steps S121 and S122.

If none of the wheel speed sensors 142-145 are defective, a negative decision (NO) is obtained in step S98, and the control flow goes to step S102 to select the lowest wheel speed $V_{MIN}$ as the reference wheel speed $V_M$. Since the all of the detected wheel speeds are normal in this condition, the lowest one of the detected wheel speeds is selected as the reference wheel speed $V_M$. Step S102 is followed by step S103 to determine whether a noise is included in or superimposed on the output of any one of the front wheel speed sensors 144, 145. If a noise is not included in the outputs of the sensors 144, 145, a negative decision (NO) is obtained in step S103, and the control flow goes to step S104 to determine the provisional vehicle speed $V_{SP1}$ stored in the provisional speed memory as the final vehicle speed $V_{SP1}$ and store this final vehicle speed in the final speed memory of the RAM 94. This final vehicle speed $V_{SP1}$ is used by the speedometer 152 and the engine control device 154, as well as by the hydraulic control device 26 for performing the anti-lock braking pressure control and the traction control.

If a noise is included in the output of at least one of the front wheel speed sensors 144, 145, an affirmative decision (YES) is obtained in step S103, and the control flow goes to step S105 to determine whether the noise is included in the output of only one of the front wheel speed sensors 144, 145. If an affirmative decision (YES) is obtained in step S105, the control flow goes to step S106 to estimate the vehicle speed $V_{SP1}$ to be equal to the lower one $V_{FMIN}$ of the speeds as represented by the front wheel speed sensors 144, 145. This lower front wheel speed $V_{FMIN}$ does not include a noise, and the higher front wheel speed includes a noise.

If a noise is included in the outputs of the two front wheel speed sensors 144, 145, a negative decision (NO) is obtained in step S105, and the control goes to step S117 and the following steps, as in the case where the two front wheel speed sensors 144, 145 are defective, since the speeds of the sensors 144, 145 whose outputs include a noise as well as the speeds as represented by the defective sensors 144, 145 cannot be used for the vehicle speed estimation.

If either one of the front wheel speed sensors 144, 145 is defective, a negative decision (NO) is obtained in step S99 while an affirmative decision (YES) is obtained in step S100, and the control flow goes to step S107 to determine whether at least one of the rear wheel speed sensors 142, 143 is defective. If none of the rear wheel speed sensors 142, 143 is defective, a negative decision (NO) is obtained in step S107, and the control flow goes to step S108 to select as the reference wheel speed $V_M$ the wheel speed $V_{MEDL}$ which is the lower one of the two intermediate wheel speeds of all the four wheel speeds as represented by the four sensors 142-145. In this case where only one of the four wheel speed sensors is defective, the lowest one $V_{MEDL}$ of the normal three normal wheel speeds is selected as the reference wheel speed.

Step S108 is followed by step S109 to determine whether a noise is included in the output of at least one of the front wheel speed sensors 144, 145. This determination is effected on the basis of the reference wheel speed $V_M$ selected in step S108. If none of the outputs of the front wheel speed sensors 144, 145 includes a noise, a negative decision (NO) is obtained in step S109, and the control flow goes to step S110 to estimate the vehicle speed $V_{SP1}$ to be the higher one $V_{FMAX}$ of the speeds as represented by the outputs of the front wheel speed sensors 144, 145. In this case where one of the front wheel speed sensors 144, 145 is defective but none of the outputs of these sensors includes a noise, the higher front wheel speed $V_{FMAX}$ is considered normal and does not include a noise.

If at least one of the outputs of the front wheel speed sensors 144, 145 includes a noise, an affirmative decision (YES) is obtained in step S109, and the control flow goes to step S111 to determine whether at least one of the outputs of the rear wheel speed sensors 142, 143 includes a noise. If none of the outputs of these rear wheel speed sensors 142, 143 includes a noise, a negative decision (NO) is obtained in step S111, and step S112 is implemented to estimate the vehicle speed $V_{SP1}$ to be equal to the average of the speeds $V_{RL}$ and $V_{RR}$ of the rear left and right wheels 14, 15. In this case, none of the rear wheel speed sensors 142, 143, and their outputs do not include a noise.

If a noise is included in at least one of the outputs of the rear wheel speed sensors 142, 143, an affirmative decision (YES) is obtained in step S111, and the control flow goes to step S113 to estimate the vehicle speed to be zero, since at least one of the front wheel speed sensors 144, 145 is defective while the output of the other front wheel speed sensor includes a noise, and at least one of the outputs of the rear wheel speed sensors 142, 143 includes a noise. Described differently, the sum of the number of the wheel speeds as detected by the defective wheel speed sensors and the number of the detected wheel speeds including a noise is equal to three or more. In this condition, the vehicle speed cannot be estimated with high accuracy on the basis of the detected wheel speeds, and is therefore estimated to be zero.

If at least one of the rear wheel speed sensors 142, 143 is defective, an affirmative decision (YES) is obtained in step S107, and the control flow goes to step S114 to determine whether only one of the rear wheel speed sensors 142, 143 is defective. If an affirmative decision (YES) is obtained in step S107, the control flow goes to step S115 to select as the reference wheel speed $V_M$ the wheel speed $V_{MEDH}$ which is the higher one of the two intermediate wheel speeds of all the four wheel speeds as represented by the four sensors 142-145. In this case where the two wheel speed sensors are defective, namely, one of the front wheel speed sensors 144, 145 and one of the rear wheel speed sensors 142, 143 are defective, the third wheel speed $V_{MEDL}$ as counted from the detected lowest wheel speed is selected.

Step S115 is followed by step S116 to determine whether a noise is included in the output of at least one of the front wheel speed sensors 144, 145. This determination is effected on the basis of the reference wheel speed $V_M$ selected in step S115. If an affirmative decision (YES) is obtained in step S116, the control flow goes to step S113 to estimate the vehicle speed $V_{SP1}$ to be zero, since the two wheel speed sensors are defective and at least one of the outputs of the front wheel speed sensors 144, 145 includes a noise.

If none of the outputs of the front wheel speed sensors 144, 145 includes a noise, a negative decision (NO) is obtained in step S116, and the control flow goes to step S51O to estimate the vehicle speed $V_{SP1}$ to be equal to the higher one $V_{FMAX}$ of the speeds as represented by the outputs of the front wheel speed sensors 144, 145. In this case where a noise is not included in the outputs of the rear wheel speed sensors 144, 145, the higher normal rear wheel speed $V_{FMAX}$ accurately represents the vehicle speed $V_{SP1}$. If both of the front wheel speed sensors 144, 145 are defective, an affirmative decision (YES) is obtained in step 99, and the control flow goes to step S117 to determine whether both of the rear wheel speed sensors 142, 143 are normal. If none of these rear wheel speed sensors 142, 143 are defective, an affirmative decision (YES) is obtained in step S117, and the control flow goes to step S118 to select as the reference wheel speed $V_M$ the wheel speed $V_{MEDH}$ which is the third wheel speed as counted from the lowest one of the detected four wheel speeds. In the present case, the two rear wheel speed sensors 144, 145 are defective, namely, the number of the defective sensors is equal to two. Then, step S111 is implemented to determine whether a noise is included in the output of at least one of the rear wheel speed sensors 142, 143. This determination is effected on the basis of the reference wheel speed $V_M$ selected in step S118.

If none of the outputs of the rear wheel speed sensors 142, 143 includes a noise, step S111 is followed by step S112 to estimate the vehicle speed $V_{SP1}$ to be equal to the average of the speeds $V_{RL}$ and $V_{RR}$ of the speeds of the rear wheels 14, 15. If at least one of the outputs of the rear wheel speed sensors 142, 143 includes a noise, an affirmative decision (YES) is obtained in step S111, and the control flow goes to step S113 to estimate the vehicle speed to be zero.

In the case where at least one of the rear wheel speed sensors 142, 143 is defective, too, a negative decision (NO) is obtained in step S117, and the control flow goes to step S113 to estimate the vehicle speed $V_{SP1}$ to be zero, since the number of the defective wheel speed sensors in this case is three.

If none of the front wheel speed sensors 144, 145 is defective, a negative decision (NO) is obtained in steps S99 and S100, and the control flow goes to step S101 to determine whether both of the rear wheel speed sensors 142, 143 are defective. If an affirmative decision (YES) is obtained in step S101, step S119 is implemented to select as the reference wheel speed $V_M$ the wheel speed $V_{MEDH}$ which is the third wheel speed as counted from the lowest one of the detected four wheel speeds. If either one of the rear wheel speed sensors 142, 143 is defective, a negative decision (NO) is obtained in step S101, and step S120 is implemented to select as the reference wheel speed $V_M$ the wheel speed $V_{MEDL}$ which is the second wheel speed as counted from the lowest one of the detected four wheel speeds. This reference wheel speed $V_M=V_{MEDL}$ is the lowest one of the normal wheel speeds which are not zero.

Step S120 is followed by step S121 to determine whether a noise is included in at least one of the outputs of the front wheel speed sensors 144, 145. This determination is effected on the basis of the reference wheel speed $V_M$ selected in step S120. If none of the outputs of the front wheel speed sensors 144, 145 include a noise, a negative decision (NO) is obtained in step S121, and the control flow goes to step S104 to estimate the vehicle speed $V_{SP1}$ to be equal to the average of the speeds of the front wheel speeds 18, 19, and store the estimated vehicle speed in the final speed memory of the RAM 94. In this case, none of the front wheel speed sensors 144, 145 is defective, and their outputs do not include a noise.

If a noise is included in at least one of the front wheel speed sensors 144, 145, an affirmative decision (YES) is obtained in step S121, and the control flow goes to step S122 to determine whether a noise is included in only one of the outputs of the front wheel speed sensors. 144, 145. If the outputs of the two front wheel speed sensors 144, 145 include a noise, a negative decision (NO) is obtained in step S122, and the control flow goes to step S113 to estimate the vehicle speed $V_{SP1}$ to be zero. If the output of only one of the two front wheel speed sensors 144, 145 includes a noise, an affirmative decision (YES) is obtained in step S122, and the control flow goes to step S106 to estimate the vehicle speed $V_{SP1}$ to be the lower one $V_{FMIN}$ of the speeds as represented by the outputs of the front wheel speed sensors 144, 145.

In the case where the rear wheel speed sensors 142, 143 are both defective and a noise is included in the output of one of these sensors 142, 143 (where an affirmative decision (YES) is obtained in steps S101 and S121), the sum of the number of the defective wheel speed sensors and the number of the wheel speed sensors whose outputs include a noise is equal to three. In this case, however, either one of the front wheel speed sensors 144, 145 is normal and its output does not include a noise, and the speed as represented by the output of this normal front wheel speed sensor which does not include a noise can be used to estimate the vehicle speed. In this case, therefore, the vehicle speed is estimated to be equal to this normal front wheel speed. This is an exception of the vehicle estimation Rule D indicated above. However, the vehicle speed may be estimated to be zero according to the Rule D.

In the present third embodiment of FIGS. 7 and 8, the determination as to whether a noise is included in the outputs of the wheel speed sensors 142-145 is effected on the basis of the reference wheel speed. In other words, the determination as to whether the vehicle is stationary or not can be effected on the basis of the reference wheel speed, with high accuracy or reliability. Since the reference wheel speed is selected from among the detected wheel speeds which are not abnormal, the accuracy of the determination as to whether the vehicle is stationary is further improved. In addition, the vehicle speed is estimated according to the estimation rules which are selectively used depending upon the result of the determinations as to whether the noise is included in the outputs of the wheel speed sensors. This arrangement is effective to prevent erroneous estimation or determination of the vehicle speed due to the noise included in the wheel speed sensor outputs.

In the present third embodiments, the outputs of both the wheel speed sensors 142, 143 for the rear wheels 14, 15 and the wheel speed sensors 144, 145 for the front wheels 18, 19 are checked for inclusion of a noise due to racing of the engine on the four-wheel drive vehicle, for assuring improved accuracy of estimation of the vehicle speed on the basis of the detected wheel speeds.

Since the vehicle speed detected by the vehicle speed detecting apparatus according to the present embodiment is highly reliable, the speedometer 152 supplied with this vehicle speed assures highly accurate indication of the vehicle speed on the basis of the vehicle speed detected by the present apparatus.

Further, the accurately detected vehicle speed also supplied to the engine control device 154 enables this device 154 to achieve adequate control of the fuel injection amounts in the anti-racing mode.

Further, the vehicle speed accurately detected by the present vehicle speed detecting apparatus permits the anti-lock braking pressure control routine to be executed with high accuracy, without erroneous estimation of excessive braking slip amounts of the wheels, which would erroneously and unnecessarily initiate the anti-lock braking pressure control. This arrangement is effective to avoid unnecessary energy consumption and reduce the frequency of noise generation due to unnecessary anti-lock braking. pressure control operations.

It will be understood from the above description of the present third embodiment that a portion of the hydraulic control device 26 assigned to implement steps S98-S102, S107, S108, S114, S115 and S117-S120 constitutes a major part of means for selecting the reference wheel speed used for determining whether a noise is included in the outputs of the wheel speed sensors. This reference wheel speed selecting means is adapted to exclude the use of the abnormally detected wheel speeds as the reference wheel speed.

Although the above third embodiment is adapted to estimate the vehicle speed on the basis of the speeds of the front wheels 18, 19 in principle, the vehicle speed estimation may be effected on the basis of the speeds of the rear wheels 14, 15 in principle, since the rear wheels 14, 15 as well as the front wheels 18, 19 are drive wheels. If some of the wheels are more likely to suffer from resonance than the other wheels, it is desirable to estimate the vehicle speed on the basis of the speeds of those other wheels.

While the vehicle speed is estimated according to the estimation Rules A through D which are selectively used, other estimation rules may be used for the vehicle speed estimation. For example, where the sum of the number of the defective wheel speed sensors and the number of the wheel speed sensors whose outputs include a noise is equal to three, the speed of the normal wheel speed may be used to estimate the vehicle speed.

Figure 9:
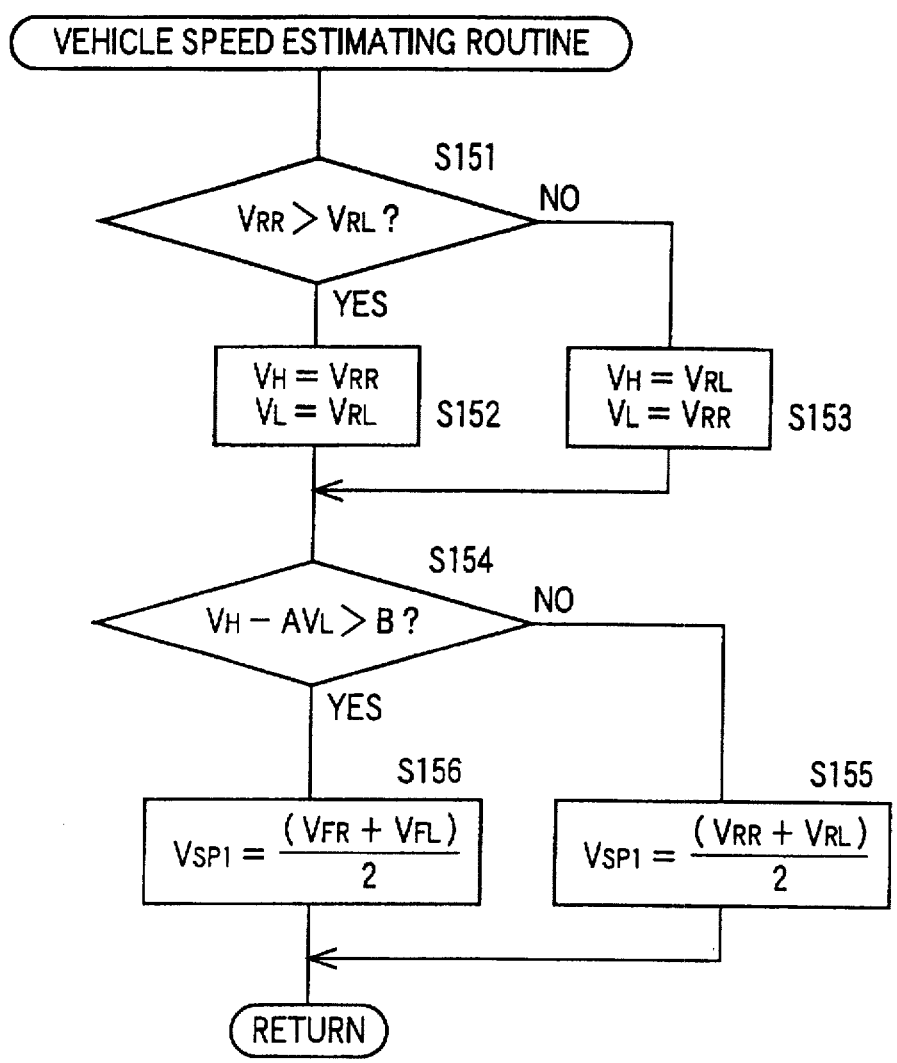
FIG. 9 is a flow chart illustrating a vehicle speed estimating routine used in a yet further embodiment of this invention.

Referring next to the flow chart of FIG. 9, there will be described a vehicle speed estimating routine executed by a vehicle speed detecting apparatus according to a fourth embodiment of this invention, which is also incorporated in a hydraulic control device for a hydraulic braking system for a rear-drive motor vehicle as shown in FIG. 1. A control program for executing the vehicle speed estimating routine of FIG. 9 is stored in the ROM 92 of the hydraulic control device 26. In this fourth embodiment, the provisional speed memory used in the preceding embodiments is not provided in the RAM 94.

In the present fourth embodiment of the invention, a decision that a noise due to racing of the vehicle engine is included in only one of the detected speeds of the rear left and right drive wheels 14, 15 is made if a value relating to a difference (hereinafter referred to as "rear wheel speed difference") between the speeds of the rear wheels 14, 15 is larger than a predetermined threshold. The engine racing will generate resonance in the vehicle drive system, which generally causes a noise to be included in the detected speeds of the rear left and right wheels 14, 15. However, a noise is rarely included in both of the detected rear wheel speeds at the same time. In most cases, noises are included in the detected rear wheel speeds at different times. When a noise is included in only one of the detected rear wheel speeds, the value relating to the rear wheel speed difference is larger than a predetermined threshold.

The value relating to the rear wheel speed difference used in the present fourth embodiment is the rear wheel speed difference ($V_H$-$V_L$) itself, where $V_H$ represents the higher one of the rear wheel speeds, while $V_L$ represents the lower rear wheel speed.

While a noise is not included in the outputs of the rear wheel speed sensors 142, 143, the rear wheel speed difference $V_H$-$V_L$ cannot be theoretically larger than a sum of a speed difference $(A-1)V_L$ between the speeds of the non-slipping outer and inner rear wheels 14, 15 during turning of the vehicle along a circular arc having the minimum turning radius, and a maximum speed difference B between the speeds of the rear left and right wheels 14, 15 which are measured by a two-wheel drum tester. That is, the rear wheel speed difference $V_H$-$V_L$ is always smaller than $(A-1)V_L$+B. Therefore, if the following inequality (1) is satisfied, it can be said that a noise is included in the detected higher rear wheel speed $V_H$.

$$(V_H-V_L) > (A-1)V_L + B \tag{1}$$

The two-wheel drum tester is one type of chassis dynamometer device including two independent rollers on which the rear left and right wheels 14, 15 are placed, respectively. The wheels 14, and 15 are rotated with the rollers, to inspect these wheels for their characteristics. The rotating speeds of the wheels 14, 15 can be measured on the basis of the rotating speeds of the two rollers of the chassis dynamometer device. This chassis dynamometer device permits adjustment of pressing forces by which the wheels 14, 15 are forced against the rollers, the rotating speed of the wheels 14, 15, and a load torque acting on the rollers. Road surface conditions having different friction coefficients may be simulated by suitably changing the sum of the pressing forces acting on the wheels 14, 15 for pressing contact with the rollers. The rotating speeds of the rear left and right wheels 14, 15 are measured while changing the above-indicated parameters, that is, the pressing forces, rotating speed of the wheels 14, 15 and load torque acting on the rollers. On the basis of the measured rotating speeds of the wheels 14, 15, speed differences of these wheels are obtained. The largest difference is used as the maximum speed difference B indicated above.

Figure 10:
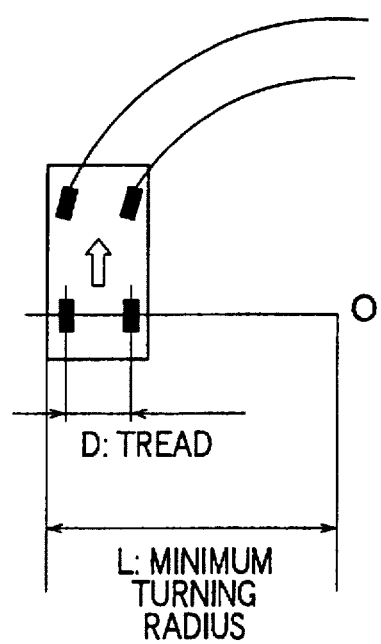
FIG. 10 is a view showing a minimum turning radius of a motor vehicle.

The value A indicated above is represented by L/(L— D), where L is the minimum turning radius of the vehicle, while D is the tread of the vehicle, as indicated in FIG. 10.

When a motor vehicle is turning with a turning radius R without slipping on the road surface, the outer one of the rear wheels 14, 15 which is on the outer side of the vehicle turning direction has the higher rear wheel speed $V_H$, while the other inner rear wheel 14, 15 has the lower ear wheel speed $V_L$. These higher and lower rear wheel speeds $V_H$, $V_L$ satisfy the following equations:

$$V_H:V_L=R:R-D$$

$$V_H-\{R/(R-D)\}\cdot V_L=0 \tag{2}$$

Assuming that the vehicle is turning with the minimum turning radius, the minimum turning radius L may be substituted for the turning radius R in the above equation (2). Therefore, the above equation (2) may be converted into the following equations:

$$V_H-\{L/(L-D)\}\cdot V_L=0$$

$$V_H-V_L=(A-1)V_L$$

Since $L \leq R$, the following equations or inequities are obtained:

$$\{L/(L-D)\} \geq \{R/(R-D)\}$$

$$VH-VL \leq (A-1)V_L$$

By adding the positive value of the maximum rear speed difference B to the right member of the inequity indicated just above, the following inequity is obtained:

$$(V_H - V_L) < (A-1)V_L + B$$

The above value $(A-1)V_L + B$ is the above-indicated predetermined threshold to be compared with the rear wheel speed difference $(V_H - V_L)$ which is used as the value relating to the rear wheel speed difference. In the present embodiment, the term $(A-1)V_L$ of the above inequality (1) is moved to the left member, and the inequity (1) is thus converted into the following inequity (3):

$$V_H - A \cdot V_L > B \quad (3)$$

The above inequity (3) is used in step S154 in the vehicle speed estimating routine of FIG. 9, as described below.

It will thus be understood that the above inequity (3) is equivalent to the inequity (1). That is, the determination as to whether the inequity (3) is satisfied is the same as the determination as to whether the rear wheel speed difference $(V_H - V_L)$ is larger than the predetermined threshold $\{(A-1)V_L + B\}$.

Referring to the flow chart of FIG. 9, the present fourth embodiment of this invention will be described in more detail.

The vehicle speed estimating routine of FIG. 9 is initiated with step S151 to determine whether the speed $V_{RR}$ of the rear right wheel 15 is higher than the speed $V_{RL}$ of the rear left wheel 14, that is, to determine which one of the rear wheel speeds $V_{RR}$ and $V_{RL}$ is higher. If the rear right wheel speed $V_{RR}$ is higher than the rear left wheel speed $V_{RL}$, that is, if an affirmative decision (YES) is obtained in step S151, the control flow goes to step S152 to determine the speed $V_{RR}$ to be the higher rear wheel speed $V_H$, and determine the speed $V_{RL}$ to be the lower rear wheel speed $V_L$. If a negative decision (NO) is obtained in step S151, the control flow goes to step S153 to determine the speed $V_{RL}$ to be the higher rear wheel speed $V_H$, and determine the speed $V_{RR}$ to be the lower rear wheel speed $V_L$.

Steps S152 and S153 for determining the rear higher and lower speeds $V_H$ and $V_L$ are followed by step S154 to determine whether the above-identified inequity (3) is satisfied or not. If a negative decision (NO) is obtained in step S154, it means that a noise is not included in the detected rear wheel speeds $V_{RR}$, $V_{RL}$, or that the rear wheel speed difference $(V_H - V_L)$ is not caused by the noise included in the detected speeds $V_{RR}$, $V_{RL}$. In this case, the control flow goes to step S155 to estimate the vehicle speed $V_{SP1}$ to be equal to the average of the detected rear wheel speeds $V_{RR}$ and $V_{RL}$, and store this average in the final speed memory of the RAM 94 as the final vehicle speed. Thus, the vehicle speed is estimated on the basis of the rear drive wheels 14, 15 in principle.

If the above inequity (3) is satisfied, an affirmative decision (YES) is obtained in step S151, and the control flow goes to step S156 to estimate the vehicle speed $V_{SP1}$ to be equal to the average of the speeds of the front non-drive wheels 18, 19. That is, since the affirmative decision in step S151 means that a noise is included in either one of the detected speeds of the rear wheels 14, 15.

In this case, therefore, the vehicle estimation rule is changed, that is, step S156 rather than step S55 is implemented to estimate the vehicle speed on the basis of the front non-drive wheels 18, 19.

As described above, the present fourth embodiment is arranged to check the detected wheel speeds for inclusion of a noise, on the basis of a value relating to the speed difference of the rear wheels 14, 15. This arrangement is effective to increase the accuracy of detection of the noise due to the engine racing, and reduce a probability of erroneous detection of a noise when the noise is not in fact included in the detected rear wheel speeds.

According to the result of the noise detection as described above, the vehicle speed is estimated with high accuracy, with reduced estimation error.

Further, the present arrangement permits more efficient noise detection than an alternative arrangement in which a decision of the noise detection is made if the values relating to the rear wheel speeds are outside predetermined permissible ranges. If the vehicle drive system suffers from resonance, the values relating to the rear wheel speeds may be outside the permissible ranges at different times, but are rarely outside the permissible ranges at the same time. Although the above alternative arrangement permits the noise detection when the values relating to the rear wheel speeds are simultaneously outside the permissible ranges, it takes a comparatively long time to detect the noise. The present arrangement using the value relating to the rear wheel speed difference makes it possible to shorten the time required to detect the noise included in the detected rear wheel speeds.

In the present fourth embodiment, too, the accurately detected vehicle speed also supplied to the engine control device 154 enables this device 154 to achieve adequate control of the fuel injection amounts in the anti-racing mode.

Further, the vehicle speed accurately detected by the present vehicle speed detecting apparatus makes it possible to prevent erroneous and unnecessary initiation of the anti-lock braking pressure control, avoiding unnecessary energy consumption and reducing the frequency of noise generation due to unnecessary anti-lock braking pressure control operations.

While the hydraulic braking system including the vehicle speed detecting apparatus according to the fourth embodiment is adapted for use on the motor vehicle driven by the two rear wheels 14, 15, the braking system may be adapted for use on a four-wheel drive motor vehicle. In this case, the noise detection may be achieved depending upon whether a value relating to the speed difference of the front drive wheels 18, 19 is larger than a predetermined threshold.

Although the fourth embodiment is adapted to detect the noise when the value relating the detected speeds of the rear wheels 14, 15 is larger than the predetermined threshold and satisfies the above inequity (3), other inequities may be employed. It is noted that the value $(V_H - A \cdot V_L)$ in the above inequity (3) may be considered a value relating to the rear wheel speed difference.

It will be understood from the above description of the fourth embodiment of the invention that a portion of the hydraulic control device 26 assigned to implement steps S151–S154 constitutes a major part of noise detecting means, while a portion of the device 26 assigned to implement steps S156 and S156 constitutes a major part of vehicle estimating means.

In the fourth embodiment, the lower one $V_L$ of the speeds of the rear wheels 14, 15 may be considered as the reference wheel speed. In this case, the following inequity (4) may be used in step S154 of the routine of FIG. 9:

$$V_H/A - V_L > B/A \quad (4)$$

The above inequity (4) may be obtained by dividing the right and left members of the inequity (3) by the coefficient A. In the case where the inequity (4) is used in step S154, a decision that a noise is included in the higher rear speed $V_H$ is made if a difference obtained by subtracting a quotient $V_H/A$ from the lower rear wheel speed $V_L$ is larger than the predetermined threshold B/A.

In the above modified arrangement, a portion of the hydraulic control device assigned to implement steps S151–S153 constitutes a major part of reference wheel speed selecting means, while a portion of the device 26 assigned to implement modified step S154 constitutes a major part of noise detecting means for detecting the noise on the basis of the reference wheel speed.

While several preferred embodiments of this invention have been described above by reference to the accompanying drawings, it is to be understood that the present invention is not limited to the details of the illustrated embodiments, but may be embodied with various changes, modifications and improvements, which may occur to those skilled in the art, without departing from the spirit and scope of the invention defined in the following claims.

What is claimed is:

1. A vehicle speed detecting apparatus comprising:

a plurality of wheel speed detecting devices which correspond to respective groups of wheels of a motor vehicle each group consisting of at least one wheel and each of which detects a rotating speed of each wheel of the corresponding group; and vehicle speed estimating means for estimating a running speed of said vehicle on the basis of at least one of the rotating speeds of the wheels detected by said wheel speed detecting devices, and according to a predetermined estimation rule, and wherein said vehicle speed estimating means includes noise detecting means for determining whether a noise is included in at least one of outputs of said plurality of wheel speed detecting devices, and rule changing means for changing said predetermined estimating rule according to an output of said noise detecting means.

2. A vehicle speed detecting apparatus according to claim 1, wherein said noise detecting means comprises designating means for designating at least one of said wheel speed detecting devices so that said noise detecting means determines whether the noise is included in the output of each of said at least one wheel speed detecting device designated by said designating means.

3. A vehicle speed detecting apparatus according to claim 2, wherein said designating means designates a plurality of said wheel speed designating devices in a predetermined order.

4. A vehicle speed detecting apparatus according to claim 1, wherein said noise detecting means determines that the noise is included in at least one of the outputs of said wheel speed detecting devices, if a value relating to the rotating speed as represented by said at least one of said outputs satisfies a predetermined condition.

5. A vehicle speed detecting apparatus according to claim 4, wherein said value relating to the rotating speed consists of a rate of change of said rotating speed, and said predetermined condition includes a condition that said rate of change of said rotating speed is larger than a predetermined threshold.

6. A vehicle speed detecting apparatus according to claim 1, wherein said noise detecting means comprises reference speed selecting means for selecting as a reference wheel speed at least one of the rotating speeds of the wheels as represented by the outputs of the corresponding wheel speed detecting devices, said noise detecting means comprising noise determining means for determining whether the noise is included in said at least one of said outputs of the wheel speed detecting devices, depending upon said reference wheel speed selected by said reference speed selecting means.

7. A vehicle speed detecting apparatus according to claim 6, wherein said reference speed selecting means comprises normal speed selecting means for selecting said reference wheel speed from among the detected rotating speeds of the wheels which are not abnormal.

8. A vehicle speed detecting apparatus according to claim 7, wherein said reference speed selecting means comprises abnormal speed detecting means for detecting at least one abnormal wheel speed each of which is the rotating speed of the wheel which is detected by the corresponding wheel speed detecting device and which is abnormal, said normal speed selecting means selecting as said reference wheel speed a lowest one of the detected rotating speeds except said at least one abnormal wheel speed.

9. A vehicle speed detecting apparatus according to claim 8, wherein said abnormal speed detecting means includes abnormality detecting means for determining, as said at least one abnormal wheel speed, the rotating speed of each wheel which speed is detected to be zero by the corresponding wheel speed device, in a case where the rotating speeds detected by said plurality of wheel speed detecting devices include at least one rotating speed within a predetermined normal range and at least one rotating speed which is zero.

10. A vehicle speed detecting apparatus according to claim 6, wherein said noise determining means of said noise detecting means comprises speed difference detecting means for determining whether a difference between each of at least one of the rotating speeds of the wheels detected by said plurality of wheel speed detecting devices and said reference wheel speed is larger than a predetermined threshold, said noise determining means detecting the inclusion of the noise in said each of at least one of the rotating speeds if said speed difference detecting means determines that said difference is larger than said predetermined threshold.

11. A vehicle speed detecting apparatus according to claim 1, wherein said plurality of wheel speed detecting devices include a left wheel speed detecting device and a right wheel speed detecting device which detect the rotating speeds of a left wheel and a right wheel of the vehicle, respectively, said left and right wheels being located on at least one of front and rear sides of the vehicle, and wherein said noise detecting means comprises noise determining means for determining that the noise is included in at least one of outputs of said left and right wheel speed detecting devices, if a value relating to a difference between the rotating speeds of said left and right wheels detected by said left and right wheel speed detecting devices is larger than a predetermined threshold.

12. A vehicle speed detecting apparatus according to claim 11, wherein said value relating to said difference comprises said difference between the rotating speeds of said left and right wheels, and said predetermined threshold with which said noise determining means compares said difference is a sum of a difference between the rotating speeds of said left and right wheels, which difference occurs when the vehicle is turning with a minimum turning radius, and a maximum difference between the rotating speeds of said left and right wheels, which maximum difference occurs due to slipping of said left and right wheels.

13. A vehicle speed detecting apparatus according to claim 1, further comprising racing condition estimating means for determining whether there is a possibility of racing of an engine of the vehicle, and wherein said noise detecting means comprises noise determining means for determining that the noise is included in said at least one of the outputs of said plurality of wheel speed detecting devices, when said racing condition estimating means determines that there is a possibility of said racing of said engine.

14. A vehicle speed detecting apparatus according to claim 13, wherein said racing condition estimating means determines that there is a possibility of the racing of the engine, if at least one of a first condition that the engine is operating under a non-load condition and a second condition that a speed of the engine is higher than a predetermined threshold is satisfied.

15. A vehicle speed detecting apparatus according to claim 14, wherein said racing condition estimating means determines that there is a possibility of the racing of the engine, if a reference wheel speed selected from among the rotating speeds of the wheels as represented by said plurality of wheel speed detecting devices is lower than a predetermined threshold.

16. A vehicle speed detecting apparatus according to claim 1, further comprising noise removal detecting means for effecting a noise removal detecting operation to determine whether said noise has been removed from said at least one of the outputs of said plurality of wheel speed detecting devices, and wherein said noise removal detecting means initiates said noise removal detecting operation when said noise detecting means has determined that said noise is included in said at least one of said outputs, and terminates said noise removal detecting operation when said noise removal detecting means has determined that said noise has been removed from said at least one of said outputs.

17. A vehicle speed detecting apparatus according to claim 16, wherein said noise removal detecting means determines that said noise has been removed from each of said at least one of said outputs, if a value relating to the rotating speed as represented by said each of said at least one of said outputs satisfies a predetermined noise removal condition.

18. A vehicle speed detecting apparatus according to claim 17, wherein said noise detecting means determines that the noise is included in said each of said at least one of said outputs, if said value relating to the rotating speed satisfied a predetermined noise inclusion condition, said predetermined noise removal condition and said predetermined noise inclusion condition being formulated such that both of said noise removal and inclusion conditions are not satisfied simultaneously under some conditions of the vehicle.

19. A vehicle speed detecting apparatus according to claim 17, wherein said noise removal detecting means comprises racing condition estimating means for determining whether there is a possibility of racing of an engine of the vehicle or not, and determining means for determining that said predetermined noise is satisfied, when said racing condition estimating means determines that there is not a possibility of the racing of the engine.

20. A vehicle speed detecting apparatus according to claim 17, wherein said noise removal detecting means determines that the noise is included in said each of said at least one of said outputs, if said value relating to the rotating speed satisfies a predetermined noise inclusion condition, and said noise removal detecting means determines that said predetermined noise removal condition is satisfied, if at least one of the following conditions is satisfied: (a) said value relating to the rotating speed remains to fail to satisfy said pre determined noise inclusion condition for more than a predetermined length of time; (b) any of said outputs of the wheel speed detecting devices which does not include the noise becomes higher than a predetermined value; and (c) the rotating speeds of the wheels detected by all of said wheel speed detecting devices remain to be zero for more than a predetermined length of time.

21. A vehicle speed detecting apparatus according to claim 1, wherein said vehicle speed estimating means estimates the running speed of the vehicle according to said predetermined rule on the basis of selected at least one of the rotating speeds of the wheels detected by said wheel speed detecting devices while said noise detecting means determines that the noise is not included in said at least one of the outputs of the wheel speed detecting devices, said rule changing means comprising at least one of (a) first estimating means for estimating said running speed on the basis of at least one of the rotating speeds of the wheels except said selected at least one rotating speed, (b) second estimating means for estimating said running speed to be zero, and (c) third estimating means for estimating said running speed to be equal to a value which has been estimated last before said noise detecting means determines that the noise is included in said selected at least one rotating speed, said first, second and third estimating means being activated when said noise detecting means has. determined that the noise is included in said selected at least one rotating speed.

22. A vehicle speed detecting apparatus according to claim 21, wherein said first estimating means of said rule changing means comprises at least one of (i) estimating means for estimating said running speed of the vehicle on the basis of a lowest one of said at least one of the rotating speeds of the wheels except said selected at least one rotating speed, (ii) estimating means for estimating said running speed on the basis of an intermediate one of said at least one of the rotating speeds of the wheels except said selected at least one rotating speed, and (iii) estimating means for estimating said running speed on the basis of said at least one of the rotating speeds of the wheels except said selected at least one rotating speed.

23. A vehicle speed detecting apparatus according to claim 8, wherein said rule changing means comprises zeroing means for estimating said running speed of the vehicle to be zero if a sum of the number of said at least one abnormal wheel speed detected by said abnormal speed detecting means and the number of at least one of the detected rotating speeds which includes a noise is larger than a predetermined value.

24. A vehicle speed detecting apparatus according to claim 1, wherein each of said plurality of wheel speed detecting devices includes a rotary member rotatable with the corresponding wheel, and a detecting portion which is fixed to a body of said motor vehicle and which provides an output signal indicative of a periodic change of a distance between said rotary member and said detecting portion.

25. A vehicle speed detecting apparatus according to claim 24, wherein said rotary member is made of a magnetic material, and said detecting portion includes a magnetic force generator and a coil which generates as said output signal an alternate current according to a periodic change of a magnitude of a magnetic flux with said periodic change of said distance.

26. A vehicle speed detecting apparatus according to claim 25, wherein said noise detecting means comprises reference speed selecting means for selecting as a reference wheel speed from among the detected rotating speeds of the wheels which are not abnormal, said reference speed selecting means including abnormal speed detecting means for detecting at least one abnormal wheel speed each of which is the rotating speed of the wheel which is detected by the corresponding wheel speed detecting device and which is abnormal, said noise detecting means comprising noise determining means for determining whether the noise is included in said at least one of the outputs of the wheel speed detecting devices, depending upon said reference wheel speed selected by said reference speed selecting means, and wherein said abnormal speed detecting means detects each of said at least one abnormal wheel speed if said alternate current as said output signal of said each wheel speed detecting device is absent.

27. A vehicle speed detecting apparatus according to claim 1, further comprising vehicle speed supplying means for applying an output of said vehicle speed estimating means to at least one external device which is provided on said motor vehicle and outside the vehicle speed detecting apparatus.

28. A vehicle speed detecting apparatus according to claim 27 wherein said at least one external device includes at least one of an engine control device for controlling an engine of the vehicle and a speedometer for indicating said running speed of the vehicle.

29. A vehicle speed detecting apparatus according to claim 27, wherein said vehicle speed supplying means applies said output of said vehicle speed estimating means to a plurality of external devices, said apparatus further comprising signal processing means for processing said output of said vehicle speed estimating means, and control means for controlling said signal processing means depending upon said external devices to which said output of said vehicle speed estimating means is applied.

30. An apparatus for performing at least one of an anti-lock braking pressure control and a traction control of a motor vehicle, comprising a vehicle speed detecting apparatus according to claim 1.

31. A motor vehicle having four drive wheels, comprising a vehicle speed detecting apparatus according to claim 1.

32. A vehicle speed detecting apparatus, comprising:
   a plurality of wheel speed detecting devices which correspond to respective groups of wheels of a motor vehicle each group consisting of at least one wheel and each of which detects a rotating speed of each wheel of the corresponding group;
   designating means for designating at least one of said wheel speed detecting devices as at least one designated wheel speed detecting device;
   vehicle speed estimating means for estimating a running speed of said vehicle on the basis of at least one rotating speed detected by said at least one designated wheel speed detecting device designated by said designating means; and
   noise detecting means for determining whether a noise is included in each of outputs of said plurality of wheel speed detecting devices, said designating means selecting as said at least one designated wheel speed detecting device from the wheel speed detecting devices whose outputs do not include a noise according to the determination by said noise detecting means.

33. A vehicle speed detecting apparatus according to claim 32, wherein said plurality of wheel speed detecting devices include at least one predetermined wheel speed detecting device, and said designating means selects said at least one predetermined wheel speed detecting device as said at least one designated wheel speed detecting device when said noise detecting means determines that said noise is included in none of said outputs of said plurality of wheel speed detecting devices.

34. A vehicle speed detecting apparatus according to claim 33, wherein said wheels of the motor vehicle consist of at least one drive wheel and at least one non-drive wheel, and said plurality of wheel speed detecting devices consist of at least one drive wheel speed detecting device for detecting the rotating speed of each of said at least one drive wheel and at least one non-drive wheel speed detecting device for detecting the rotating speed of each of said at least one one non-drive wheel, said at least one predetermined wheel speed detecting device consisting of said at least one drive wheel speed detecting device.

35. A vehicle speed detecting apparatus comprising:
   a plurality of wheel speed detecting devices for detecting rotating speeds of a plurality of wheels of a motor vehicle, respectively:
   noise detecting means for determining whether a noise is included in each of outputs of said plurality of wheel speed detecting devices;
   wheel speed estimating means for estimating at least one of actual rotating speeds of the wheels on the basis of an output of said noise detecting means and the rotating speeds detected by said plurality of wheel speed detecting devices, and
   vehicle speed estimating means for estimating a running speed of the motor vehicle, on the basis of said at least one of said actual rotating speeds of the wheels estimated by the wheel speed estimating means.

36. An apparatus for supplying speed data to at least one external device, comprising a vehicle speed detecting apparatus and speed data supplying means, wherein said vehicle speed detecting apparatus comprises
   (a) a plurality of wheel speed detecting devices for detecting rotating speeds of a plurality of wheels of a motor vehicle respectively:
   (b) noise detecting means for determining whether a noise is included in each of outputs of said plurality of wheel speed detecting devices:
   (c) wheel speed estimating means for estimating at least one of actual rotating speeds of the wheels on the basis of an output of said noise detecting means and the rotating speeds detected by said plurality of wheel speed detecting devices; and
   (d) vehicle speed estimating means for estimating a running speed of the motor vehicle, on the basis of said at least one of said actual rotating speeds of the wheels estimated by the wheel speed estimating means;
   and wherein said speed data supplying means applies an output of said wheel speed estimating means and an output of said vehicle speed estimating means to said at least one external device.

* * * * *

UNITED STATES PATENT AND TRADEMARK OFFICE
CERTIFICATE OF CORRECTION

PATENT NO. : 5,748,503
DATED : May 5, 1998
INVENTOR(S) : Minoru Saeki, et al

It is certified that error appears in the above-identified patent and that said Letters Patent is hereby corrected as shown below:

| Column | Line | |
|---|---|---|
| 3 | 62 | Change "wheel of" to --speed of--. |
| 7 | 3 | After "basis" delete ".". |
| 7 | 57 | After "comprise" delete ".". |
| 8 | 47 | After "difference" delete ".". |
| 10 | 41 | After "has" delete ".". |
| 11 | 18 | Change "speeds. Of" to --speeds of--. |
| 12 | 9 | Delete "further" (second occurrence). |
| 13 | 20 | Delete "noise" (second occurrence). |
| 13 | 55 | Change "noise. Inclusion" to --noise inclusion--. |
| 16 | 23 | After "alternate" delete ".". |
| 16 | 24 | Change "Current" to --current--. |
| 16 | 34 | Change "devices: include" to --devices include:--. |

UNITED STATES PATENT AND TRADEMARK OFFICE
CERTIFICATE OF CORRECTION

PATENT NO. : 5,748,503
DATED : May 5, 1998
INVENTOR(S) : Minoru Saeki, et al

It is certified that error appears in the above-identified patent and that said Letters Patent is hereby corrected as shown below:

| Column | Line | |
|---|---|---|
| 17 | 44 | Change "vehicle,," to --vehicle,--. |
| 18 | 11 | Change "are" to --is--. |
| 19 | 12 | After "mined" delete ".". |
| 19 | 66 | Change "where" to --there--. |
| 22 | 8 | Change "routine-" to --routine--. |
| 22 | 21 | Change "EMBODIMENT" to --EMBODIMENTS--. |
| 22 | 23 | After "control" insert --26--. |
| 23 | 3 | Change "cylinder the" to --cylinder. The--. |
| 24 | 47 | Change "in the" to --in an--. |
| 24 | 57 | Change "$\Delta V_{SN}$+lis" to --$\Delta V_{SN}$ is--. |
| 26 | 61 | After "than" insert --a--. |

UNITED STATES PATENT AND TRADEMARK OFFICE
CERTIFICATE OF CORRECTION

PATENT NO. : 5,748,503

DATED : May 5, 1998

INVENTOR(S) : Minoru Saeki, et al

It is certified that error appears in the above-identified patent and that said Letters Patent is hereby corrected as shown below:

| Column | Line | |
|---|---|---|
| 27 | 62 | Change "cross" to --crossing--. |
| 29 | 4 | Delete "to be". |
| 29 | 11 | Delete "to be". |
| 31 | 34 | Delete "to be". |
| 32 | 9 | Delete "to be". |
| 32 | 12 | Change "11"" to --1"--. |
| 32 | 19 | Change "flat" to --flag--. |
| 32 | 34 | Delete "removal". |
| 34 | 31 | Change "to as" to --so as--. |
| 35 | 55 | After "detected" insert --by--. |
| 36 | 3 | Change "depends" to --depend--. |
| 36 | 11 | Change "flat" to --flag--. |

UNITED STATES PATENT AND TRADEMARK OFFICE
CERTIFICATE OF CORRECTION

PATENT NO. : 5,748,503
DATED : May 5, 1998
INVENTOR(S) : Minoru Saeki, et al

It is certified that error appears in the above-identified patent and that said Letters Patent is hereby corrected as shown below:

| Column | Line | |
|---|---|---|
| 37 | 51 | Delete "to be". |
| 37 | 58 | Delete "to be". |
| 37 | 61 | Delete "to be". |
| 38 | 22 | Before "smaller" insert --or--. |
| 38 | 24-25 | Delete "to be". |
| 38 | 30-31 | Delete "to be". |
| 38 | 33 | Delete "to be". |
| 38 | 54 | "flag A" should read --flag $A_J$-- |
| 38 | 55 | Change "timer A" to --timer $A_j$--. |
| 39 | 14 | Change "timer $A_j$" to --timer $A_j$--. |
| 39 | 50 | Delete "to be". |
| 39 | 54 | Delete "to be". |
| 39 | 61 | Change "SS1" to --S51--. |

UNITED STATES PATENT AND TRADEMARK OFFICE
CERTIFICATE OF CORRECTION

PATENT NO. : 5,748,503
DATED : May 5, 1998
INVENTOR(S) : Minoru Saeki, et al

It is certified that error appears in the above-identified patent and that said Letters Patent is hereby corrected as shown below:

| Column | Line | |
|---|---|---|
| 40 | 2 | Change "$A_i$" to --$A_j$--. |
| 42 | 1 | Change "$V_{sp}$" to --$V_{SP1}$--. |
| 42 | 15 | Change "$V_{Sp1}$" to --$V_{SP1}$. |
| 42 | 39 | Before "noise" delete "the". |
| 42 | 43 | Before "noise" delete "the". |
| 42 | 53 | Change "$V_{Sp1}$" to --$V_{SP1}$. |
| 44 | 24 | Delete "do not". |
| 44 | 66 | Change "S510" to --S110--. |
| 46 | 10 | Change "f low" to --flow--. |
| 48 | 44 | Change "ear" to --rear--. |
| 48 | 50 | Change "$V_H=\{$" to -- $V_H\{$ --. |

UNITED STATES PATENT AND TRADEMARK OFFICE
CERTIFICATE OF CORRECTION

PATENT NO.  : 5,748,503
DATED       : May 5, 1998
INVENTOR(S) : Minoru Saeki, et al It is certified that error appears in the above-identified patent and that said Letters Patent is hereby corrected as shown below:

| Column | Line | |
|---|---|---|
| 48 | 62 | change "inequities" to --inequalities--. |
| 49 | 2  | Change "inequity" to --inequality--. |
| 49 | 3  | Change "inequity" to --inequality--. |
| 49 | 14 | Change "inequity" to --inequality--. |
| 49 | 18 | Change "inequity" to --inequality--. |
| 49 | 20 | Change "inequity" to --inequality--. |
| 49 | 21 | Change "inequity" to --inequality--. |
| 49 | 22 | Change "inequity" to --inequality--. |
| 49 | 45 | Change "inequity" to --inequality--. |
| 49 | 57 | Change "inequity" to --inequality--. |

UNITED STATES PATENT AND TRADEMARK OFFICE
CERTIFICATE OF CORRECTION

PATENT NO. : 5,748,503
DATED : May 5, 1998
INVENTOR(S) : Minoru Saeki, et al

It is certified that error appears in the above-identified patent and that said Letters Patent is hereby corrected as shown below:

| Column | Line | |
|---|---|---|
| 49 | 63 | After "15" delete "." and insert --;--; do not start new paragraph. |
| 49 | 64 | Change "In" to --in--. |
| 50 | 48 | Change "inequity" to --inequality--; change "inequities" to --inequalities--. |
| 50 | 50 | Change "inequity" to --inequality--. |
| 50 | 61 | Change "inequity" to --inequality--. |
| 50 | 66 | Change "inequity" to --inequality--. |
| 50 | 67 | Change "inequity" to --inequality--. |
| 53 | 66 | Change "remains" to --continues--. |
| 53 | 67 | Change "pre determined" to --predetermined--. |
| 54 | 5 | Delete "to be". |

UNITED STATES PATENT AND TRADEMARK OFFICE
CERTIFICATE OF CORRECTION

PATENT NO. : 5,748,503
DATED : May 5, 1998
INVENTOR(S) : Minoru Saeki, et al

It is certified that error appears in the above-identified patent and that said Letters Patent is hereby corrected as shown below:

| Column | Line | |
|---|---|---|
| 55 | 57 | Before "said" delete "as". |
| 56 | 43 | Change ":" to --;--. |
| 56 | 46 | Change ":" to --;--. |

Signed and Sealed this

Seventh Day of September, 1999

Attest:

Q. TODD DICKINSON

Attesting Officer    Acting Commissioner of Patents and Trademarks